(12) United States Patent
Tajima et al.

(10) Patent No.: US 10,091,388 B2
(45) Date of Patent: Oct. 2, 2018

(54) PRINT CONTROL SYSTEM AND PRINT CONTROL METHOD

(71) Applicant: Seiko Epson Corporation, Tokyo (JP)

(72) Inventors: Shigeo Tajima, Shiojiri (JP); Koji Nishizawa, Shiojiri (JP); Keigo Mori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/363,457

(22) Filed: Nov. 29, 2016

(65) Prior Publication Data

US 2017/0078524 A1 Mar. 16, 2017

Related U.S. Application Data

(63) Continuation of application No. 14/885,658, filed on Oct. 16, 2015, now Pat. No. 9,542,133, which is a continuation of application No. 14/527,614, filed on Oct. 29, 2014, now Pat. No. 9,195,418.

(30) Foreign Application Priority Data

Nov. 1, 2013 (JP) ................................ 2013-227827
Nov. 7, 2013 (JP) ................................ 2013-230942
Nov. 7, 2013 (JP) ................................ 2013-230944
Dec. 27, 2013 (JP) ................................ 2013-271885

(51) Int. Cl.
*G06F 15/00* (2006.01)
*H04N 1/327* (2006.01)
*G06F 3/12* (2006.01)
*H04N 1/00* (2006.01)
*H04N 1/32* (2006.01)

(52) U.S. Cl.
CPC ....... *H04N 1/32797* (2013.01); *G06F 3/1203* (2013.01); *G06F 3/1229* (2013.01); *G06F 3/1236* (2013.01); *G06F 3/1285* (2013.01); *H04N 1/00344* (2013.01); *H04N 1/00973* (2013.01); *H04N 1/32523* (2013.01); *H04N 2201/0039* (2013.01); *H04N 2201/0094* (2013.01); *H04N 2201/3205* (2013.01)

(58) Field of Classification Search
CPC .......... H04N 2201/0094; G06F 3/1236; G06F 3/1203; G06F 3/1229; G06F 3/1285
USPC ........................................ 358/1.15
See application file for complete search history.

(56) References Cited

U.S. PATENT DOCUMENTS

| | | |
|---|---|---|
| 4,589,106 A | 5/1986 | Prather et al. |
| 4,882,675 A | 11/1989 | Nichtberger et al. |
| 5,625,757 A | 4/1997 | Kageyama et al. |
| 5,633,992 A | 5/1997 | Gyllenskog |
| 5,699,494 A | 12/1997 | Colbert et al. |

(Continued)

FOREIGN PATENT DOCUMENTS

| | | |
|---|---|---|
| JP | 07-287678 A | 10/1995 |
| JP | 07-296266 A | 11/1995 |

(Continued)

*Primary Examiner* — Saeid Ebrahimi Dehkordy
(74) *Attorney, Agent, or Firm* — Foley & Lardner LLP

(57) ABSTRACT

A print control system 1 has a control server 10 that transmits print data, and a printer 12 that communicates with the control server 10 through an asynchronous duplex communication path, receives print data sent by the control server 10 through the communication path, and prints based on the received data.

14 Claims, 23 Drawing Sheets

(56) References Cited

U.S. PATENT DOCUMENTS

| | | |
|---|---|---|
| 5,727,135 A | 3/1998 | Webb et al. |
| 5,729,461 A | 3/1998 | D'Andrea et al. |
| 6,134,021 A | 10/2000 | Silverbrook |
| 6,189,052 B1 | 2/2001 | Nilsson et al. |
| 6,452,693 B1 | 9/2002 | Isoda et al. |
| 6,477,587 B1 | 11/2002 | Isoda et al. |
| 6,710,893 B1 | 3/2004 | Hou et al. |
| 9,195,418 B2 | 11/2015 | Tajima et al. |
| 2002/0051184 A1 | 5/2002 | Fritz et al. |
| 2002/0126306 A1 | 9/2002 | Chohsa et al. |
| 2002/0145764 A1 | 10/2002 | Suzuki |
| 2003/0025931 A1 | 2/2003 | Dorfman et al. |
| 2003/0123074 A1 | 7/2003 | Imai et al. |
| 2003/0142352 A1 | 7/2003 | Matsunaga et al. |
| 2003/0197887 A1 | 10/2003 | Shenoy et al. |
| 2003/0197890 A1 | 10/2003 | Satake et al. |
| 2004/0009022 A1 | 1/2004 | Matsunaga et al. |
| 2004/0098471 A1 | 5/2004 | Shima |
| 2004/0215785 A1 | 10/2004 | Shima |
| 2004/0215840 A1 | 10/2004 | Shimura |
| 2005/0179936 A1 | 8/2005 | Sedky et al. |
| 2006/0104295 A1 | 5/2006 | Worley et al. |
| 2007/0204045 A1 | 8/2007 | Shima |
| 2008/0028203 A1 | 1/2008 | Sakai |
| 2008/0034098 A1 | 2/2008 | Shima |
| 2008/0186983 A1 | 8/2008 | Dielissen et al. |
| 2008/0239382 A1 | 10/2008 | Matsueda |
| 2009/0066989 A1 | 3/2009 | Kazume |
| 2009/0077169 A1 | 3/2009 | Ikeura et al. |
| 2009/0161144 A1* | 6/2009 | Huang ............... H04N 1/00222 358/1.15 |
| 2010/0110475 A1 | 5/2010 | Johnson et al. |
| 2010/0238501 A1 | 9/2010 | Fujimaki |
| 2010/0281107 A1 | 11/2010 | Fallows et al. |
| 2010/0328717 A1 | 12/2010 | Sugasaki |
| 2011/0176163 A1 | 7/2011 | Yawata |
| 2012/0008164 A1 | 1/2012 | Nanaumi |
| 2012/0036570 A1 | 2/2012 | Wada |
| 2012/0110646 A1 | 5/2012 | Ajitomi et al. |
| 2012/0133974 A1* | 5/2012 | Nakamura ............ G06F 3/1212 358/1.15 |
| 2012/0144416 A1 | 6/2012 | Wetzer et al. |
| 2012/0194864 A1 | 8/2012 | Oshima et al. |
| 2012/0224197 A1 | 9/2012 | Suzuki |
| 2012/0307303 A1 | 12/2012 | Harada |
| 2012/0320415 A1 | 12/2012 | Nakamura |
| 2013/0060951 A1 | 3/2013 | Shima |
| 2013/0083353 A1 | 4/2013 | Nishikawa et al. |
| 2013/0120794 A1 | 5/2013 | Kamoi |
| 2013/0238785 A1 | 9/2013 | Hawk et al. |
| 2013/0314735 A1 | 11/2013 | Homma |
| 2014/0025832 A1 | 1/2014 | Ito |
| 2014/0071476 A1 | 3/2014 | Aritomi |
| 2014/0092418 A1 | 4/2014 | Kishimoto |
| 2014/0201292 A1 | 7/2014 | Savage et al. |
| 2014/0245138 A1* | 8/2014 | Prabhakaran ......... G06F 17/212 715/274 |
| 2015/0002895 A1 | 1/2015 | Nakatsuka et al. |
| 2015/0146243 A1 | 5/2015 | Tsujimoto |

FOREIGN PATENT DOCUMENTS

| | | |
|---|---|---|
| JP | 08-161248 A | 6/1996 |
| JP | 09-259054 A | 10/1997 |
| JP | 2000-101640 A | 4/2000 |
| JP | 2000-227842 A | 8/2000 |
| JP | 2001-105689 A | 4/2001 |
| JP | 2002-092743 A | 3/2002 |
| JP | 2002-518885 A | 6/2002 |
| JP | 2002-312853 A | 10/2002 |
| JP | 2002-351642 A | 12/2002 |
| JP | 2003-050685 A | 2/2003 |
| JP | 2003-108449 A | 4/2003 |
| JP | 2004-078392 A | 3/2004 |
| JP | 2005-084759 A | 3/2005 |
| JP | 2005-100343 A | 4/2005 |
| JP | 2006-039915 A | 2/2006 |
| JP | 2009-070290 A | 4/2009 |
| JP | 2009-301185 A | 12/2009 |
| JP | 2010-224768 A | 10/2010 |
| JP | 2011-108097 A | 6/2011 |
| JP | 2012-037944 A | 2/2012 |
| JP | 2012-118733 A | 6/2012 |
| JP | 2012-252474 A | 12/2012 |
| JP | 2013-004248 A | 1/2013 |
| JP | 2013-075365 A | 4/2013 |
| JP | 2013-077141 A | 4/2013 |
| JP | 2013-077144 A | 4/2013 |
| JP | 2013-103477 A | 5/2013 |
| JP | 2013-120425 A | 6/2013 |
| JP | 2013-149004 A | 8/2013 |
| JP | 2013-246492 A | 12/2013 |
| JP | 2014-021794 A | 2/2014 |
| JP | 2014-075655 A | 4/2014 |
| WO | 99/65188 | 12/1999 |
| WO | 99/65202 | 12/1999 |

* cited by examiner

INITIALIZATION PROCESS EXECUTING UNIT
MANAGEMENT DATABASE (A) | PRINTER IDENTIFICATION INFORMATION | PROCESS UNIT IDENTIFICATION INFORMATION | PROCESS UNIT IDENTIFICATION INFORMATION | · · · ·

CONFIGURATION SETTINGS DATABASE (B) | PRINTER IDENTIFICATION INFORMATION | PROCESS UNIT IDENTIFICATION INFORMATION | INITIALIZATION SETTINGS FILE |

FIG. 15

PRINT CONTROL SYSTEM AND PRINT CONTROL METHOD

CROSS REFERENCE TO RELATED APPLICATION(S)

This application is a continuation of, and claims priority under 35 U.S.C. § 120 on, U.S. application Ser. No. 14/885,658, filed Oct. 16, 2015, which is a continuation of U.S. application Ser. No. 14/527,614, filed Oct. 29, 2014, now U.S. Pat. No. 9,195,418, which claims priority under 35 U.S.C. § 119 on, Japanese Application nos. 2013-227827 filed Nov. 1, 2013, 2013-230942 filed Nov. 7, 2013, 2013-230944 filed Nov. 7, 2013 and 2013-271885 filed Dec. 27, 2013. The content of each such related application is incorporated by reference herein in its entirety.

BACKGROUND

1. Technical Field

The present invention relates to a print control system and a print control method.

2. Related Art

A print control system that prints on print media with a printing device and produces receipts as controlled by a print control device is described, for example, in JP-A-2011-108097. In this type of print control system, the printing device and the print control device are connected over a network and communicate through the network.

When building a system in which a printing device and a print control device communicate over a network such as described in JP-A-2011-108097, the system must maintain compatibility between the communication protocols configurations in which a printing device with a printing function and the print control device communicate over the network.

SUMMARY

With consideration for the foregoing problem, the present invention makes a print control system in which a printer and a print control device communicate over a network compatible with a configuration in which multiple devices communicate over a network.

One aspect of the invention is a print control system including: a print control device that sends print data; and a printer remote from the print control device and that communicates with the print control device through a communication path using asynchronous duplex communication, receives the print data sent by the print control device through the communication path, and prints based on the received print data.

This configuration makes a print control system a system that is compatible with a configuration in which a printer and a print control device communicate over a network.

In a print control system according to another aspect of the invention, the printer may include a print unit that prints, a communication control unit that communicates with the print control device through the communication path, and a print control unit that controls the print unit based on (i.e., in accordance with) control data received through the communication path.

This configuration makes the print control system a system that is compatible with configurations in which a printer and a print control device communicate through a network.

In a print control system according to another aspect of the invention, the printer may include a print unit that prints, a communication control unit that communicates with the print control device through the communication path, and a print control unit that controls the print unit based on control data received through the communication path.

Thus comprised, the printer establishes a communication path based on (i.e., in accordance with) address information representing the address of the print control device stored by the storage unit.

In a print control system according to another aspect of the invention, the communication control unit of the printer establishes the communication path when the power turns on, i.e., when the printer power turns on.

This configuration reduces the burden on the user.

In a print control system according to another aspect of the invention, the printer includes a print unit that prints, a print control unit that controls the print unit based on the print data, and a function unit that executes a process based on control data that is different from the print data; and the print control device includes a print data processing unit that processes the print data, a process unit that processes the control data, a connection unit that communicates the print data and the control data through the communication path, and a communication management unit that sends the control data received from the printer to the process unit.

This configuration makes a print control system a system that is compatible with a configuration in which a printer and a print control device communicate over a network.

In a print control system according to another aspect of the invention, the print control unit of the printer generates print result data representing the result of printing by the print unit; the printer adds identification information of the print control unit to the print result data, and sends the print result data including the identification information of the print control unit to the print control device; and the communication management unit of the print control device sends the received print result data to the print data processing unit based on the identification information of the print control unit.

Thus comprised, print result data is sent to the print data processing unit, and the print data processing unit can execute a process based on the print result data.

In a print control system according to another aspect of the invention, the control data includes identification information of the function unit; and the communication management unit of the print control device sends the control data to the process unit based on the identification information of the function unit.

This configuration can send configuration control data to the process unit, and the process unit can execute a process based on the control data.

In a print control system according to another aspect of the invention, the function unit is a status management unit that manages the status of the printer; and the control data is data representing the status of the printer.

Thus comprised, the process unit can execute a process appropriate to the status of the printer.

In a print control system according to another aspect of the invention, the function unit is a reading unit that read media; and the control data is read data acquired by the reading unit.

Thus comprised, the process unit can execute a process appropriate to the read result from the reading unit.

In a print control system according to another aspect of the invention, the printer includes a print unit that prints, a print control unit that controls the print unit based on the print data, and a communication unit that communicates the print data through the communication path; and the print control device includes a connection unit that communicates the print data through the communication path, a print data processing unit that processes the print data, and a communication management unit that applies an initialization process to the print data processing unit to enable processing the print data.

This configuration makes a print control system a system that is compatible with a configuration in which a printer and a print control device communicate over a network.

In a print control system according to another aspect of the invention, the communication management unit of the print control device causes the print data processing unit to run the initialization process when the communication path to the printer is established.

Thus comprised, the print data processing unit can be made to run the initialization process when the communication path opens.

In a print control system according to another aspect of the invention, the print control device has a control device storage unit that stores configuration data set in the print data processing unit; and the print data processing unit of the print control device executes an initialization process based on the configuration data stored in the control device storage unit.

In this aspect of the invention, the print data processing unit can execute an initialization process corresponding to the connected printer based on the configuration data.

In a print control system according to another aspect of the invention, the printer includes a print unit that prints, a print control unit that controls the print unit based on the print data, a communication control unit that establishes the communication path, and a configuration control unit that sends a request requesting settings related to printing when the communication path is established, and executes a configuration process based on configuration control data received in response to the request; and the print control device includes a print data processing unit that generates the print data, a configuration process unit that generates the configuration control data according to the request received from the printer, and a connection unit that sends the print data generated by the print data processing unit and the configuration control data generated by the configuration process unit to the printer through the communication path.

This configuration makes a print control system a system that is compatible with a configuration in which a printer and a print control device communicate over a network.

In a print control system according to another aspect of the invention, the communication control unit of the printer establishes the communication path with the print control device when the printer power turns on.

This configuration reduces the burden on the user.

In a print control system according to another aspect of the invention, the request contains identification information that identifies the printer; the print control device has a control device storage unit that stores the identification information relationally to configuration data including values to set; and the configuration process unit of the print control device acquires the configuration data related to the identification information contained in the request when a request is received, and generates the configuration control data based on the acquired configuration data.

Thus comprised, the print control device acquires configuration data and generates configuration control data based on the printer identification information contained in the request and information stored in the storage unit.

A print control system according to another aspect of the invention further includes a management device including a management device control unit that generates a change command including the identification information and instructing changing content of the configuration data related to the identification information, and a communication connection unit that sends the change command generated by the management control unit to the print control device.

In this aspect of the invention, the management device can change the content of the configuration data.

In a print control system according to another aspect of the invention, the asynchronous duplex communication is WebSocket communication.

Thus comprised, the print control device can send data to the printer at any time and cause the printer to execute a process based on the data without receiving a request from the printer.

Another aspect of the invention is a print control method including: a print control device sending print data; and a printer communicating with the print control device through a communication path using asynchronous duplex communication, receiving the print data sent by the print control device through the communication path, and printing based on the received print data.

This aspect of the invention makes a print control system in which a print control device and a recording device communicate over a network compatible with a configuration in which multiple devices communicate over a network.

Objects of the present invention are also met in printer having: a print mechanism configured to print on print media; a communication controller configured to connect to a local area network, and to access a global area network through a network communication controller; wherein the communication controller is further configured to establish an asynchronous duplex communication channel that is a logical communication path with a print control device on the global area network, and to receive print data from the print control device as pushed data without sending a request to the print control device; and a print controller configured to control the print mechanism based on the received print data.

Preferably, the print control device and the printer are in a server-client relationship, and the asynchronous duplex communication channel uses WebSocket communication.

Further preferably, the communication controller initiates the establishing of the asynchronous duplex communication with the print control device by sending a message including a domain name of the print control device from the printer to the print control device in the absence of any user-input instruction from a user interface of the printer, or message from the print control device.

Preferably, the printer described further includes a storage configured to store address information including a domain name of the print control device; wherein the communication controller is further configured to establish the asynchronous duplex communication channel with the print control device based on the domain name stored in the storage.

Additionally, the communication controller may further be configured to establish the asynchronous duplex communication channel in response to power to the printer turning on.

In an embodiment, the printer further includes an electronic data processor configured to execute a process based on control data, wherein control data is different from print data.

In this case, the print controller is further configured to generate print result data indicating a result of printing by the print mechanism; and the electronic data processor is further configured to send the print result data plus identification information identifying the print controller that generated the print result data to the print control device.

Additionally, the control data may include identification information identifying the electronic data processor.

Further preferably, the electronic data processor is a status manager configured to manage a status of the printer; and the control data relates to the status of the printer.

In embodiments, the electronic data processor may be a reader configured to read media; and the control data is read data acquired by the reader.

The printer may further include a configuration controller configured to send a request for print settings related to printing when the asynchronous duplex communication channel is established, and to execute a configuration process based on configuration control data received in response to the request for print settings.

In this case, the communication controller may be further configured to establish the asynchronous duplex communication channel with the print control device in response to power to the printer turning on.

Objects of the present invention are also met in a printer control method, using a processor, the control method including: connecting to a local area network, and accessing a global area network through a network communication controller; establishing an asynchronous duplex communication channel that is a logical communication path with a print control device on the global area network; receiving print data from the print control device as pushed data without sending a request to the print control device; and printing based on the received print data.

Objects of the present invention are also met in a print control system including: a print control device configured to connect to a global area network; a network communication controller configured to connect a local area network to the global area network; a printer configured to connect to the local area network, and to access the global area network through the network communication controller; wherein: the printer is further configured to establish an asynchronous duplex communication channel that is a logical communication path with the print control device on the global area network; the print control device is further configured to send print data to the printer as push data without receiving a request from the printer; and the printer is further configured to receive and print the print data from the print control device.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 15 illustrates the data structure of the databases.

DESCRIPTION OF EMBODIMENTS

Preferred embodiments of the present invention are described below with reference to the accompanying figures.

Embodiment 1

Figure 1:
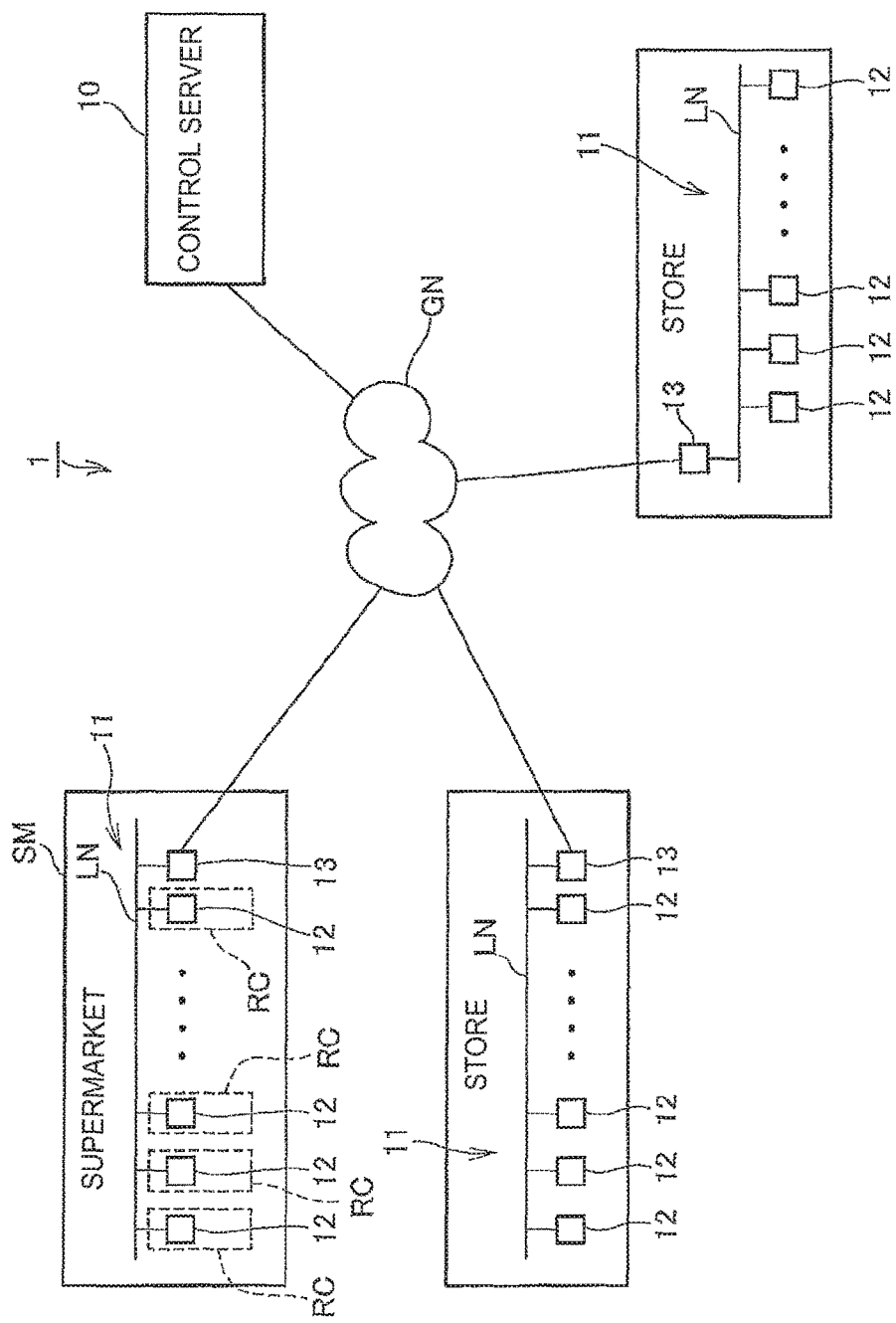
FIG. 1 shows the configuration of a print control system according to a first embodiment of the invention.

FIG. 1 shows the configuration of a print control system (print control system) according to the first embodiment of the invention.

As shown in FIG. 1, the print control system 1 includes a control server 10 (print control device), and a plurality of store systems 11 that connect to the control server 10 through the Internet or other network GN.

The store system 11 is a system that is used in retail businesses such as supermarkets, convenience stores, department stores, and restaurants. The store system 11 has functions including at least producing receipts for customers of the business.

The store system 11 has one or a plurality of printers 12 that have a print function for printing on print media and can produce receipts. The printers 12 connects to a local area network LN deployed in the business. A network communication controller 13 configured with a communication device such as a network router or modem connects to the local area network LN. Each printer 12 accesses the network GN through the network communication controller 13.

For example, in the store system 11 of supermarket SM, plural checkout counters RC are set up, and a printer 12 is installed at each checkout counter RC. In supermarket SM, the printers 12 in the store system 11 are connected to the local area network LN, and access the network GN through the network communication controller 13.

In the print control system 1, according to this embodiment of the invention, the printer 12 of the store system 11 establishes a connection with the control server 10, and communicates with the control server 10. The printer 12 executes a process related to printing as controlled by the control server 10.

Figure 2:
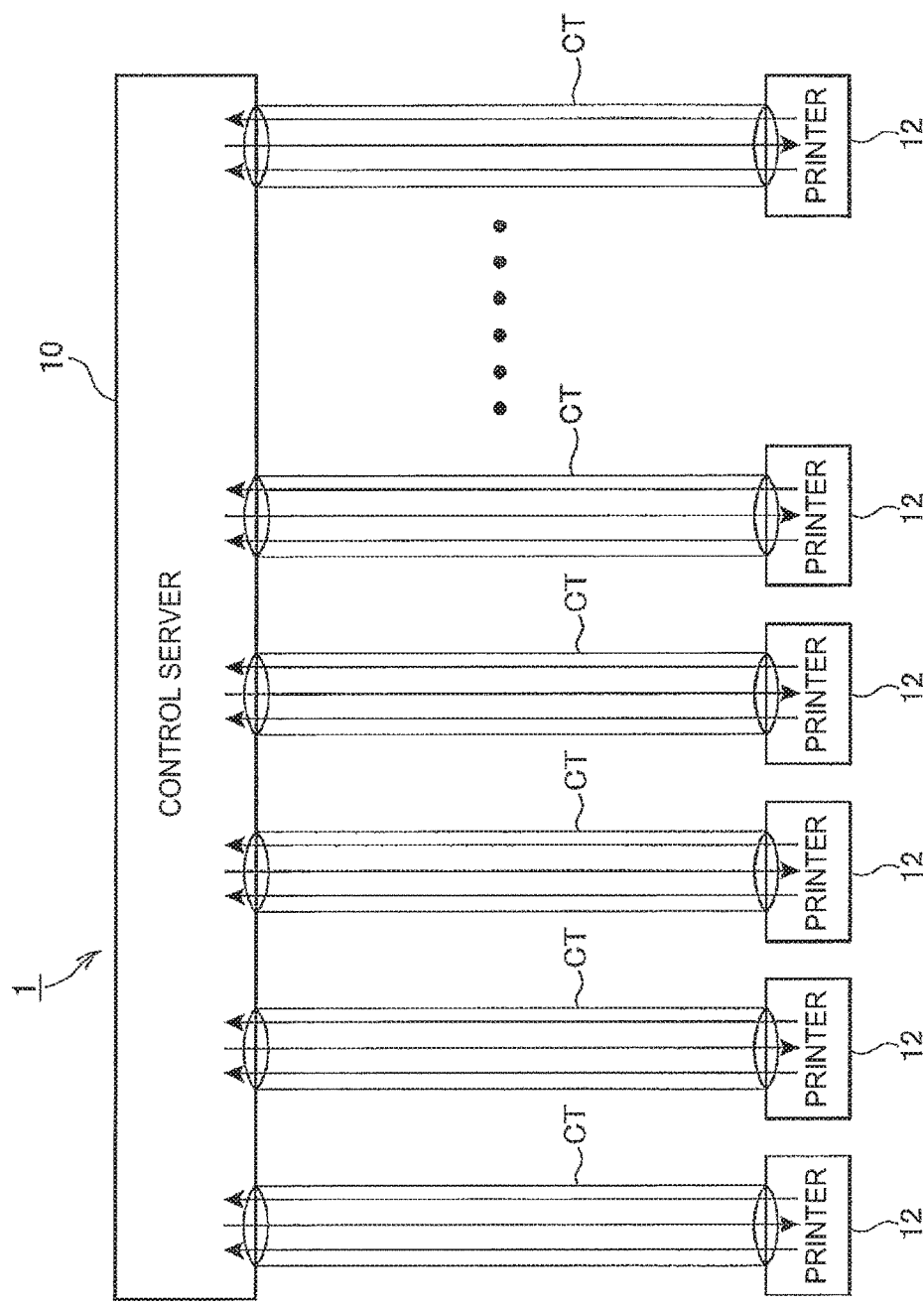
FIG. 2 illustrates communication paths opened between a control server and a printer.

FIG. 2 illustrates the communication paths established between the control server 10 and the printers 12 in the print control system 1.

As shown in FIG. 2, a WebSocket connection CT (communication path) is established between the control server 10 and the printers 12 in each store system 11.

WebSocket is a communication standard that enables asynchronous duplex communication between servers and clients connected through a network. After a server and client open a WebSocket connection CT using the WebSocket standard, sending and receiving data between the devices uses the WebSocket protocol by means of the connection. It is therefore not necessary to establish a connection every time data is transmitted.

The WebSocket connection CT is a logical communication path for sending and receiving data according to the WebSocket protocol and procedures between the printer 12 and control server 10 connected through the WebSocket connection CT. Therefore, once the printer 12 and control server 10 handshake and establish a WebSocket connection CT, the printer 12 and control server 10 can exchange data asynchronously over the WebSocket connection CT. More specifically, the control server 10 can send data to the printer 12 through the WebSocket connection CT at any time, and the printer 12 can send data to the control server 10 through the WebSocket connection CT.

WebSocket communication is asynchronous, duplex communication between the printer 12 and control server 10 through the WebSocket connection CT based on the WebSocket protocol and methods.

Once the WebSocket connection CT is established, the printer 12 and control server 10 can communicate through an asynchronous, duplex communication link. Therefore, after establishing a WebSocket connection CT, the control server 10 can push data to the printer 12 by WebSocket communication through the WebSocket connection CT without receiving a request from the printer 12 operating as a client device. As a result, the control server 10 can control the printer 12 and print on print media at any time. Likewise, the printer 12 can push data to the control server 10 through the WebSocket connection CT at any time.

In this embodiment of the invention the control server 10 is a client server in a so-called cloud system. More specifically, the control server 10 can process data, execute a specific operation (e.g. process) when triggered by a request from the printer 12, and send data based on the result of the process through the WebSocket connection CT to the printer 12.

In FIG. 2 the control server 10 is represented as a single block, but this does not mean that the control server 10 is configured from a single server. For example, the control server 10 may be configured from (e.g. embodied by) multiple servers, or it may be a server rendered by a function of a specific system. More specifically, the control server 10 may be any configuration that can execute the processes described herein.

The control server 10 and printer 12 communicate according to the WebSocket communication protocol in this embodiment. The invention is not limited to WebSocket communication, however, and other configurations capable of asynchronous, duplex communication in a manner similar to that of WebSocket communication may be used.

The print control system 1 thus has multiple (such as a 1000) printers 12 each capable of printing communicatively connected through a WebSocket connection CT to a control server 10.

Such a configuration enables the following.

The control server 10 can collect, manage, and analyze information based on data received from the plural printers 12 connected to the store system 11. Valuable information can therefore be collected. The collected information can be used as "big data."

Constructing a store system 11 can also be made easier and cheaper. More specifically, the printer 12 is connected to the control server 10 by a WebSocket connection CT in this print control system 1. A service provided by the control server 10 enables the control server 10 to control the printers 12 so that they execute processes under control of the control server 10. An administrator constructing a store system 11 can therefore build the store system 11 by simply installing the printers 12 where desired, and then connecting the printers 12 to the network GN. This enables controlling the printers 12 to execute a desired process, such as a process related to producing receipts, using the service provided by the control server 10.

In addition, because each of the printers 12 in the different store systems 11 are individually connected to the control server 10 by a respective WebSocket connection CT, the control server 10 can individually manage the plural printers 12 in the plural store systems 11. The control server 10 can also individually operate (e.g. control) the plural printers 12 in the plural store systems 11.

Figure 3:
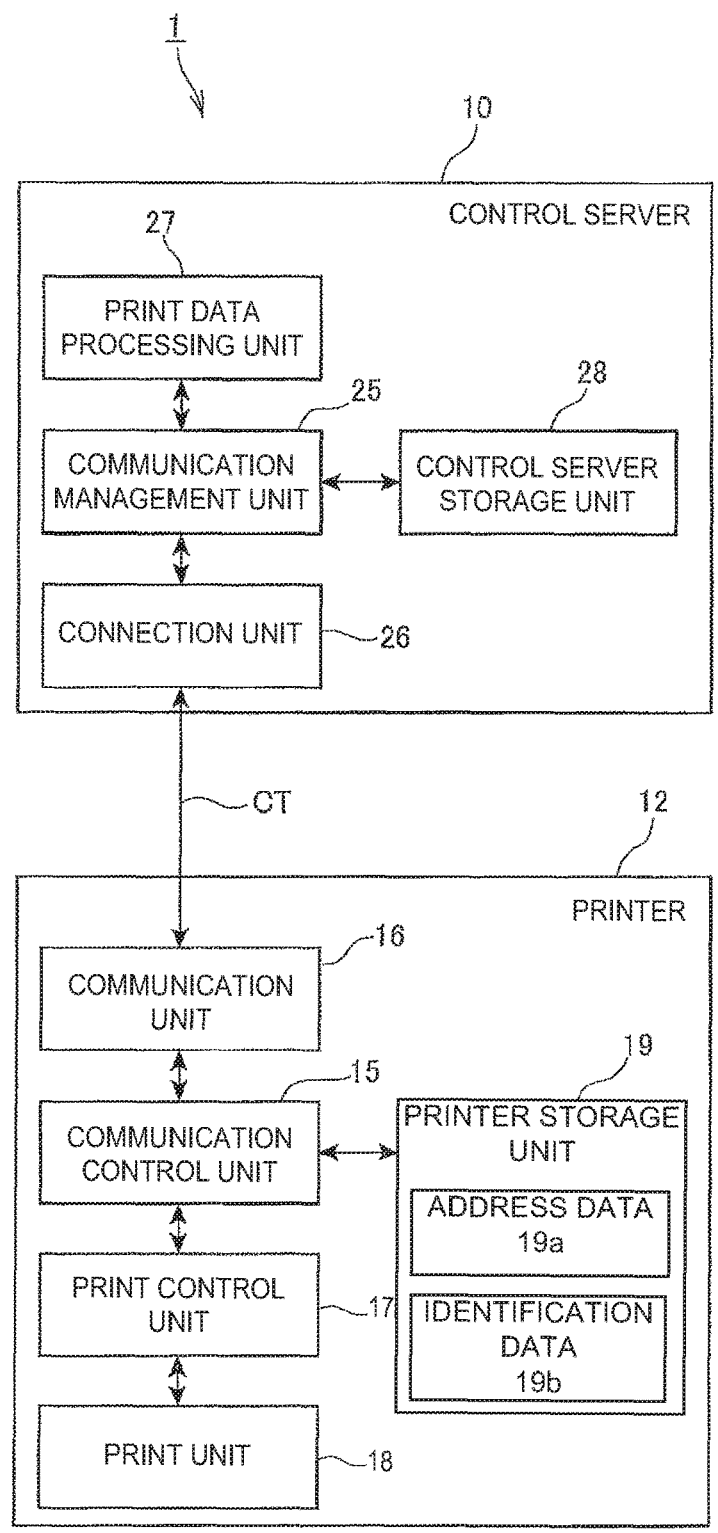
FIG. 3 is a block diagram showing the functional configuration of the control server and printer.

FIG. 3 is a block diagram showing the functional configuration of the printer 12 and control server 10 in this embodiment of the invention.

As shown in FIG. 3, the printer 12 has a communication control unit 15, a communication unit 16, a print control unit 17, a print unit 18, and a printer storage unit 19.

The functions of the communication control unit 15, communication unit 16, and print control unit 17 are described below.

The print unit 18 includes mechanisms related to printing, such as a print mechanism that prints on print media, a conveyance mechanism that conveys the print media, and a cutting mechanism that cuts the print media, and control boards (or control logic) related to controlling the mechanisms.

The printer storage unit 19 is nonvolatile memory, and stores data. Address data 19a and identification data 19b, further described below, are stored in the printer storage unit 19.

The control server 10 includes a communication management unit 25, a connection unit 26, a print data processing unit 27, and a control server storage unit 28.

The functions of the communication management unit 25, connection unit 26, and print data processing unit 27 are described further below.

The control server storage unit 28 is nonvolatile memory, and stores data. A connection management database is stored in the control server storage unit 28 as described further below.

Note that FIG. 3 shows the relationship between the control server 10 and one printer 12 connected to the control server 10. When plural printers 12 are connected to the control server 10, the control server 10 has the same number of WebSocket interfaces as there are printers 12, establishes a separate WebSocket connection CT with each printer 12, and communicates by WebSocket protocol through the connections to each printer 12.

The operation of the printer 12 and control server 10 when the printer 12 power turns on is described next.

Figure 4:
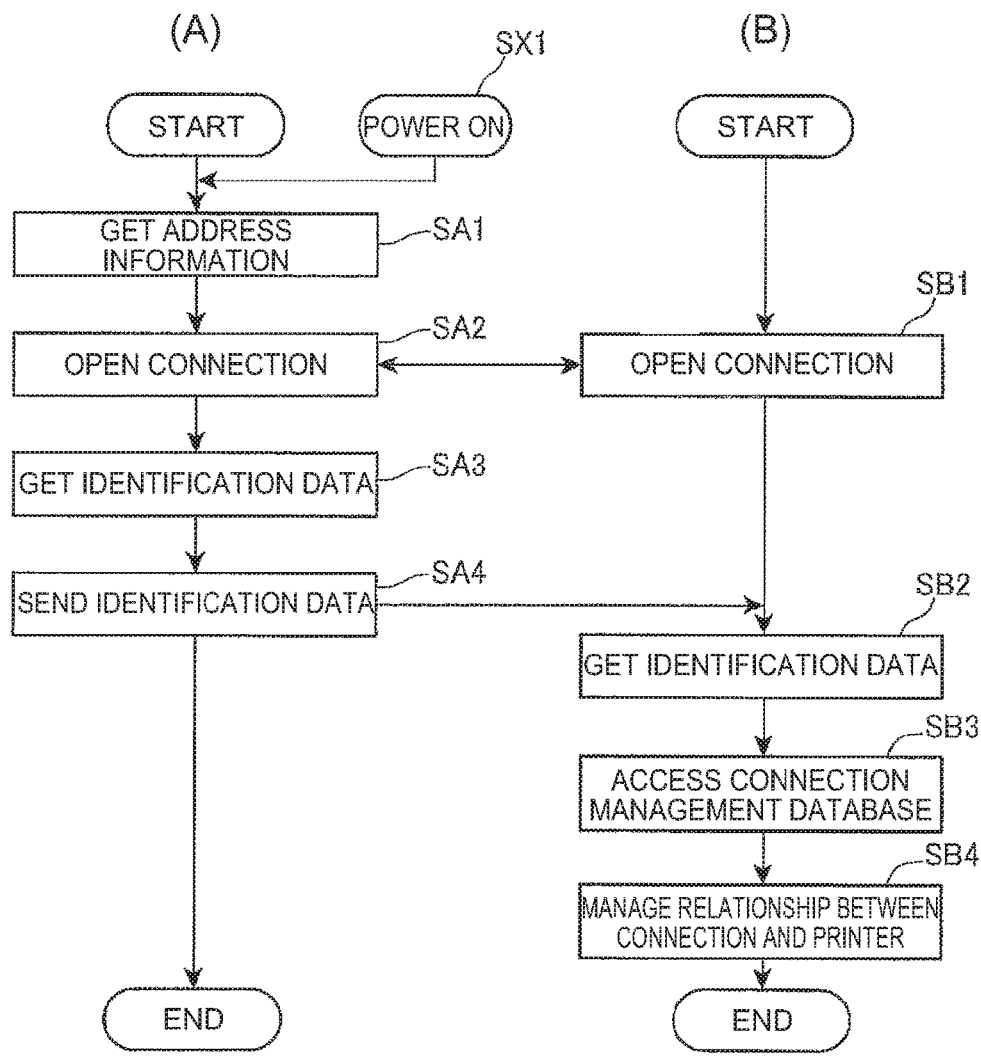
FIG. 4 is a flow chart showing the operation of the control server and printer.

FIG. 4 is a flow chart showing the operation of a printer 12 and the control server 10 after the printer 12 powers on (i.e., turns on). Column (A) shows the operation of the printer 12, and column (B) shows the operation of the control server 10.

Note that in the configuration described below, the printer 12 is connected to the local area network LN of the store system 11 in which it is used, and can access the network GN.

The trigger of the process shown in the flow chart in FIG. 4 is not limited to the power turning on. For example, this process may be triggered by the printer 12 connecting to the network GN and enabling communication, or by an instruction from a user.

The functions of the function blocks of the communication control unit 15 and print control unit 17 of the printer 12, and the print data processing unit 27 of the control server 10, are rendered as described below.

Optionally, these function blocks may be software modules, software objects, or physical data processing objects. A software object is an instance created in an object-oriented programming language, and more specifically is a software function block defined by a set of data and methods. The function of a particular function block is rendered by calling (invoking) a method of the function block.

The functions of these function blocks may also be rendered by the CPU or other hardware assets reading and running an application. Configurations in which the function of a single function block is rendered by a single application, configurations in which the function of plural function blocks are rendered by a single application, and configurations in which the function of a single function block is rendered by plural applications, are possible.

In other words, the function blocks represent functions as conceptual blocks, and do not limit themselves to any specific application or hardware construction.

As shown in FIG. 4, column (A) and FIG. 3, when a printer 12's power turns on (step SX1), the communication control unit 15 accesses the printer storage unit 19 and gets the address data 19a stored in the printer storage unit 19 (step SA1).

The address data 19a is address data including, for example, the domain name, IP address, path name and/or port information of the control server 10 to access, when the communication path is established, e.g., when the WebSocket connection CT is established according to the WebSocket protocol. When opening a WebSocket connection CT according to the WebSocket protocol, the client (the printer 12 in this example) handshakes with the server (the control server 10 in this example) using HTTP (Hypertext Transfer Protocol). When handshaking, the client sends a message containing the domain name of the control server 10, and the address data 19a is data representing this domain name.

Next, the communication control unit 15 establishes a WebSocket connection CT with the communication management unit 25 of the control server 10 through the communication unit 16 and the connection unit 26 based on the domain name in the address data 19a (step SA2, step SB1). In other words, the printer 12 according to this embodiment establishes a WebSocket connection CT when triggered by its power turning on without receiving an instruction from its user or a request from the control server 10.

When the WebSocket connection CT is established, the printer 12 and control server 10 can communicate through an asynchronous, duplex communication link. More specifically, the control server 10 can send data from the control server 10 to the printer 12 through the WebSocket connection CT without receiving a request from the printer 12 operating as a client.

The communication unit 16 and connection unit 26 are WebSocket interfaces enabling data communication based on the WebSocket protocol and methods. These function blocks may be instantiated in a software program using a WebSocket Socket.IO library, for example.

If the communication control unit 15 sends data to the communication unit 16, the data can be sent through the WebSocket connection CT according to the WebSocket protocol.

More specifically, the communication unit 16 has functions for processing data that is received according to WebSocket, and sending the data through the WebSocket connection CT based on WebSocket methods. The communication unit 16 also has functions for processing data that is received through the WebSocket connection CT according to WebSocket, and sending to the communication control unit 15. The connection unit 26 is similarly configured.

Next, the communication control unit 15 of the printer 12 accesses the printer storage unit 19 and gets the identification data 19b stored in the printer storage unit 19 (step SA3). The identification data 19b is data representing the identification information of the printer 12 (referred to below as printer identification information). The printer identification information uniquely identifies the printer 12 and may be, for example, a serial number assigned to the printer 12 when the printer 12 was manufactured.

Next, the communication control unit 15 sends the identification data 19b over the WebSocket connection CT (step SA4).

As shown in FIG. 4, column (B) and FIG. 3, the communication management unit 25 of the control server 10 receives the identification data 19b (step SB2).

Next, the communication management unit 25 accesses the connection management database stored in the control server storage unit 28 (step SB3). The connection management database is a database that stores (e.g., relationally stores) information on established WebSocket connections CT. For example, the connection management database may store a connection identification ID (e.g., an ID number) identifying each established WebSocket connection CT, and the printer identification information of the printer associated with each WebSocket Connection CT.

Next, the communication management unit 25 creates one record in the connection management database. The communication management unit 25 then stores in the created record the connection ID number of the WebSocket connection CT established in step SB1 related to the printer identification information in the identification data 19b received in step SB2 identification information (step SB4). That is, the communication management unit 25 stores, in the created record, the connection ID number of the WebSocket connection CT relationally to the printer identification information contained in the identification data 19b. Note that when a WebSocket connection CT is opened, the communication management unit 25 generates a connection ID number for that connection that is different from the connection ID numbers of any other WebSocket connection CT that was already opened. The relationship between the WebSocket connections CT and printers 12 is managed by the communication management unit 25 through the process of step SB4.

The communication control unit 15 of the printer 12 thus opens a WebSocket connection CT when triggered by its power turning on without receiving a user instruction or a request from the control server 10. Thus comprised, the user does not need to perform a complicated operation to open a WebSocket connection CT. Special knowledge is also not needed to open a WebSocket connection CT. After the power turns on, the printer 12 can also be automatically enabled to execute processes controlled by the control server 10.

The operation of the printer 12 and control server 10 when the printer 12 prints on the print medium as controlled by the control server 10 is described next.

Figure 5:
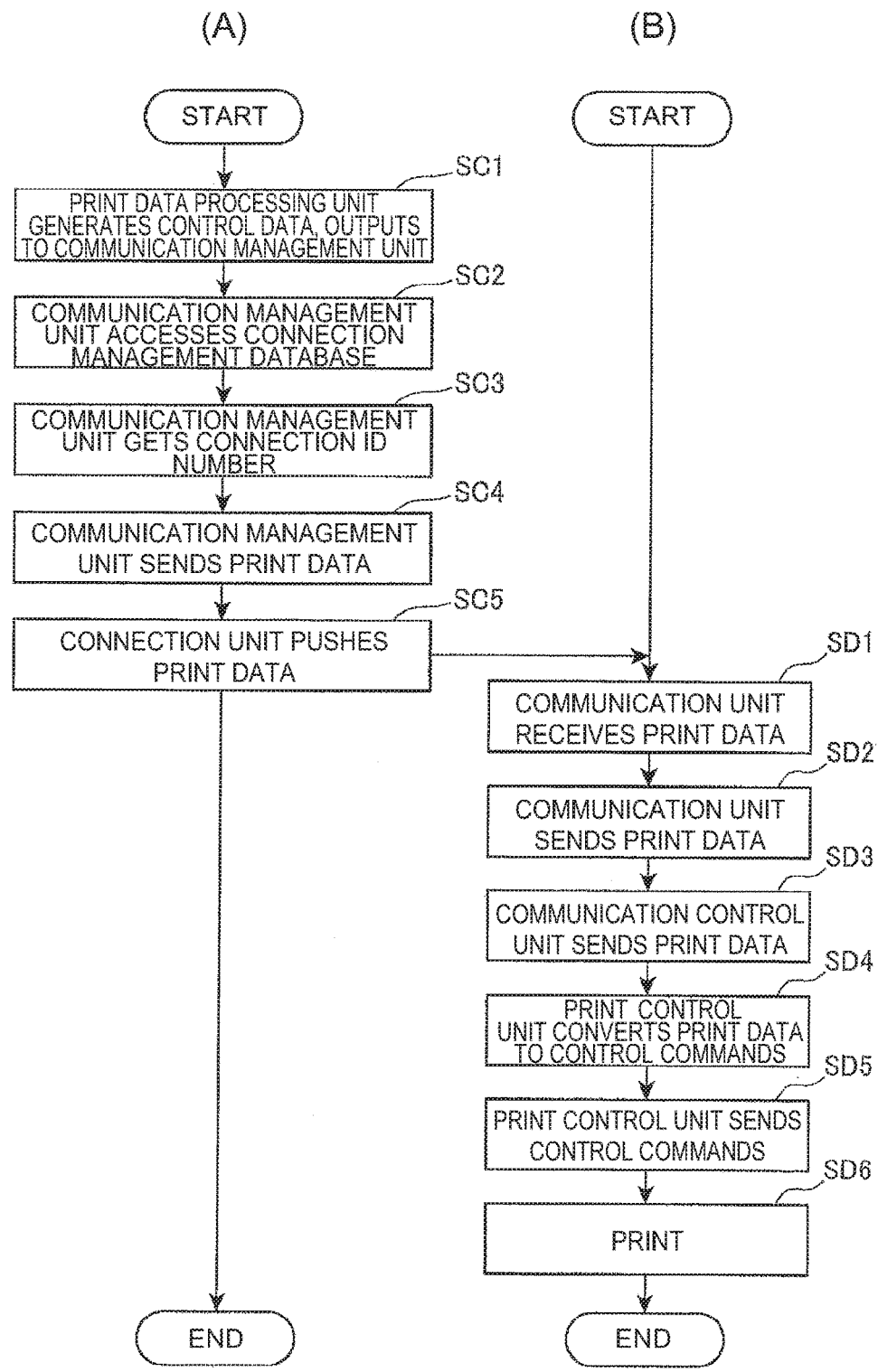
FIG. 5 is a flow chart showing the operation of the control server and printer.

FIG. 5 is a flow chart showing the operation of the printer 12 and the control server 10 when the printer 12 prints on the print medium, column (A) showing the operation of the control server 10, and column (B) showing the operation of the printer 12.

As shown in FIG. 5, column (A) and FIG. 3, the print data processing unit 27 generates and sends print data for controlling the printer 12 to the communication management unit 25 (step SC1). The print data includes the information to be printed by the printer 12 in preferably an XML format, and may include image data to print and information identifying the location of the image on the print medium. The printer identification information of the printer 12 to use for printing is also written as a tag in the print data.

Next, the communication management unit 25 accesses the connection management database stored in the control server storage unit 28 (step SC2). Next, the communication management unit 25 retrieves the connection ID number of the WebSocket connection CT related to the printer identification information from the connection management database using the printer identification information contained in the received print data as the search key (step SC3). The connection ID number acquired here is preferably the connection ID number of the WebSocket connection CT established with the target printer 12 that is to print (i.e., that is to be controlled).

Next in step SC4, the communication management unit 25 sends the print data to the connection unit 26 corresponding to the WebSocket connection CT related to the connection ID number acquired in step SC3.

Next, the connection unit 26 pushes the received print data through the WebSocket connection CT by WebSocket communication (step SC5).

As shown in FIG. 5, column (B) and FIG. 3, the printer's communication unit 16 then receives the print data by WebSocket communication (step SD1).

Next, the communication unit 16 sends the received print data to the communication control unit 15 (step SD2).

Next, the communication control unit 15 sends the received print data to the print control unit 17 (step SD3).

Next, the print control unit 17 converts the received print data to control commands in the command language of the print unit 18 (step SD4). In other words, the print control unit 17 converts the print data, which is preferably an XML file, to control commands that can be interpreted by the control board of the print unit 18.

Next, the print control unit 17 sends the control commands to the print unit 18 (step SD5).

Next, the print unit 18 prints on the print medium based on the control commands (step SD6).

The control server 10 in this embodiment of the invention can thus control a printer 12 to print when there is a need for the printer 12 to print without necessitating or receiving a request from the printer 12. Exemplary events that may cause the printer 12 to print are events in which predefined conditions are met, such as when an instruction is received from the user, or a request is received from a communicatively connected external device.

This configuration enables starting printing faster than in a configuration in which the printer 12 intermittently sends a request to the control server 10, and the control server 10 sends print data in response to such a request when there is a need to print with the printer 12. Consumption of resources can also be suppressed compared with a configuration in which the control server 10 queues responses to requests.

As described above, the print control system 1 according to this embodiment has a control server 10 (print control device) that transmits print data, and a printer 12 having a print unit 18 that prints based on the print data, a communication control unit 15 that communicates with the control server 10 by a WebSocket connection CT enabling asynchronous duplex communication, and a print control unit 17 that controls the print unit 18 based on the print data sent by the control server 10 over the WebSocket connection CT.

Thus comprised, the control server 10 and printer 12 communicate in the print control system 1 through a communication path (WebSocket connection CT) enabling asynchronous duplex communication. As a result, the control server 10 can send data to the printer 12 through the WebSocket connection CT at any time, and the printer 12 can send data to the control server 10 at any time. Therefore, when a trigger causing the printer 12 to print occurs, the control server 10 sends print data through the WebSocket connection CT to the printer 12, and the printer 12 can be controlled to print based on (i.e., in accordance with) the print data. The printer 12 can also send data, including data representing the print result, to the control server 10 as needed, and cause the control server 10 to execute a process based on the data. This configuration can more specifically make the print control system 1 compatible with (or similar in function with) configurations in which the printer 12 and control server 10 communicate over a local network, for example.

In this embodiment of the invention asynchronous duplex communication is WebSocket communication.

The configuration of the invention enables the control server 10 and printer 12 to communicate by asynchronous duplex communication using WebSocket communication.

Furthermore, the printer 12 in this embodiment has a printer storage unit 19 that stores address information representing the address of the control server 10, and the communication control unit 15 of the printer 12 opens a WebSocket connection CT with the control server 10 based on the address information stored in the printer storage unit 19.

This configuration of the invention enables the printer 12 to establish a WebSocket connection CT based on address data indicating the address information of the control server 10 stored in the printer storage unit 19.

The communication control unit 15 in this embodiment of the invention also establishes a WebSocket connection CT when the power turns on.

Because a WebSocket connection CT is automatically established by the printer 12 when the power turns on in this configuration, the user does not need to do anything to open a WebSocket connection CT, and after the power turns on, the printer 12 can be controlled by communication of data through the WebSocket connection CT.

The printer storage unit 19 of the printer 12 in this embodiment stores the identification information of the printer 12 (identification data 19b), and the communication control unit 15 outputs the printer 12 identification information when the WebSocket connection CT is established.

The control server 10 in this configuration can identify a particular printer 12 based on the received printer 12 identification information, and the control server 10 can manage the established WebSocket connections CT using this identification information.

Embodiment 2

A second embodiment of the invention is described next.

Figure 6:
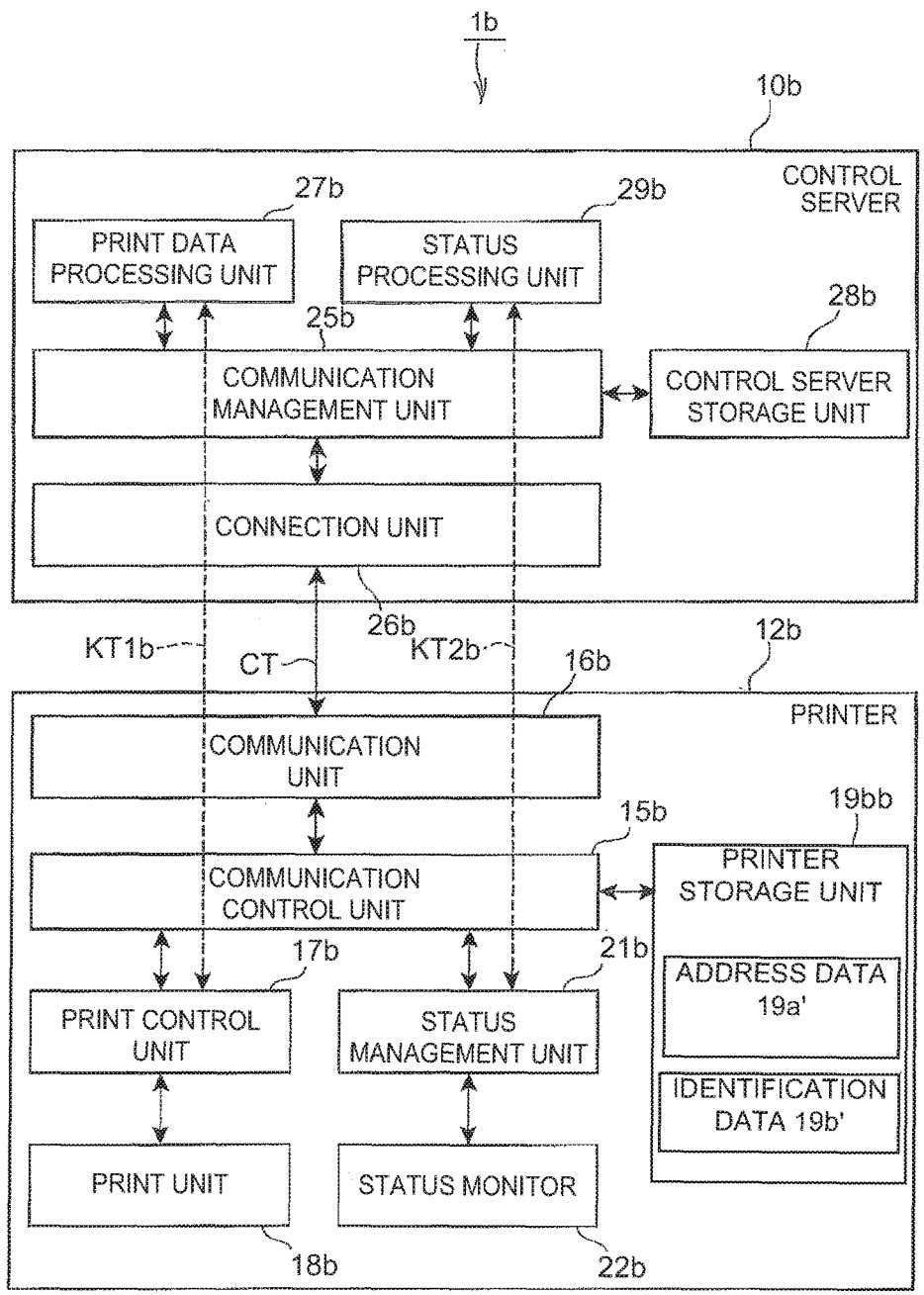
FIG. 6 is a block diagram showing the functional configuration of a control server and printer according to a second embodiment of the invention.

With reference to FIG. 6, the print control system 1b according to the second embodiment of the invention includes a control server 10b (print control device), and at least one printer 12b. The control server 10b and printer 12b connect over a network GN (not shown) in a similar manner as the control server 10 and printer 12 connect in the first embodiment. A communication path established between the control server 10b and printer 12b is established in the same way as the communication path is established between the control server 10 and printer 12 in the first embodiment and illustrated in FIG. 2.

FIG. 6 is a block diagram showing the functional configuration of the printer 12b and the control server 10b.

As shown in FIG. 6, the printer 12b has a communication control unit 15b, a communication unit 16b, a print control unit 17b, a print unit 18b, a status management unit 21b (function unit), a status monitor 22b, and a printer storage unit 19bb.

The functions of the communication control unit 15b, communication unit 16b, print control unit 17b, and the status management unit 21b are described further below.

The print unit 18b includes mechanisms related to printing, such as a print mechanism that prints on print media, a conveyance mechanism that conveys the print media, and a cutting mechanism that cuts the print media, and control boards related to controlling the mechanisms.

The status monitor 22b includes sensors or devices such as a sensor that detects if the printer 12b cover is open or closed, and sensors for detecting the status of the printer 12b, such as if an error occurs, and outputs the result to the status management unit 21b.

The printer storage unit 19bb is nonvolatile memory, and stores data. Address data 19a' (similar to address data 19a of the first embodiment), identification data 19b' (similar of the identification data 19b of the first embodiment), and a function unit management database as further described below are stored in the printer storage unit 19bb.

As shown in FIG. 6, the control server 10b includes a communication management unit 25b, a print data processing unit 27b, a status processing unit 29b (process unit), and a control server storage unit 28b.

The functions of the communication management unit 25b, connection unit 26b, print data processing unit 27b, and status processing unit 29b are described below.

The control server storage unit 28b has nonvolatile memory, and stores data. A connection management database and a process unit management database are stored in the control server storage unit 28b and described below.

The control server 10b has two process units, the print data processing unit 27b and status processing unit 29b, as process units with separate functions.

FIG. 6 shows the relationship between the control server 10b and one printer 12b connected to the control server 10b. When plural printers 12b are connected to the control server 10b, the control server 10b has the same number of WebSocket interfaces as there are printers 12b, establishes a unique WebSocket connection CT with each printer 12b, and independently communicates by WebSocket protocol through the connections to each printer 12b.

The operation of the printer 12b and control server 10b when the printer 12's power turns on is described next.

Figure 7:
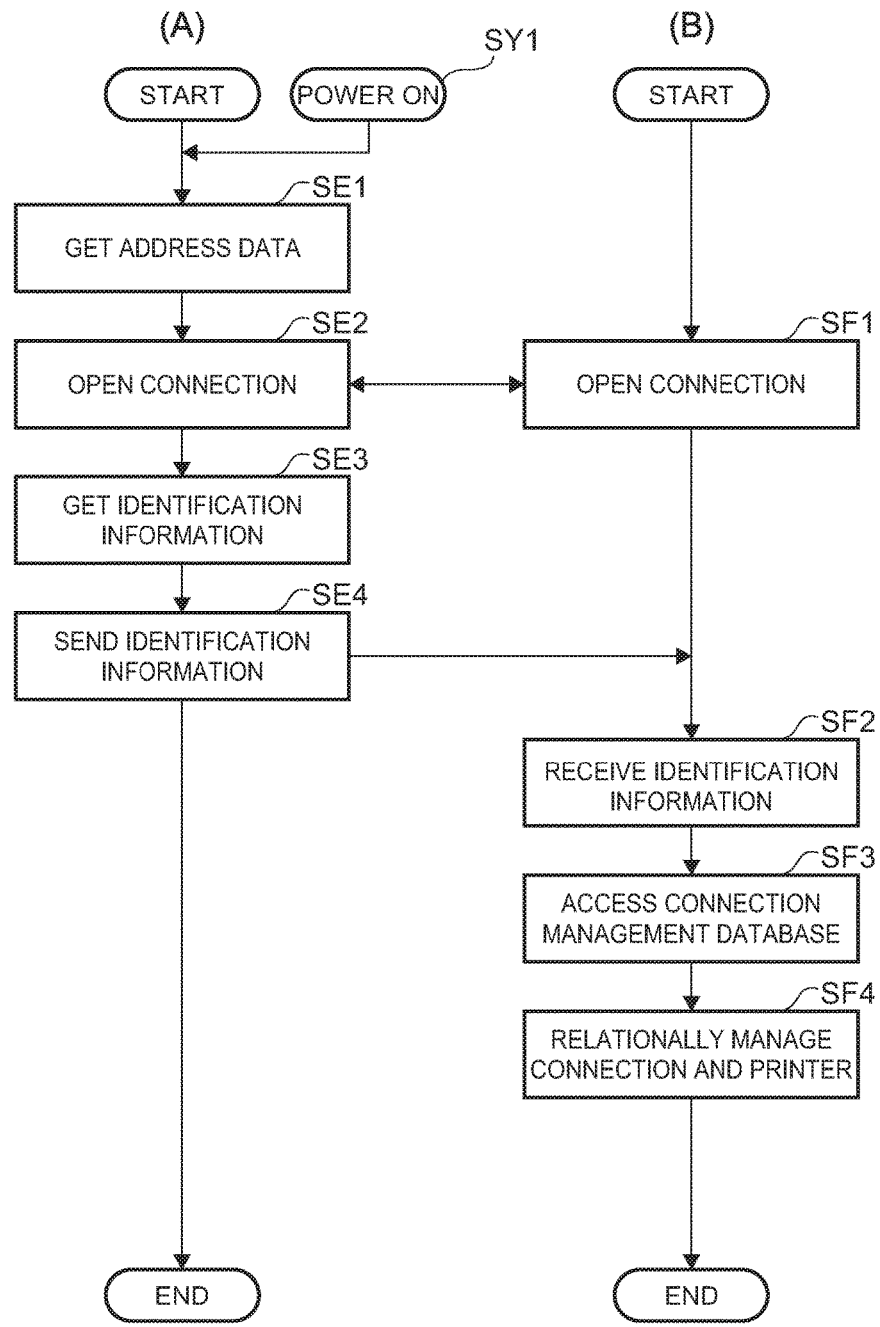
FIG. 7 is a flow chart showing the operation of the control server and printer.

FIG. 7 is a flow chart showing the operation of the printer 12b and the control server 10b when power to the printer 12b is turned on, with column (A) showing the operation of the printer 12b and column (B) showing the operation of the control server 10b.

The trigger of the process shown in the flow chart in FIG. 7 is not limited to the power turning on. For example, this process may be triggered by the printer 12b connecting to the network GN and enabling communication, or by an instruction from a user.

Note that in the configuration described below, the printer 12b is connected to the local area network LN of the store system 11 in which it is used, and can access the network GN.

The functions of the function blocks of the communication control unit 15b, print control unit 17b, and status management unit 21b of the printer 12b, and the communication management unit 25b, the print data processing unit 27b, and the status processing unit 29b of the control server 10b, are rendered as described below.

Optionally, these function blocks may be software objects. A software object may be an instance created in an object-oriented programming language. More generally, the function blocks may be software function block defined by a set of data and methods/functions. In the case of an object-oriented programming language, the function of a particular function block may be rendered by calling (invoking) a method of the function block. Alternatively, function blocks may be implemented as circuit blocks or data processing units.

That is, the functions of these function blocks may also be rendered by a CPU or other hardware assets reading and running an application. Configurations in which the function of a single function block is rendered by a single application, configurations in which the function of plural function blocks are rendered by a single application, and configurations in which the function of a single function block is rendered by plural applications, are possible.

In other words, the function blocks represent functions as conceptual blocks, and do not mean any specific application or hardware construction.

As shown in FIG. 6 and FIG. 7, column (A), when the printer 12b's power turns on (step SY1), the communication control unit 15b accesses the printer storage unit 19b b and gets the address data 19a stored in the printer storage unit 19b b (step SE1).

When opening a WebSocket connection CT according to the WebSocket protocol, the client (the printer 12b in this example) handshakes with the server (the control server 10b in this example) using HTTP (Hypertext Transfer Protocol). When handshaking, the client sends a message to the server, and the address data 19a' is data representing the address to which the message is sent.

Next, the communication control unit 15b establishes a WebSocket connection CT with the communication management unit 25b of the control server 10b through the communication unit 16b based on the domain name in the address data 19a' (step SE2, step SF1). In other words, the printer 12b according to this embodiment establishes a WebSocket connection CT when triggered by the power turning on without receiving an instruction from the user or a request from the control server 10b.

The communication unit 16b and connection unit 26b are WebSocket interfaces enabling data communication based on the WebSocket protocol and methods. In the case of an object-oriented programming language, these function blocks may be instantiated using a WebSocket Socket.IO library, for example.

If the communication control unit 15b sends data to the communication unit 16b, the data can be sent through the WebSocket connection CT according to the WebSocket protocol.

More specifically, the communication unit 16b has functions for processing data that is received from the communication control unit 15b according to WebSocket, and sending the data through the WebSocket connection CT based on WebSocket methods. The communication unit 16b also has functions for processing data that is received through the WebSocket connection CT according to WebSocket, and sending to the communication control unit 15b. The connection unit 26b is similarly configured.

When the WebSocket connection CT is established, the printer 12 and control server 10 can communicate through an asynchronous, duplex communication link. More specifically, the control server 10 can send data from the control server 10 to the printer 12 through the WebSocket connection CT without receiving a request from the printer 12 operating as a client.

Next, the communication control unit 15b of the printer 12b accesses the printer storage unit 19bb and gets the identification data 19b' stored in the printer storage unit 19bb (step SE3). The identification data 19b' is data representing the identification information of the printer 12b (referred to below as printer identification information). The printer identification information is, for example, a serial number assigned to the printer 12b when the printer 12b is manufactured.

Next, the communication control unit 15b sends the identification data 19b' over the WebSocket connection CT (step SE4).

As shown in FIG. 6 and FIG. 7, column (B), the communication management unit 25b of the control server 10b receives the identification data 19b' (step SF2).

Next, the communication management unit 25b accesses the connection management database stored in the control server storage unit 28b (step SF3). The connection management database is a database relationally storing for the one or plural WebSocket connections CT that were established a connection ID number identifying the WebSocket connection CT and the printer identification information of the printer.

Next, the communication management unit 25b creates one record in the connection management database. The communication management unit 25b then stores in the created record the connection ID number of the WebSocket connection CT established in step SF1 related to the printer identification information in the identification data 19b' received in step SF2 identification information (step SF4). That is, the communication management unit 25b stores, in the created record, the connection ID number of the WebSocket connection CT relationally to the printer identification information contained in the identification data 19b. Note that when a WebSocket connection CT is opened, the communication management unit 25b generates a connection ID number for that connection that is different from the connection ID numbers of any other WebSocket connection CT that was already opened. The relationship between the WebSocket connections CT and printers 12b is managed by the process of step SF4.

A WebSocket connection CT is thus established when triggered by the power turning on without receiving a user instruction or a request from the control server 10b. Thus comprised, the user does not need to perform a complicated operation to open a WebSocket connection CT. Special knowledge is also not needed to open a WebSocket connection CT. After the power turns on, the printer 12b can also be automatically quickly enabled to execute processes as controlled by the control server 10b.

A WebSocket connection CT is thus established between the communication unit 16b and connection unit 26b. As a result, a first function unit communication path KT1b based on the WebSocket connection CT is established between the print control unit 17b of the printer 12b, and the print data processing unit 27b of the control server 10b. The first function unit communication path KT1b is a logical communication path that is configured including the WebSocket connection CT. The print control unit 17b and print data processing unit 27b can communicate by asynchronous duplex communication through the first function unit communication path KT1b. Asynchronous duplex communication through the first function unit communication path KT1b is described further below.

When the WebSocket connection CT is established, a second function unit communication path KT2b based on the WebSocket connection CT is established between the status management unit 21b of the printer 12b and the status processing unit 29b of the control server 10b. The second function unit communication path KT2b is a logical communication path that is configured including the WebSocket connection CT. The status management unit 21b and status processing unit 29b can communicate by asynchronous duplex communication through the second function unit communication path KT2b. Asynchronous duplex communication through the second function unit communication path KT2b is described further below.

Note that below the logical communication paths through which data is communicated between the function units of the printer 12b and the process units (described below) of the control server 10b are collectively referred to as the function unit communication path KT below.

As shown in FIG. 6, the control server 10b has two function blocks, the print data processing unit 27b and status processing unit 29b. When not differentiating between the print data processing unit 27b and status processing unit 29b below, these function blocks are referred to as process units.

The printer 12b has two function blocks, the print control unit 17b and the status management unit 21b. When not differentiating between the print control unit 17b and the status management unit 21b below, these function blocks are referred to as function units.

In the print control system 1b according to this embodiment, process units and function units that are related to each other communicate by asynchronous duplex communication through the function unit communication path KT based on the WebSocket connection CT.

That a function unit and a process unit are related to each other means that data output by the process unit can be processed by the function unit, and data output by the function unit can be processed by the process unit. The process unit can therefore send data to the related function unit for processing by the function unit based on a function of the function unit. The function unit can likewise send data to the related process unit for processing by the process unit based on a function of the process unit.

In this embodiment, the print control unit 17*b* of the printer 12*b*, and the print data processing unit 27*b* of the control server 10*b*, are related to each other. The status management unit 21*b* of the printer 12*b* is also related to the status processing unit 29*b* of the control server 10*b*.

Asynchronous duplex communication through the function unit communication path KT based on the WebSocket connection CT between a process unit and a function unit is described below with reference to specific examples.

Communication between the print data processing unit 27*b* and the print data processing unit 27*b* after a WebSocket connection CT is established is described below using as an example the print data processing unit 27*b* sending data over the first function unit communication path KT1*b*, and the print control unit 17*b* processing the data and then returning the result over the first function unit communication path KT1*b*.

Figure 8:
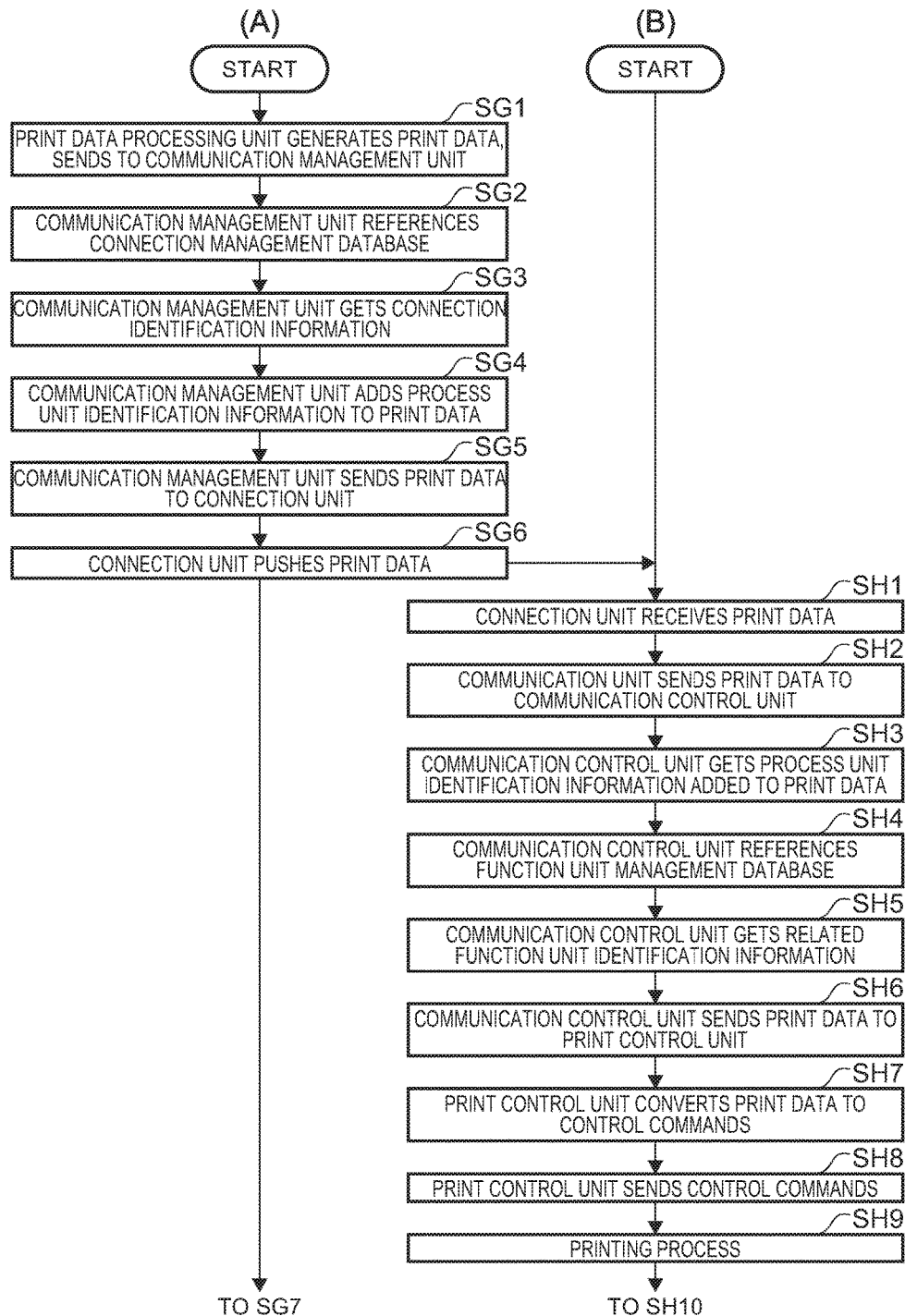
FIG. 8 is a flow chart showing the operation of the control server and printer.
Figure 9:
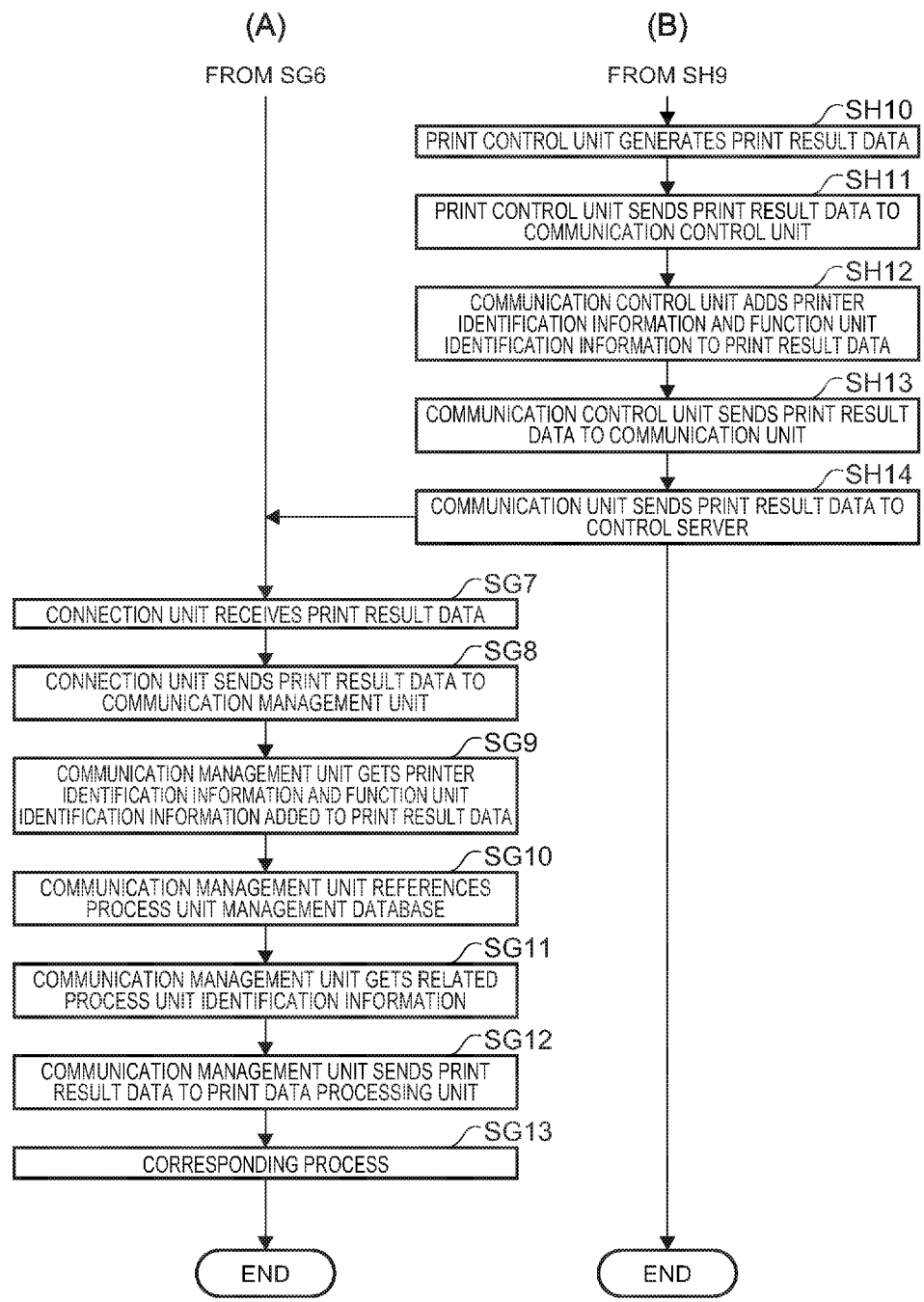
FIG. 9 is a flow chart showing the operation of the control server and printer.

FIG. 8 and FIG. 9 are flow charts showing the operation of the control server 10*b* and the printer 12*b* when printing on the print medium with the printer 12*b*, column (A) showing the operation of the control server 10*b*, and column (B) showing the operation of the printer 12*b*.

As shown in FIG. 8, column (A), the print data processing unit 27*b* generates and send print data (print data) as controlled by the control server 10*b* to the communication management unit 25*b* (step SG1). The print data is an XML (eXtensible Markup Language) format containing the information to be printed by the printer 12*b*. The print data includes the information to be printed by the printer 12*b*, including image data and information identifying the location of the image on the print medium.

The printer identification information of the printer 12*b* to be used for printing is also written in the print data.

The print data processing unit 27*b* manages the printer identification information of the printers 12*b* connected to the control server 10*b*, and adds the printer identification information of the printer 12*b* to be used for printing to the print data.

The printer identification information may be written in an area where control information is carried, such as the header of the print data, or may be written in a specific tag in the print data.

The communication management unit 25*b* accesses the connection management database stored in the control server storage unit 28*b* (step SG2).

Next, the communication management unit 25*b* acquires the connection identification information of the WebSocket connection CT related to the received identification information from the connection management database using the printer identification information added to the received print data as the search key (step SG3). The connection identification information acquired here is the connection identification information of the WebSocket connection CT to the printer 12*b* that is to print.

Next, the communication management unit 25*b* adds the process unit identification information of the print data processing unit 27*b* to the received print data (step SG4).

The process unit identification information is the identification information of a process unit in the control server 10*b*, and a different value is assigned as the process unit identification information for each process unit. Different process unit identification information values are therefore assigned to the print data processing unit 27*b* and the status processing unit 29*b*.

The communication management unit 25*b* manages the process unit identification information of the process units that can send data to the communication management unit 25*b*. Therefore, when the communication management unit 25*b* receives data from one process unit, it acquires the process unit identification information of the one process unit and adds it to the received data.

Next, the communication management unit 25*b* sends the print data to the connection unit 26*b* related to the connection identification information acquired in step SG3 (step SG5).

Next, the connection unit 26*b* pushes the received print data through the WebSocket connection CT by WebSocket communication (step SG6).

As shown in FIG. 6 and FIG. 8, column (B), the communication unit 16*b* receives the print data by WebSocket (step SH1).

Next, the communication unit 16*b* sends the print data to the communication control unit 15*b* (step SH2).

The communication control unit 15*b* acquires the process unit identification information added to the print data (step SH3).

Next, the communication control unit 15*b* references the function unit management database (step SH4).

The function unit management database is a database that relationally stores the function unit identification information of the function unit and the process unit identification information of the related process unit for each function unit of the printer 12*b*.

The function unit identification information is identification information identifying a particular function unit of the printer 12*b*, and a different value is assigned as the function unit identification information for each function unit. A different value is therefore assigned as the function unit identification information of the print control unit 17*b* and the status management unit 21*b*. In this embodiment, the function unit identification information of the print control unit 17*b*, and the process unit identification information of the print data processing unit 27*b* are relationally stored in the function unit management database. The function unit identification information of the status management unit 21*b*, and the process unit identification information of the status processing unit 29*b* are also relationally stored (e.g. linked) in the function unit management database.

Next, the communication control unit 15*b* acquires the function unit identification information related to the process unit identification information from the function unit management database using the process unit identification information acquired in step SH3 as the search key (step SH5). In step SH5, the function unit identified by the function unit identification information acquired by the communication control unit 15*b* is the function unit related to the print data processing unit 27*b* that generated the print data received by the communication control unit 15*b*. In other words, the function unit identification information acquired by the communication control unit 15*b* in step SH5 is the function unit identification information identifying the function unit that sends the data.

Next, the communication control unit 15*b* sends the print data to the function unit identified by the function unit identification information acquired in step SH5 (the print control unit 17*b* in this example) (step SH6). Note that the communication control unit 15*b* manages the relationships between function unit identification information and function units.

Next, the print control unit 17*b* converts the received print data to control commands in the command language of the print unit 18*b* (step SH7). In other words, the print control unit 17*b* converts the print data, which is an XML file, to control commands that can be interpreted by the control board of the print unit 18*b*.

Next, the print control unit 17*b* sends the control commands to the print unit 18*b* (step SH8).

Next, the print unit 18*b* prints on the print medium based on the control commands (step SH9).

In this embodiment of the invention the print data processing unit 27*b* can send data to the print control unit 17*b* through the first function unit communication path KT1*b*.

The control server 10*b* in this embodiment of the invention can thus control a printer 12*b* to print when there is a need for the printer 12*b* to print without receiving a request from the printer 12*b*. Events that cause the printer 12*b* to print are events in which predefined conditions are met, such as when an instruction is received from the user, or a request is received from a communicatively connected external device.

This configuration also enables starting printing faster than in a configuration in which the printer 12*b* intermittently sends a request to the control server 10*b*, and the control server 10*b* sends print data in response to such a request when there is a need to print with the printer 12*b*. Consumption of resources can also be suppressed compared with a configuration in which the control server 10*b* queues responses to requests.

The process of sending data from the print data processing unit 27*b* to the print control unit 17*b* through the first function unit communication path KT1*b* is described above, but the same process can be used when sending data from the status processing unit 29*b* to the status management unit 21*b* through the second function unit communication path KT2*b*.

As shown in FIG. 6 and FIG. 9, column (B), the print control unit 17*b* of the printer 12*b* generates print result data (information about the print result, e.g. print data) based on the result of printing by the print unit 18*b* (step SH10). The print result data is data indicating, for example, if printing by the print unit 18*b* was successful or failed, and the cause of the failure if printing fails.

Next, the print control unit 17*b* sends the generated print result data to the communication control unit 15*b* (step SH11).

The communication control unit 15*b* adds the printer identification information and the function unit identification information of the print control unit 17*b* to the received print result data (step SH12).

Note that in step SH12 the communication control unit 15*b* references the identification data 19*b*' stored in the printer storage unit 19*b* b, and based on this data adds the printer identification information to the print result data.

The communication control unit 15*b* also manages the function unit identification information of the function units that can send data to the communication control unit 15*b*, and when data is received from a particular function unit can get the function unit identification information of the function unit.

Next, the communication control unit 15*b* sends the print result data to the communication unit 16*b* (step SH13).

The communication unit 16*b* then pushes the received print result data to the control server 10*b* through the WebSocket connection CT (step SH14).

As shown in FIG. 6 and FIG. 9, column (A), the connection unit 26*b* receives the print result data through the WebSocket connection CT (step SG7).

Next, the connection unit 26*b* sends the received print result data to the communication management unit 25*b* (step SG8).

The communication management unit 25*b* then gets the printer identification information and function unit identification information added to the print result data (step SG9).

Next, the communication management unit 25*b* references a process unit management database stored in the control server storage unit 28*b* (step SG10).

The process unit management database is a database that relationally stores a set of process unit identification information, printer identification information, and function unit identification information for each process unit of the control server 10*b*.

Next, the communication management unit 25*b* acquires the process unit identification information related to the printer identification information and function unit identification information from the process unit management database using the printer identification information and function unit identification information acquired in step SG9 as the search key (step SG11). In other words, the communication management unit 25*b* acquires a set of identification information containing the printer identification information and function unit identification information from the process unit management database using the printer identification information and function unit identification information acquired in step SG9 as the search key, and then acquires the process unit information related to the printer identification information and function unit identification information from this set of identification information. The process unit identification information acquired by the communication management unit 25*b* is the process unit identification information of the process unit that sent the data received by the communication management unit 25*b*.

Next, the communication management unit 25*b* sends the print result data to the process unit (print data processing unit 27*b* in this instance) identified by the process unit identification information acquired in step SG11 (step SG12). Note that the communication management unit 25*b* manages the process unit identification information for the process units that can send data.

Next, the print data processing unit 27*b* runs a corresponding process based on the received print result data (step SG13). For example, the print data processing unit 27*b* may display information representing the printing result on a display panel.

In this embodiment of the invention the print control unit 17*b* can send data to the print data processing unit 27*b* through the first function unit communication path KT1*b*.

In this embodiment, the communication control unit 15*b* of the printer 12*b* adds the function unit identification information of the print control unit 17*b* to the print result data generated by the print control unit 17*b*, and then sends the data to the control server 10*b*. When print result data is received, the communication management unit 25*b* of the control server 10*b* sends the data to the print data processing unit 27*b* based on the function unit identification information added to the received data. As a result, the print result data is sent to the print data processing unit 27*b*, and is appropriately processed by the print data processing unit 27*b*.

Communication between the status processing unit 29*b* of the control server 10*b* and the status management unit 21*b* of the printer 12*b* goes through the second function unit communication path KT2*b* after the WebSocket connection CT is established is described next using the status management unit 21*b* to send data, as an example.

Figure 10:
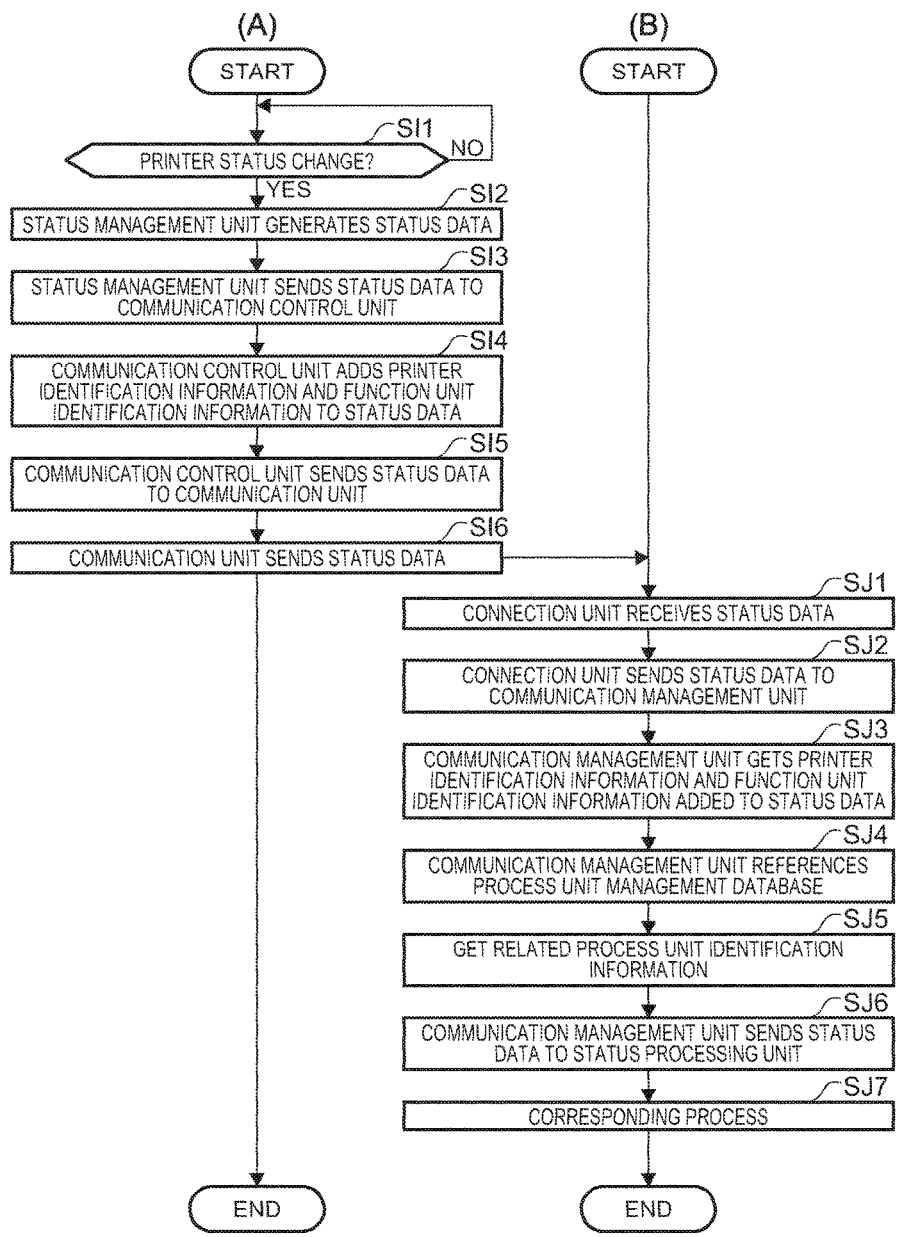
FIG. 10 is a flow chart showing the operation of the control server and printer.

FIG. 10 is a flow chart showing the operation of the printer 12b and the control server 10b when the status of the printer 12b changes, column (A) showing the operation of the printer 12b, and column (B) showing the operation of the control server 10b.

As shown in FIG. 6 and FIG. 10, column (A), the status management unit 21b of the printer 12b monitors the detection value of the status monitor 22b, and monitors whether or not the printer 12b status has changed (step SI1). In step SI1, the status management unit 21b monitors if the cover of the printer 12b changed from open to closed, or from closed to open, for example.

If a change in the status of the printer 12b is detected (step SI1:YES), the status management unit 21b generates status data (control data) representing information representing the status after the change in a specific format (step SI2).

Next, the status management unit 21b sends the resulting status data to the communication control unit 15b (step SI3).

Next, the communication control unit 15b adds the printer identification information and the function unit identification information of the status management unit 21b to the received status data (step SI4).

Note that in step SI4, the communication control unit 15b references the identification data 19b' stored in the printer storage unit 19b b, and based on this data adds printer identification information to the status data. The communication control unit 15b also manages the function unit identification information of the function units that can send data to the communication control unit 15b, and when data is received from one function unit, can acquire the function unit identification information of that one function unit.

Next, the communication control unit 15b sends the status data to the communication unit 16b (step SI5).

Next, the communication unit 16b sends the status data through the WebSocket connection CT to the control server 10b (step SI6).

As shown in FIG. 6 and FIG. 10, column (B), the connection unit 26b receives the status data through the WebSocket connection CT (step SJ1).

Next, the connection unit 26b sends the received status data to the communication management unit 25b (step SJ2).

The communication management unit 25b then acquires the printer identification information and function unit identification information added to the status data (step SJ3).

Next, the communication management unit 25b references the process unit management database stored in the control server storage unit 28b (step SJ4).

Next, the communication management control unit 25b searches the process unit management database using the printer identification information and function unit identification information acquired in step SJ3 as the search key, and retrieves the process unit identification information related to the identification information set (i.e., printer identification information and function unit identification information) (step SJ5). In other words, the communication management unit 25b searches the process unit management database using the printer identification information and function unit identification information acquired in step SJ3 as the search key, retrieves the set of identification information containing the printer identification information and function unit identification information, and then acquires the process unit information related to the printer identification information and function unit identification information from this set of identification information. The process unit identification information acquired at this time by the communication management unit 25b is the process unit identification information of the process unit that sent the data received by the communication management unit 25b.

Next, the communication management unit 25b sends the status data to the process unit identified by the process unit identification information acquired in step SJ5 (the status processing unit 29b in this example) (step SJ6). Note that the communication management unit 25b manages the process unit identification information for the process units that can send data.

The status processing unit 29b then runs a corresponding process based on the received status data (step SJ7). More specifically, the status processing unit 29b processes control data different from the print data.

In this embodiment of the invention the status management unit 21b can thus send data to the status processing unit 29b through the second function unit communication path KT2b.

The communication management unit 25b of the control server 10b in this embodiment of the invention can therefore change the process unit to which data received from the printer 12b is sent based on the printer identification information and function unit identification information contained in the received data. As a result, data sent by a function unit of the printer 12b is sent through the WebSocket connection CT to the control server 10b, and is then sent by the control server 10b to the appropriate process unit. The process unit that receives the data then runs the appropriate process.

Triggered by a change in the status of the printer 12b, the status management unit 21b of the printer 12b in this embodiment of the invention can send the status data to the status processing unit 29b through the WebSocket connection CT.

As described above, the print control system 1b according to this embodiment of the invention has a printer 12b and a control server 10b (print control device).

The printer 12b includes a print unit 18b that prints, a print control unit 17b that controls the print unit 18b based on print data, and a function unit (status management unit 21b) that runs a process based on control data (status data) that is different from the print data.

The control server 10b has a print control device that includes a print data processing unit 27b for processing print data; a process unit (status processing unit 29b) for processing control data; a connection unit 26b for opening a communication path (WebSocket connection CT) for asynchronous duplex communication with the printer 12b and communicating print data and control data through the WebSocket connection CT; and a communication management unit 25b that sends print data to the printer 12b, and sends control data (status data) received from the printer 12b to the process unit (status processing unit 29b).

Thus comprised, the control server 10b of the print control system 1b communicates with the printer 12b through the WebSocket connection CT by asynchronous duplex communication. As a result, the control server 10b can send data to the printer 12b through the WebSocket connection CT at any time. The printer 12b can also send data to the control server 10b through the WebSocket connection CT at any time. Therefore, the control server 10b can send print data to the printer 12b through the WebSocket connection CT when a trigger for sending print data and executing a process based on the print data occurs, and cause the printer 12b to run the process based on the print data. The printer 12b can also send data to the control server 10b as needed, and cause the control server 10b to run a process based on the data. The control server 10b therefore sends control data (status data)

different from the print data received from the printer 12b to a process unit (status processing unit 29b). The process unit can therefore execute a process based on the control data. In other words, the print control system 1b can be made compatible with a configuration in which the printer 12b and control server 10b communicate over a network.

In this embodiment of the invention, the communication management unit 25b adds the process unit identification information of the print data processing unit 27b to the print data, and outputs the print data with the added process unit identification information.

Thus comprised, the printer 12b that receives the print data can determine the function unit (the print control unit 17b in this example) that sent the print data based on the process unit identification information of the print data processing unit 27b that was added to the print data.

In this embodiment of the invention, the print control unit 17b of the printer 12b generates print result data based on the result of printing by the print unit 18b. The printer 12b adds the function unit identification information of the print control unit 17b to the print result data, and sends the print result data with the function unit identification information of the print control unit 17b to the control server 10b. The communication management unit 25b of the control server 10b then sends the received print result data to the print data processing unit 27b based on the function unit identification information of the print control unit 17b.

When the print result data is received from the printer 12b, the control server 10b thus comprised sends the print result data to the print data processing unit 27b related to the print control unit 17b based on the function unit identification information of the print control unit 17b added to the print result data. As a result, the print result data generated by the print control unit 17b is sent to the print data processing unit 27b, and the print data processing unit 27b executes a corresponding process based on the print result data.

In this embodiment of the invention, when status data is received, the communication management unit 25b of the control server 10b sends the status data to the status processing unit 29b based on the function unit identification information contained in the status data.

Thus comprised, the status data is sent to the status processing unit 29b, and a corresponding process is executed by the status processing unit 29b based on the status data.

Application of Embodiment 2

A print control system 1b in which a printer 12b with a print function is connected to the control server 10b according to the second embodiment of the invention is described above.

The invention can also be applied to a print control system 1b (print control system) in which a multifunction device having a reading unit that reads media is connected as a function unit to the control server 10b in addition to the print control unit 17b. The reading unit in this example controls a scanner connected to the multifunction device, and receives the read result from the scanner.

The operation of the print control system 1b in this application is described below.

A process unit corresponding to the function unit of the multifunction device is also instantiated on the control server 10b. A process unit (scanner process unit below) corresponding to the reading unit that is one function unit of the multifunction device is therefore instantiated on the control server 10b.

When media is read by the scanner, the reading unit generates data (control data, referred to below as read data) representing the read result based on the result of reading. Next, the read unit sends the read data to the communication control unit 15b.

The communication control unit 15b adds the printer identification information and the function unit identification information of the reading unit to the read data. Next, the communication control unit 15b sends the read data to the communication unit 16b.

The communication unit 16b then sends the read data through the WebSocket connection CT to the control server 10b.

The communication management unit 25b of the control server 10b receives the read data through the connection unit 26b. Next, the communication management unit 25b appropriately references the databases based on the printer identification information, and function unit identification information added to the read data, and identifies the scanner process unit as the process unit to which to send the read data. Next, the communication management unit 25b sends the read data to the scanner process unit.

The scanner process unit then runs an appropriate process based on the received read data.

As described above, when a multifunction device is connected to the control server 10b in the invention, data sent from the multifunction device to the control server 10b is sent to the corresponding process unit of the control server 10b, and a process appropriate to the data is executed by the process unit.

Embodiment 3

A third embodiment of the invention is described next.

Figure 11:
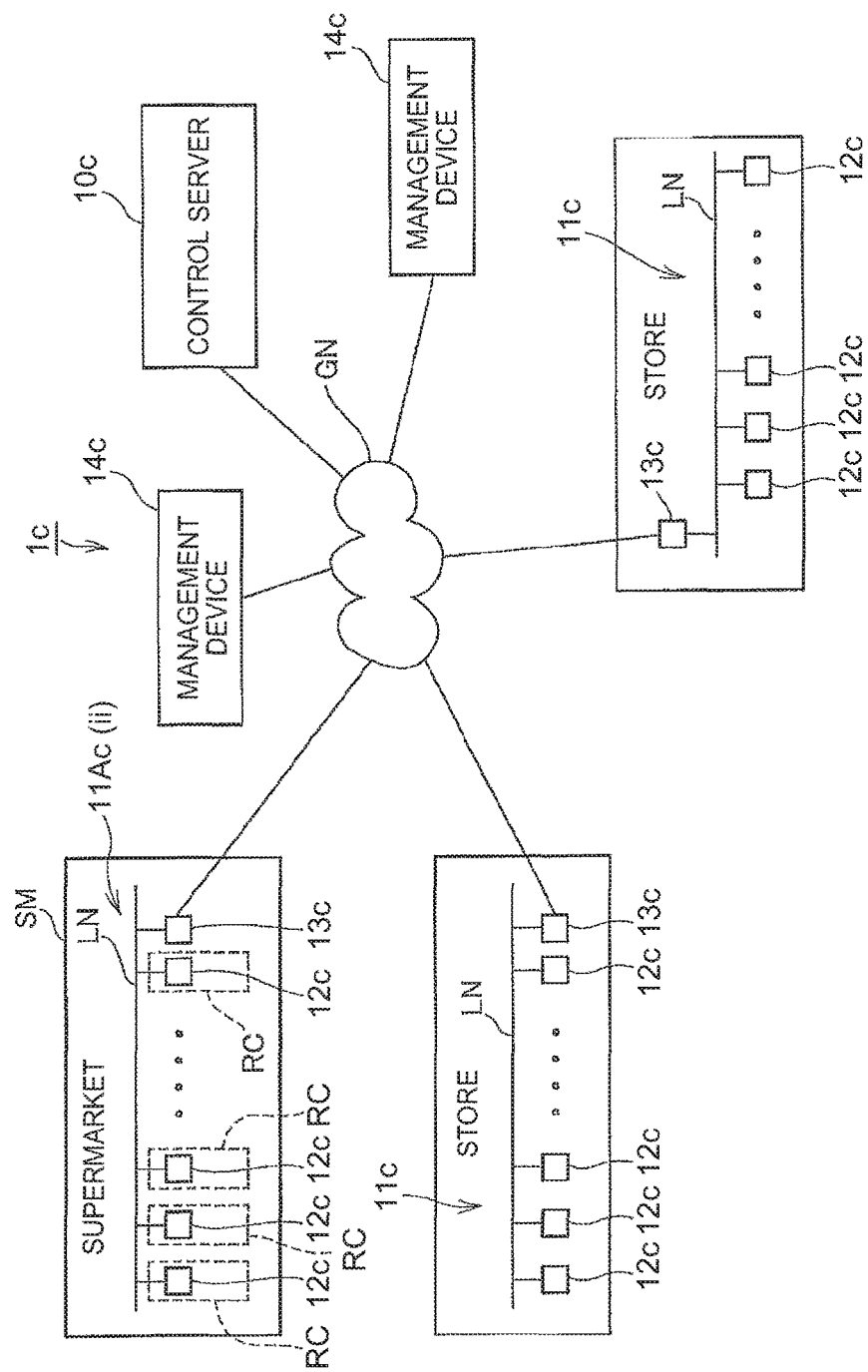
FIG. 11 shows the configuration of a print control system according to a third embodiment of the invention.

FIG. 11 shows the configuration of a print control system 1c according to this embodiment of the invention.

As shown in FIG. 11, the print control system 1c includes a control server 10c (print control device), and a plurality of store systems 11c and 11Ac (ii) that connect to the control server 10c through the Internet or other network GN. A plurality of management devices 14c are also connected to the network GN. For ease of discussion, both store systems 11c and 11Ac (ii) are collectively identified as "store systems 11c" or "store system 11c" unless otherwise specified. Similarly, store system 11Ac (ii) may also be identified as "store system 11Ac", unless otherwise specified.

The store system 11c is a system that is used in retail businesses such as supermarkets, convenience stores, department stores, and restaurants. The store system 11c has functions including at least producing receipts for customers of the business.

The store system 11c has one or a plurality of printers 12c that have a print function for printing on print media and can produce receipts. The printer 12c connects to a local area network LN deployed in the business. A network communication controller 13c configured with a communication device such as a network router or modem connects to the local area network LN. The printer 12c accesses the network GN through the network communication controller 13c.

For example, the store system 11Ac in this example is a system used in a supermarket SM. Plural checkout counters RC are set up in the supermarket SM, and a printer 12c is installed at each checkout counter RC. The printers 12c in the store system 11Ac are connected to the local area network LN, and access the network GN through the network communication controller 13c.

In the print control system 1c according to this embodiment of the invention the printer 12c of the store system 11c establishes a connection with the control server 10c, and communicates with the control server 10c. The printer 12c executes a process related to printing as controlled by the control server 10c.

The management device 14c manages the one or plural store systems 11c as described below. For example, the management device 14c may be installed in the headquarters of a company that operates multiple stores, and manage the store systems 11c deployed in multiple stores associated with the corporate group. As described below, the management device 14c can control specific printers 12c in the managed store systems 11c, and command the specific printers 12c to print.

Figure 12:
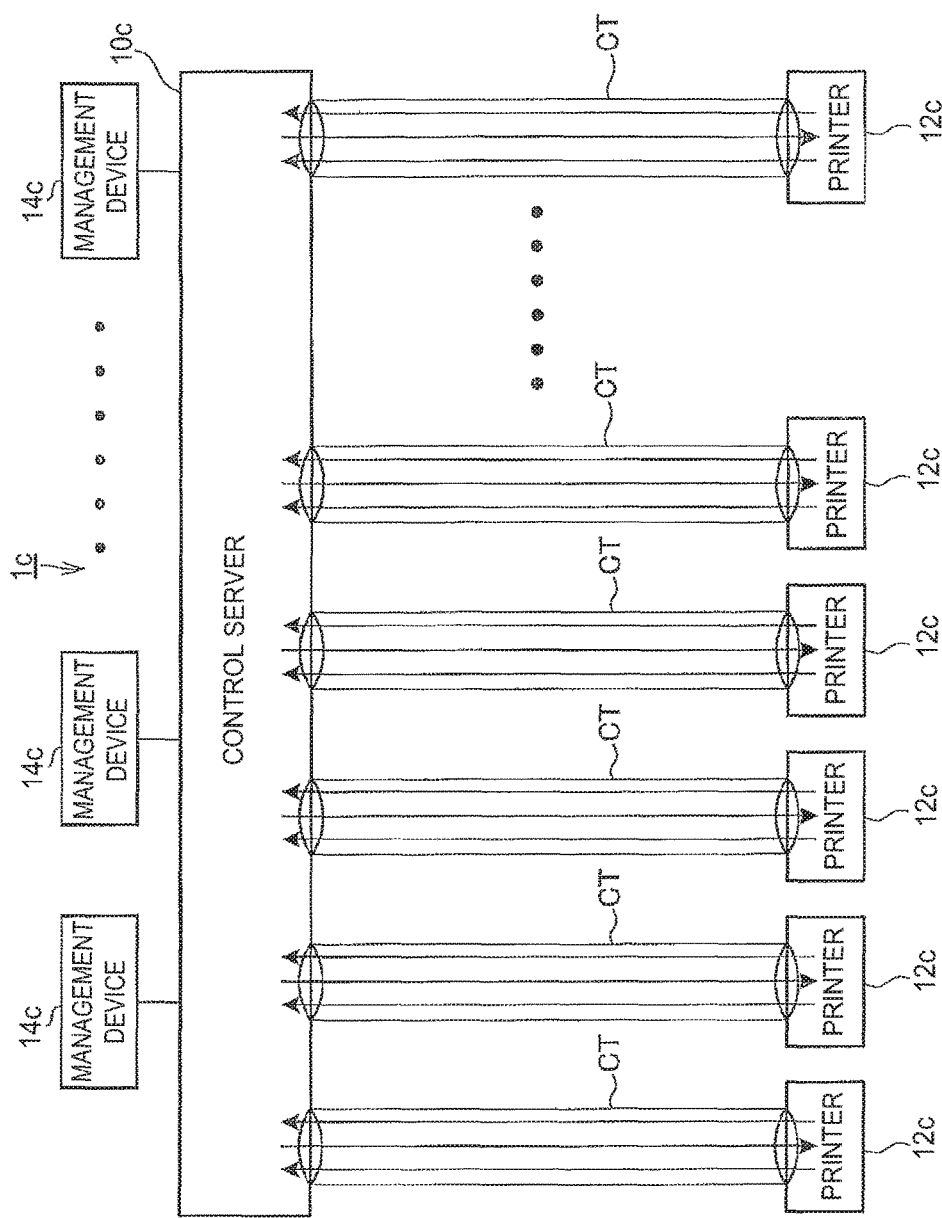
FIG. 12 illustrates communication paths opened between a control server, a printer, and an management device.

FIG. 12 illustrates the communication paths established between the control server 10c and the printers 12c in the print control system 1c.

As shown in FIG. 12, a WebSocket connection CT (communication path) is established between the control server 10c and the printers 12c in each store system 11c.

WebSocket is one example of a communication standard that enables asynchronous duplex communication between servers and clients connected through a network. After a server and client open a WebSocket connection CT using the WebSocket standard, sending and receiving data between the devices uses the WebSocket protocol by means of the connection. It is therefore not necessary to establish a connection every time data is transmitted.

The WebSocket connection CT is a logical communication path for sending and receiving data according to the WebSocket protocol and procedures between the printer 12c and control server 10c connected through the WebSocket connection CT. Therefore, once the printer 12c and control server 10c handshake and establish a WebSocket connection CT, the printer 12c and control server 10c can exchange data asynchronously over the WebSocket connection CT. More specifically, the control server 10c can send data to the printer 12c through the WebSocket connection CT at any time, and the printer 12c can send data to the control server 10c through the WebSocket connection CT.

WebSocket communication is asynchronous, duplex communication between the printer 12c and control server 10c through the WebSocket connection CT based on the WebSocket protocol and methods.

Once the WebSocket connection CT is established, the printer 12c and control server 10c can communicate through an asynchronous, duplex communication link. The control server 10c can therefore push data to the printer 12c by WebSocket communication through the WebSocket connection CT without receiving a request from the printer 12c operating as a client device.

The control server 10c and printer 12c communicate by asynchronous duplex communication through the WebSocket connection CT. The control server 10c can push data to the printer 12c through the WebSocket connection CT at any time without receiving a request from the printer 12c operating as a client device. The printer 12c can also push data to the control server 10c through the WebSocket connection CT at any time.

A plurality of management devices 14c are communicatively connected to the control server 10c. As described below, management device 14c sends print data to a specific printer 12c through the control server 10c, and can cause the specific printer 12c to print based on the print data.

In this embodiment of the invention the control server 10c and management device 14c communicate by HTTP (HyperText Transfer Protocol). More specifically, a web browser is installed on the management device 14c. The web browser of the management device 14c and the control server 10c functioning as the server exchange data using HTTP. Note that the method of communication between the management device 14c and control server 10c is not specifically limited, and may use the WebSocket protocol.

In this embodiment of the invention the control server 10c is a cloud server in a so-called cloud computing system in which the printers 12c are clients. More specifically, the control server 10c can process data, execute a specific operation when triggered by a request from the printer 12c or a request from the management device 14c, and send data based on the result of the process through the WebSocket connection CT to the printer 12c.

In FIG. 12 the control server 10c is represented as a single block, but this does not mean that the control server 10c is configured from a single server. For example, the control server 10c may be configured from multiple servers, or it may be a server rendered by a function of a specific system. More specifically, the control server 10c may be any configuration that can execute the processes described herein.

The control server 10c and printer 12c communicate by WebSocket in this embodiment. The invention is not limited to WebSocket communication, however, and other configurations capable of asynchronous, duplex communication in a similar manner as WebSocket communication may be used.

The print control system 1c thus has multiple (such as a 1000) printers 12c each capable of printing communicatively connected through a WebSocket connection CT to a control server 10c.

Such a configuration enables the following.

The control server 10c can collect, manage, and analyze information based on data received from the plural printers 12c connected to the store system 11c. Valuable information can therefore be collected. The collected information can be used as "big data."

Constructing a store system 11c can also be made easier and cheaper. More specifically, the printer 12c is connected to the control server 10c by a WebSocket connection CT in this print control system 1c. Using a service provided by the control server 10c, this enables controlling the printers 12c to execute processes as controlled by the control server 10c. An administrator constructing a store system 11c can therefore build the store system 11c by simply installing the printers 12c where desired, and then connecting the printers 12c to the network GN. This enables controlling the printers 12c to execute a desired process, such as a process related to producing receipts, using a service provided by the control server 10c.

The administrator configuring the store system 11c therefore does not need to embed a function for controlling the printers 12c in the management device 14c that manages the store system 11c. More specifically, by accessing the control server 10c and using a service provided by the control server 10c, the management device 14c can control the printers 12c connected to the control server 10c.

In addition, because printers 12c from different store systems 11c are connected to the control server 10c by a WebSocket connection CT, the control server 10c can manage the plural printers 12c in the plural store systems 11c. The control server 10c can also operate the plural printers 12c in the plural store systems 11c.

Figure 13:
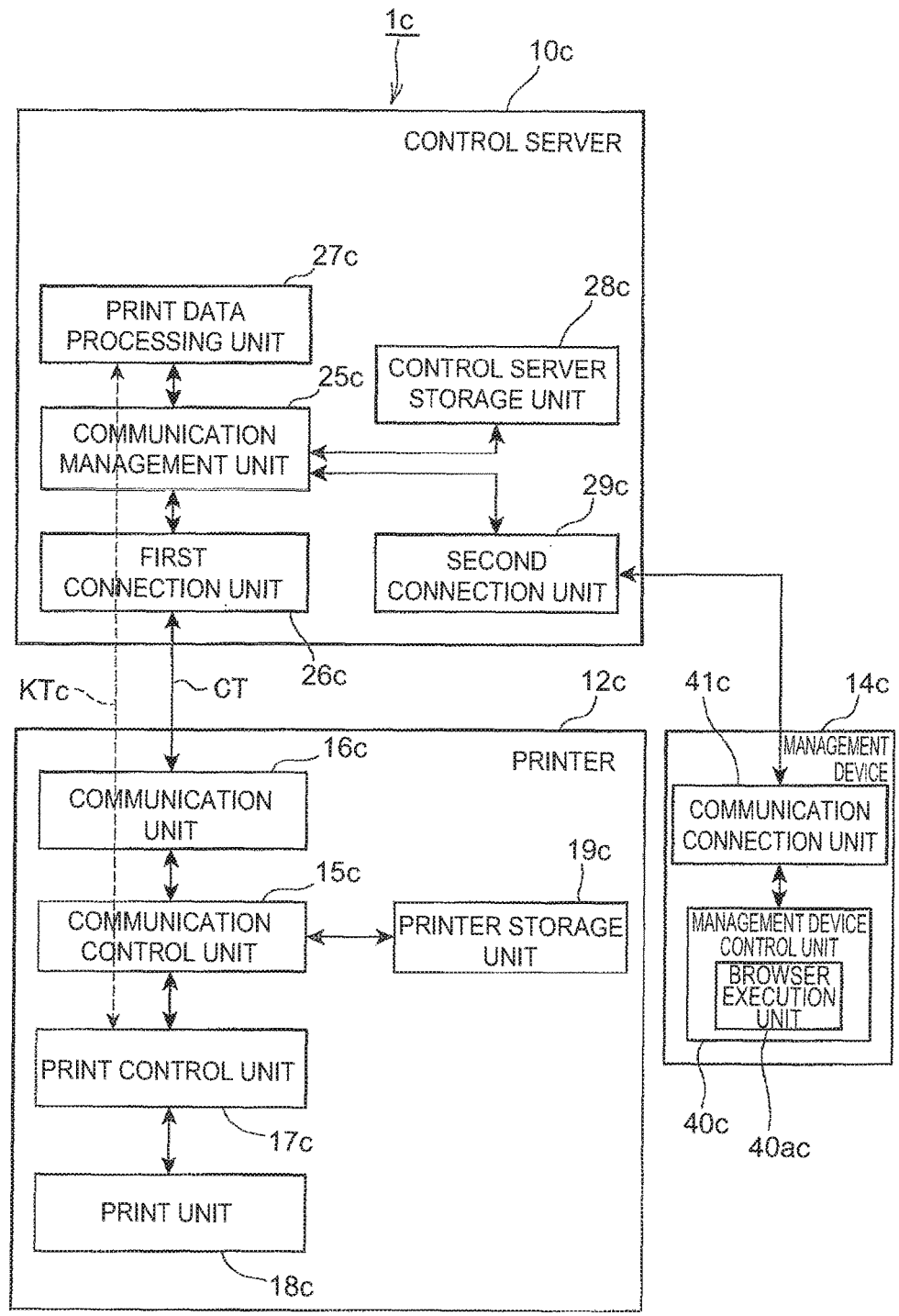
FIG. 13 is a block diagram showing the functional configuration of the control server, printer, and management device.

FIG. 13 is a block diagram showing the functional configuration of the printer 12c, control server 10c, and management device 14c in this embodiment of the invention.

As shown in FIG. 13, the printer 12c has a communication control unit 15c, a communication unit 16c, a print control unit 17c, a print unit 18c, and a printer storage unit 19c.

The functions of the communication control unit 15c, communication unit 16c, and print control unit 17c are described below.

The print unit 18c includes mechanisms related to printing, such as a print mechanism that prints on print media, a conveyance mechanism that conveys the print media, and a cutting mechanism that cuts the print media, and control boards related to controlling the mechanisms.

The printer storage unit 19c is nonvolatile memory, and stores data. Address data 19a and identification data 19b, further described below, are stored in the printer storage unit 19c.

As shown in FIG. 13, the control server 10c includes a communication management unit 25c, a first connection unit 26c, a print data processing unit 27c, a control server storage unit 28c, and a second connection unit 29c.

The functions of the communication management unit 25c, first connection unit 26c, and print data processing unit 27c are described further below.

The control server storage unit 28c is nonvolatile memory, and stores data. A connection management database, an initialization process executing unit management database, and a configuration settings database are stored in the control server storage unit 28c as described further below.

The second connection unit 29c communicates with the management device 14c by HTTP as controlled by the communication management unit 25c.

The management device 14c includes a management device control unit 40c, and a communication connection unit 41c.

The management device control unit 40c includes CPU, ROM, RAM, and other peripheral circuits, and controls the management device 14c. One function block of the management device control unit 40c is a browser execution unit 40a c. The browser execution unit 40a c is a function block rendered by a function of a web browser.

The communication connection unit 41c communicates by HTTP as controlled by the management device control unit 40c.

Note that FIG. 13 shows the relationship between the control server 10c and one printer 12c connected to the control server 10c. When plural printers 12c are connected to the control server 10c, the control server 10c has the same number of WebSocket interfaces as there are printers 12c, establishes a unique WebSocket connection CT with each printer 12c, and communicates by WebSocket protocol through the connections to each printer 12c.

The operation of the printer 12c and control server 10c when the printer 12c power turns on is described next.

Figure 14:
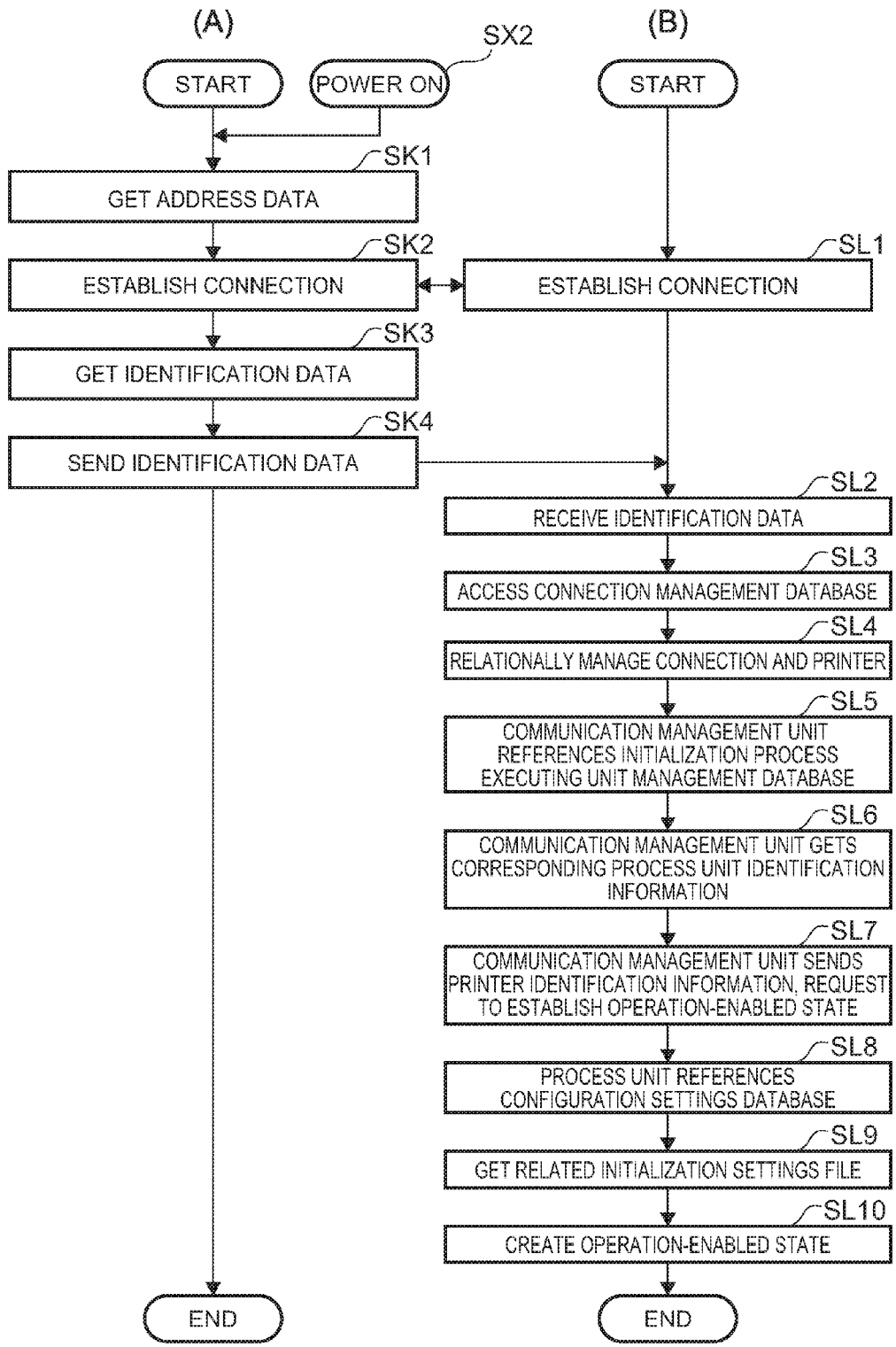
FIG. 14 is a flow chart showing the operation of the control server and printer.

FIG. 14 is a flow chart showing the operation of the printer 12c and the control server 10c after the printer 12c power turns on, column (A) showing the operation of the printer 12c, and column (B) showing the operation of the control server 10c. For ease of discussion, column (A) of FIG. 14 may be identified as FIG. 4(A), unless otherwise specified. Similarly, column (B) of FIG. 14 may be identified as FIG. 4 (B), unless otherwise specified.

The trigger of the process shown in the flow chart in FIG. 14 is not limited to the power turning on. For example, this process may be triggered by the printer 12c connecting to the network GN and enabling communication, or by an instruction from a user.

Note that in the configuration described below, the printer 12c is connected to the local area network LN of the store system 11c in which it is used, and can access the network GN.

The functions of the function blocks of the communication control unit 15c and print control unit 17c of the printer 12c, and the communication management unit 25c and the print data processing unit 27c of the control server 10c, are rendered as described below.

More specifically, these function blocks are software objects. An object is an instance created in an object-oriented programming language, and more specifically is a software function block defined by a set of data and methods. The function of a particular function block is rendered by calling (invoking) a method of the function block.

The functions of these function blocks may also be rendered by the CPU or other hardware assets reading and running an application. Configurations in which the function of a single function block is rendered by a single application, configurations in which the function of plural function blocks are rendered by a single application, and configurations in which the function of a single function block is rendered by plural applications, are possible.

In other words, the function blocks represent functions as conceptual blocks, and do not mean any specific application or hardware construction.

As shown in FIG. 14(A), when the printer 12c power turns on (step SX2), the communication control unit 15c accesses the printer storage unit 19c and gets the address data 19a stored in the printer storage unit 19c (step SK1).

When opening a WebSocket connection CT according to the WebSocket protocol, the client (the printer 12c in this example) handshakes with the server (the control server 10c in this example) using HTTP (Hypertext Transfer Protocol). When handshaking, the address of the receiver to which the message is sent is contained in the address data 19a.

Next, the communication control unit 15c establishes a WebSocket connection CT with the communication management unit 25c of the control server 10c through the communication unit 16c and the first connection unit 26c based on the address in the address data 19a (step SK2, step SL1). In other words, the printer 12c according to this embodiment establishes a WebSocket connection CT when triggered by the power turning on without receiving an instruction from the user or a request from the control server 10c.

The communication unit 16c and first connection unit 26c are WebSocket interfaces enabling data communication based on the WebSocket protocol and methods. These function blocks are instantiated using a WebSocket Socket.IO library, for example.

If the communication control unit 15c sends data to the communication unit 16c, the data can be sent through the WebSocket connection CT according to the WebSocket protocol.

More specifically, the communication unit 16c has functions for processing data that is received from the communication control unit 15c according to WebSocket, and sending the data through the WebSocket connection CT based on WebSocket methods. The communication unit 16c also has functions for processing data that is received through the WebSocket connection CT according to WebSocket, and outputting to the communication control unit 15c. The first connection unit 26c is similarly configured.

Once the WebSocket connection CT is established, the printer 12c and control server 10c can communicate through an asynchronous, duplex communication link. The control server 10c can therefore push data to the printer 12c by WebSocket communication through the WebSocket connection CT without receiving a request from the printer 12c operating as a client device.

Next, the communication control unit 15c of the printer 12c accesses the printer storage unit 19c and gets the identification data 19b stored in the printer storage unit 19c (step SK3). The identification data 19b is data representing the identification information of the printer 12c (referred to below as printer identification information). The printer identification information is, for example, a serial number assigned to the printer 12c when the printer 12c is manufactured.

Next, the communication control unit 15c sends the identification data 19b over the WebSocket connection CT (step SK4).

As shown in FIG. 14 (B), the communication management unit 25c of the control server 10c receives the identification data 19b through the first connection unit 26c (step SL2).

Next, the communication management unit 25c accesses the connection management database stored in the control server storage unit 28c (step SL3). The connection management database is a database relationally storing for the WebSocket connections CT that were established a connection ID number identifying the WebSocket connection CT and the printer identification information of the printer.

Next, the communication management unit 25c creates one record in the connection management database. The communication management unit 25c then stores in the created record the connection ID number of the WebSocket connection CT established in step SL1 related to the printer identification information in the identification data 19b received in step SL2 identification information (step SL4). That is, the communication management unit 25c stores, in the created record, the connection ID number of the WebSocket connection CT relationally to the printer identification information contained in the identification data 19b. Note that when a WebSocket connection CT is opened, the communication management unit 25c generates a connection ID number for that connection that is different from the connection ID numbers of any other WebSocket connection CT that was already opened. The relationship between the WebSocket connections CT and printers 12c is managed by communication management unit 25c through the process of step SL4.

Next, the communication management unit 25c references the initialization process executing unit management database (step SL5).

FIG. 15(A) shows an example of the data structure of one record in the initialization process executing unit management database.

As shown in FIG. 15(A), the initialization process executing unit management database is a database relationally storing printer identification information to process unit identification information for one or a plurality of process units.

The process unit identification information is the identification information identifying a particular process unit (the print data processing unit 27c in this example) in the control server 10c. The print data processing unit 27c, which is a function block of the control server 10c, is generically referred to as a process unit below. The print control unit 17c, which is a function block of the printer 12c, is generically referred to as a function unit.

When the control server 10c has plural process units, a different value is assigned as the process unit identification information to each of the plural process units.

As described above, a plurality of printers 12c are connected to the control server 10c. The control server 10c has one or a plurality of process units related to the printers 12c. A process unit related to one printer 12c is a function block with the ability to execute processes related to that one printer 12c. Therefore, when a WebSocket connection CT is established with the one printer 12c and duplex communication with the one printer 12c is enabled, the process unit related to the one printer 12c may execute a specific process. There may be plural process units related to one printer 12c.

For each printer 12c that can connect to the control server 10c, printer identification information and process unit identification information for the one or plural process units related to a particular printer 12c are relationally stored in the initialization process executing unit management database.

The process unit related to the printer 12c in this embodiment is the print data processing unit 27c. One specific record in the initialization process executing unit management database therefore stores the printer identification information of the printer 12c according to this embodiment relationally to the process unit identification information of the print data processing unit 27c.

Next, the communication management unit 25c acquires the process unit identification information related to this identification information from the initialization process executing unit management database using the printer identification information acquired from the identification data 19b in step SL2 as the search key (step SL6). In step SL6, the communication management unit 25c acquires the process unit identification information of the print data processing unit 27c.

Next, the communication management unit 25c sends the printer identification information acquired in step SL2 and an operation-enabled state request to the process unit corresponding to the process unit identification information acquired in step SL6 (step SL7). In this example, in step SL7, the communication management unit 25c reports the printer identification information and operation-enabled state request to the print data processing unit 27c.

The communication management unit 25c manages the relationship between process units and process unit identification information, the process unit identification information is a unique value identifying one process unit, and the communication management unit 25c can send data to the process unit corresponding to a particular process unit identification information value.

The operation-enabled state is a state in which the process unit can execute a process using a function of the process unit. More specifically, the operation-enabled state is a state in which process unit initialization required to execute the embedded function is completed, and the process unit can run a specific process at a specific time, such as when a request is received or a specific condition is met. The initialization process is described below.

Next, when the above report is received, the print data processing unit 27c references the configuration settings database (step SL8).

FIG. 15 (B) shows an example of the data structure of one record in the configuration settings database.

The configuration settings database is a database relationally storing a set of printer identification information and process unit identification information to an initialization settings file (configuration data) as shown in FIG. 15 (B).

The initialization settings file (configuration data) is a file recording information required to execute the initialization process when the process unit runs the initialization process.

As will be understood below, the process unit in this embodiment of the invention runs the initialization process when triggered by establishing a WebSocket connection CT with the printer 12c. The process unit references the initialization settings file during the initialization process, and each printer 12c that has opened a WebSocket connection CT relates to a different initialization settings file. This is because the functions, specifications, and state of each printer 12c may differ, and an initialization process appropriate to the functions, specifications, and state of the particular printer 12c must be executed during initialization.

For each unique combination of printer identification information and process unit identification information, the configuration settings database stores an initialization settings file relationally to the set of identification information. In other words, each record of the configuration settings database manages the initialization settings file referenced by the process unit corresponding to a specific printer 12c for initialization.

After referencing the configuration settings database in step SL8, the print data processing unit 27c runs the following process.

The print data processing unit 27c searches the configuration settings database using the printer identification information and the process unit identification information of the print data processing unit 27c received from the communication management unit 25c in step SL7 as the search key, and retrieves the initialization settings file related to the set of identification information (step SL9).

Next, the print data processing unit 27c references the initialization settings file acquired in step SL9, and runs the initialization process (step SL10). The print data processing unit 27c enters the operation-enabled state as a result of the initialization process in step SL10.

An example of the print data processing unit 27c initialization process is described below.

For example, as described further below, the print data processing unit 27c generates print data related to controlling the printer 12c, and controls a particular printer 12c by sending the print data to the printer 12c. In the initialization process, the print data processing unit 27c gets such printer 12c configuration data as the paper width of the print medium loaded in the printer 12c, and the print speed and print density, for example, that can be set in the printer 12c. A described further below, the print data is an XML file, and the print data processing unit 27c also acquires the version of XML that the printer 12c is compatible with. More specifically, the print data processing unit 27c gets the printer 12c configuration data required to generate print data for the printer 12c. The configuration data acquired for the printer 12c is stored, for example, in variables defined in the program rendering the function of the print data processing unit 27c. The printer 12c configuration data is written in a specific format in the initialization settings file. The print data processing unit 27c also has functions for executing appropriate processes based on the data received from the printer 12c, and the initialization process includes preprocessing required to process the received data.

More specifically, the initialization process includes preprocessing required to execute the functions of the print data processing unit 27c, including generating print data. The print data processing unit 27c references the corresponding initialization settings file, establishes the operation-enabled state by running the initialization process, and becomes able to execute processes based on a desired function at any time.

In this embodiment of the invention a process unit corresponding to a particular printer 12c is set to an operation-enabled state triggered by a WebSocket connection CT to the printer 12c being established. The process unit can therefore be set to the operation-enabled state when a WebSocket connection CT with the printer 12c is established, duplex communication with the printer 12c is enabled, and a process unit may need to execute a process related to the printer 12c.

As a result, compared with the process units running the initialization process when the control server 10c starts up, and the process units entering the operation-enabled state while the control server 10c is running, unnecessary initialization processes can be suppressed, the delay until the process units enter the operation-enabled state can be shortened, and resources can be used efficiently.

In this embodiment of the invention, a WebSocket connection CT is established triggered by the power turning on without receiving a user instruction or a request from the control server 10c. Thus comprised, the user does not need to perform a complicated operation to open a WebSocket connection CT. Special knowledge is also not needed to open a WebSocket connection CT. After the power turns on, the printer 12c can also be automatically enabled to execute processes as controlled by the control server 10c.

The communication management unit 25c in this embodiment of the invention sends a specific report to the process unit creating an operation-enabled state, and the process unit runs the initialization process triggered by this report. The invention is not so limited, however, and the following configuration is also possible. Specifically, when the process unit is a software object, the communication management unit 25c instantiates a process unit as an object corresponding to the printer 12c triggered by a WebSocket connection CT opening to the printer 12c. The process unit then runs the initialization process by calling a specific method.

The communication unit 16c and first connection unit 26c thus establish a WebSocket connection CT. As a result, a function unit communication path KTc based on the WebSocket connection CT is established between the print control unit 17c of the printer 12c, and the print data processing unit 27c of the control server 10c. The function unit communication path KTc is a logical communication path for sending and receiving data communicated between the process unit and function unit. The print control unit 17c and print data processing unit 27c communicate by asynchronous duplex communication through the function unit communication path KTc. Asynchronous duplex communication between the function unit and process unit through the function unit communication path KTc is described further below.

Operation of the management device 14c, control server 10c, and printer 12c when printing on the print medium is described next.

Figure 16:
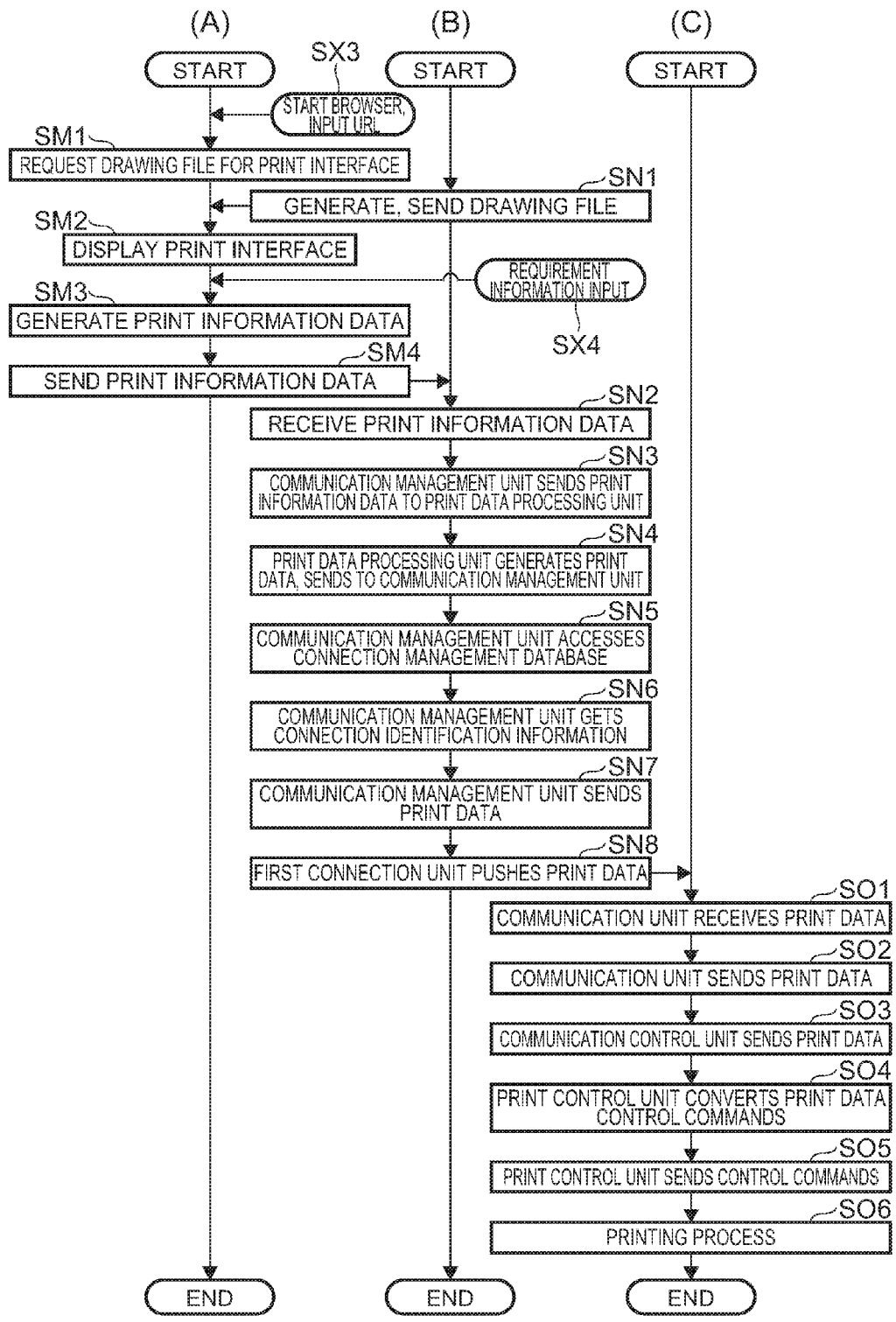
FIG. 16 is a flow chart showing the operation of the control server, printer, and management device.

FIG. 16 is a flow chart showing the operation of the management device 14c, the control server 10c and the printer 12c when printing on the print medium, (A) showing the operation the management device 14c, (B) showing the operation of the control server 10c, and (C) showing the operation of the printer 12c.

FIG. 16 describes communication between the print data processing unit 27c of the control server 10c and the print control unit 17c of the printer 12c when the print data processing unit 27c sends data through the function unit communication path KTc.

As shown in FIG. 16(A), to print with the printer 12c, the user starts a browser on the management device 14c, and inputs a command to access a specific URL (step SX3). This URL is a URL on the control server 10c, and is a URL accessed when a user interface for inputting printing information described below (referred to as the print interface) is presented in a browser window. The specific URL is given by the administrator that manages the control server 10c to the user in advance.

Based on the command in step SX3, the browser execution unit 40ac of the management device 14c accesses the specific URL, and requests the control server 10c for the drawing file related to displaying the print interface (step SM1). This drawing file is a file written in HTML (Hyper-Text Markup Language), for example, and is a file for displaying a user interface in a browser window on the management device 14c.

A specific web server program is installed on the control server 10c. The control server 10c functions as a web server that generates and sends an image file for displaying a specific user interface in response to a request from the management device 14c as a client device.

As shown in FIG. 16 (B), in response to the request from the management device 14c in step SM1, the control server 10c generates and outputs an image file related to the print interface to the management device 14c (step SN1).

The browser execution unit 40a c of the management device 14c then displays the print interface in the browser window based on the received image file (step SM2).

The print interface is a user interface enabling the user to input necessary information to print from the printer 12c. This necessary information includes, for example, the file name where the image data is stored, and information related to where the image is printed on the print medium. The print interface is configured so that the information required to print with the printer 12c can be input.

More specifically, the printer identification information of the printer 12c that is to print can be input through the print interface. To print from plural printers 12c, the user can input printer identification information for plural printers to the print interface.

After inputting the printer identification information and other required information to the print interface, the user confirms the input (step SX4).

Based on the information input to the print interface, the browser execution unit 40ac generates print information data including the input information (step SM3). The printer identification information is included in the print information data.

Next, the browser execution unit 40ac controls the communication connection unit 41c to send the print information data to the control server 10c (step SM4).

As shown in FIG. 16(B), the communication management unit 25c of the control server 10c receives the print information data through the second connection unit 29c (step SN2).

Next, the communication management unit 25c sends the received print information data to the print data processing unit 27c (step SN3).

Next, the print data processing unit 27c generates and outputs print data related to controlling the printer 12c to the communication management unit 25c based on the received print information data (step SN4). The print data is an XML (Extensible Markup Language) file containing the information to be printed by the printer 12c. The information to be printed by the printer 12c, such as the image data and information where the image is to be printed, is included in the print data in XML format. The printer identification information of the printer 12c to be used for printing is also included in the print data, e.g. as a tag.

Triggered by establishing a WebSocket connection CT with the printer 12c, the print data processing unit 27c in this embodiment of the invention creates an operation-enabled state. Therefore, when print information data is received from the communication management unit 25c in step SN3, the print data processing unit 27c can operate and run a process related to generating print data based on the received print information data. Compared with a configuration that runs the initialization process triggered by receiving print information data and starting to generate print data after the initialization process completes, the print data processing unit 27c can shorten the time required until the print data is generated after the print information data is received. More specifically, this embodiment of the invention can accelerate processing by setting the process unit corresponding to a particular printer 12c to the operation-enabled state triggered by establishing a WebSocket connection CT with the printer 12c.

Next, the communication management unit 25c accesses the connection management database stored in the control server storage unit 28c (step SN5). Next, the communication management unit 25c retrieves the connection identification information of the WebSocket connection CT related to the printer identification information from the connection management database using the printer identification information written in the received print data as the search key (step SN6). The connection identification information acquired here is the connection identification information of the WebSocket connection CT established with the printer 12c that is to print.

Next, the communication management unit 25c sends the print data to the first connection unit 26c related to the WebSocket connection CT of the connection identification information acquired in step SN6 (step SN7).

Next, the first connection unit 26c pushes the received print data through the WebSocket connection CT (step SN8).

As shown in FIG. 16 (C), the communication unit 16c receives the print data by WebSocket (step S01). Next, the communication unit 16c sends the received print data to the communication control unit 15c (step S02). Next, the communication control unit 15c sends the received print data to the print control unit 17c (step S03). Next, the print control unit 17c converts the received print data to control commands in the command language of the print unit 18c (step S04). More specifically, the print control unit 17c converts the print data, which is an XML file, to commands that can be interpreted by the control board of the print unit 18c.

Next, the print control unit 17c sends the control commands to the print unit 18c (step S05). Next, the print unit 18c prints on the print medium based on the control commands (step S06).

The print data processing unit 27c of the control server 10c in this embodiment of the invention can therefore send data (print data in this example) to the print control unit 17c of the printer 12c through a function unit communication path KTc. By executing a process based on the processes described in the flow chart in FIG. 16, the print control unit 17c of the printer 12c can also send data to the print data processing unit 27c of the control server 10c through the function unit communication path KTc. The data transmitted by the print control unit 17c is data representing the result of printing after printing by the print unit 18c. More specifically, the print data processing unit 27c of the control server 10c, and the print control unit 17c of the printer 12c, communicate by asynchronous duplex communication through a function unit communication path KTc based on a WebSocket connection CT.

Furthermore, based on the printer identification information of the printer 12c stored on the control server 10c, the management device 14c in this embodiment of the invention can send data to the printer 12c through the control server 10c. In other words, the management device 14c can control a printer 12c in the group of printers 12c connected to the control server 10c through the WebSocket connection CT through the control server 10c.

As also described above, the control server 10c in this embodiment of the invention can print from a printer 12c without receiving a request from the printer 12c when an event that prints on the printer 12c occurs. Events that cause the printer 12c to print are events in which predefined conditions are met, such as when an instruction is received from the user, or a request is received from a communicatively connected external device.

This configuration also enables starting printing faster than in a configuration in which the printer 12c intermittently sends a request to the control server 10c, and the control server 10c sends print data in response to such a request when there is a need to print with the printer 12c. Consumption of resources can also be suppressed compared with a configuration in which the control server 10c queues responses to requests.

After establishing a WebSocket connection CT with the printer 12c, the control server 10c according to this embodiment of the invention monitors the status of the WebSocket connection CT and runs a process appropriate to the state. This is described further below.

Figure 17:
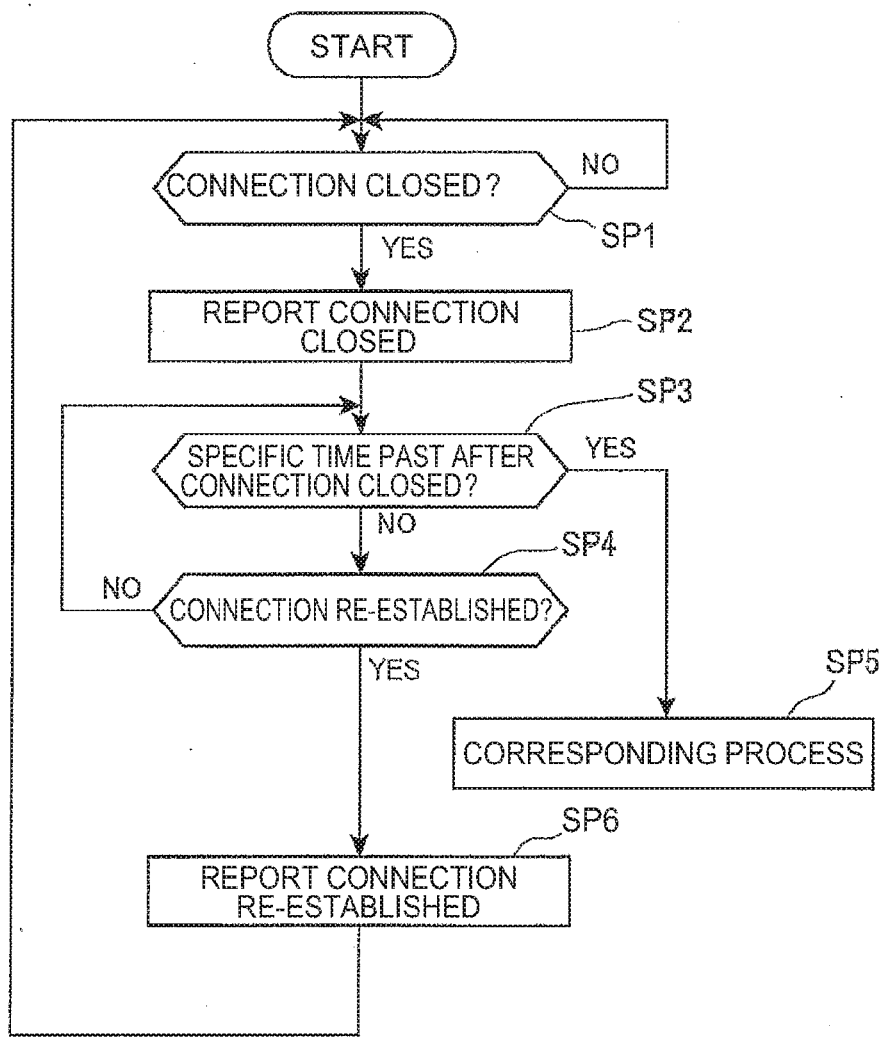
FIG. 17 is a flow chart showing the operation of the control server.

FIG. 17 is a flow chart showing the operation of the control server 10c after a WebSocket connection CT is established.

After a WebSocket connection CT is established, the communication management unit 25c of the control server 10c monitors if the WebSocket connection CT is closed unexpectedly (step SP1). Closing a connection unexpectedly here means that the WebSocket connection CT was closed without using the standard WebSocket method of closing a connection. A connection may be closed unexpectedly due to a communication error or other cause.

When the WebSocket connection CT closes unexpectedly (step SP1 returns YES), the communication management unit 25c reports that the WebSocket connection CT closed to the process unit corresponding to the printer 12c that established the WebSocket connection CT that closed (step SP2). In this embodiment of the invention, the communication management unit 25c reports to the print data processing unit 27c that the WebSocket connection CT closed.

The process unit receiving this report (the print data processing unit 27c in this example) does not reset and maintains the operation-enabled state. In other words, the process unit remains able to execute processes using functions of the process unit when the WebSocket connection CT is re-established.

Next, the communication management unit 25c monitors if a specific time has passed after the connection closed (step SP3), and determines if a WebSocket connection CT was re-established with the printer 12c that opened the WebSocket connection CT that closed (the "previously-connected printer" below) (step SP4).

That a specific time has passed since the connection closed unexpectedly occurs when a WebSocket connection CT is not re-established with the previously-connected printer before a specific time passes after the WebSocket connection CT closed. This specific time is preset. If the specific time passes after the connection closed (step SP3 returns YES), the communication management unit 25c executes the same process executed when the WebSocket connection CT closes normally, such as resetting the process units corresponding to the previously-connected printer (step SP5).

If a WebSocket connection CT is re-established with the previously-connected printer before the specific time passes after the connection closed unexpectedly (step SP4 returns YES), the communication management unit 25c goes to step SP6 and executes the following process.

Note that whether or not a WebSocket connection CT is re-established with the previously-connected printer may be determined by the communication management unit 25c as described below.

When the WebSocket connection CT closes, the communication management unit 25c stores the printer identification information of the printer 12c in a specific storage area. When a WebSocket connection CT is completed, the communication management unit 25c then gets the printer identification information from the printer 12c through the WebSocket connection CT. If the printer identification information stored in the specific storage area matches the acquired printer identification information, the communication management unit 25c determines that a connection with the previously-connected printer was re-established.

In step SP6, the communication management unit 25c sends the printer identification information of the previously-connected printer and a report that a WebSocket connection CT with the previously-connected printer was re-established to the process unit corresponding to the previously-connected printer (step SP6). Next, the communication management unit 25c goes to step SP1.

In this way, when a WebSocket connection CT with the previously-connected printer is re-established, the process unit corresponding to the previously-connected printer receives this report and the printer identification information. As a result, the process unit can know which printer 12c the WebSocket connection CT was re-established with based on the printer identification information. When receiving data is interrupted due to the WebSocket connection CT closing unexpectedly, the process unit can know that the data received after the WebSocket connection CT was re-established may be a continuation of the data that was being received before the WebSocket connection CT closed. Therefore, if a function for recognizing that the data received before the connection closed and the data received after the connection closed are the same data stream is added to the process unit, resending all data is not necessary, processing efficiency can be improved, and the communication load can be reduced.

As described above, the print control system 1c (print control system) according to this embodiment has a printer 12c and a control server 10c (print control device).

The printer 12 includes a print control unit 17c that controls printing based on print data, and a communication unit 16c that communicates print data through a WebSocket connection CT, which is an asynchronous duplex communication link.

The control server 10c has a first connection unit 26c that communicates print data over a WebSocket connection CT; a print data processing unit 27c that processes print data; and a communication management unit 25c that controls the print data processing unit 27c to execute an initialization process so that print data can be processed.

Thus comprised, the control server 10c and the printer 12c of the print control system 1c communicate by asynchronous duplex communication. The control server 10c can therefore send print data through the WebSocket connection CT to the printer 12c at any time, and can cause the printer 12c to execute a process based on the print data.

The control server 10c in this configuration has a print data processing unit 27c, and a communication management unit 25c that controls the print data processing unit 27c to execute an initialization process so that print data can be processed. As a result, the control server 10c can control the print data processing unit 27c to execute the initialization process as required and enable using functions of the print data processing unit 27c to execute processes. More specifically, this embodiment of the invention can make the print control system 1c and control server 10c compatible with configurations in which the control server 10c has a print data processing unit 27c, and configurations in which the printer 12c and control server 10c communicate over a network.

In this embodiment of the invention, the communication management unit 25c of the control server 10c causes the print data processing unit 27c to execute the initialization process when a WebSocket connection CT is established with a printer 12c.

Thus comprised, when the print data processing unit 27c may need to send print data to the printer 12c as a result of opening a WebSocket connection CT, that is, when the print data processing unit 27c may need to process data using a function of the print data processing unit 27c, the print data processing unit 27c can be set to a state in which functions of the print data processing unit 27c can be used to run processes.

In this embodiment of the invention the control server 10c has a control server storage unit 28c (storage unit) that stores an initialization settings file for configuring the print data processing unit 27c, and the print data processing unit 27c of the control server 10c runs the initialization process based on this initialization settings file.

Thus comprised, the print data processing unit 27c can run an initialization process appropriate to the printer 12c based on the initialization settings file.

Embodiment 4

A fourth embodiment of the invention is described next.

The print control system 1d according to the fourth embodiment of the invention includes a control server 10d (print control device), a printer 12d, and a management device 14d.

The control server 10d, printer 12d, and management device 14d are connected through a network GN in a similar manner as the control server 10c, printer 12c, and management device 14c in FIG. 11. The communication paths established between the control server 10d, printer 12d, and management device 14d are similar to the communication paths established between the control server 10c, printer 12c, and management device 14c in FIG. 12.

Figure 18:
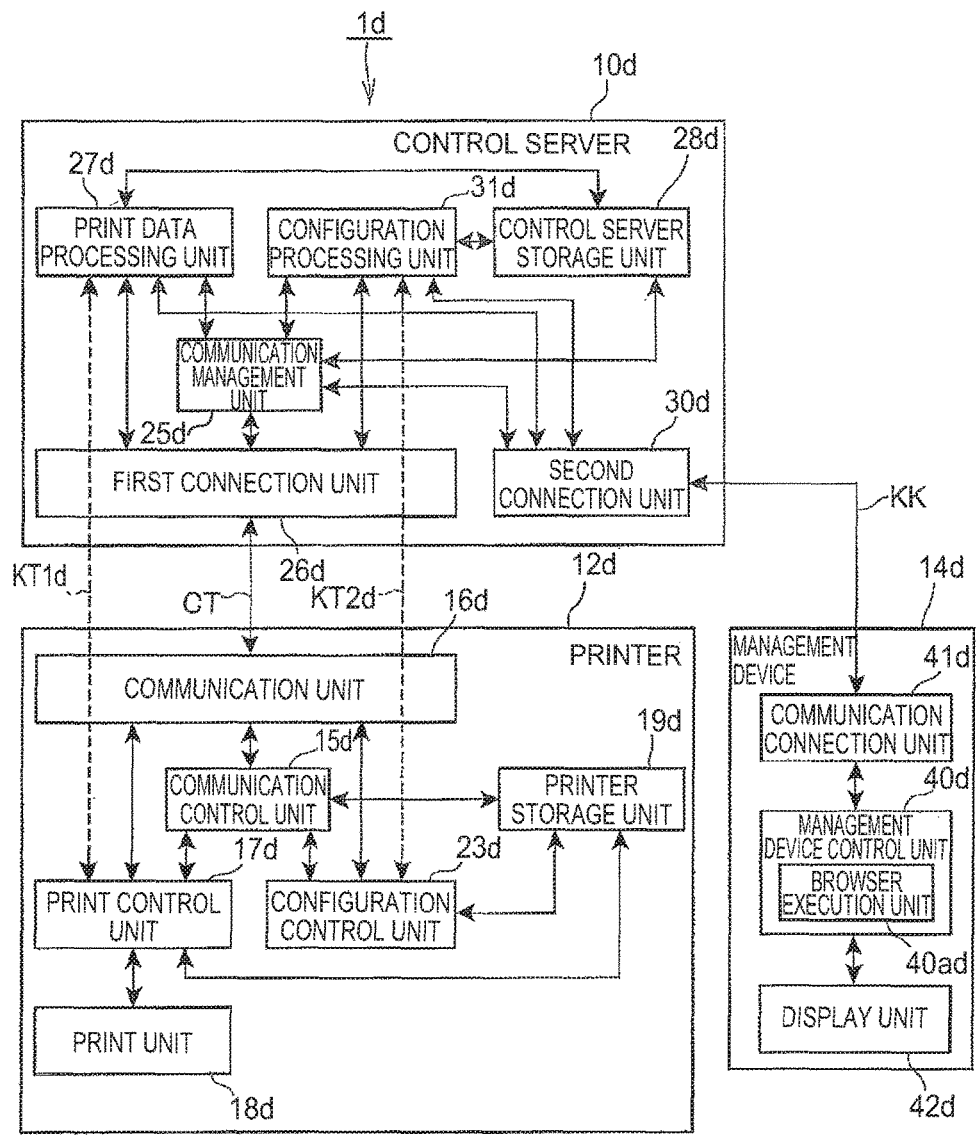
FIG. 18 is a block diagram showing the functional configuration of the control server, printer, and management device in a fourth embodiment of the invention.

FIG. 18 is a block diagram showing the functional configuration of the printer 12, control server 10d, and management device 14d in this embodiment of the invention.

As shown in FIG. 18, the printer 12d includes a communication control unit 15d, a communication unit 16d, a print control unit 17d, a print unit 18d, a configuration control unit 23d, and a printer storage unit 19d.

The functions of the communication control unit 15d, communication unit 16d, print control unit 17d, and configuration control unit 23d are described below.

The print unit 18d includes mechanisms related to printing, such as a print mechanism that prints on print media, a conveyance mechanism that conveys the print media, and a cutting mechanism that cuts the print media, and control boards related to controlling the mechanisms.

The printer storage unit 19d is nonvolatile memory, and stores data. Address data 19a, identification data 19b, and a function unit management database further described below are stored in the printer storage unit 19d.

When not differentiating between the print control unit 17d and the configuration control unit 23d below, these function blocks are referred to as function units.

As shown in FIG. 18, the control server 10d includes a communication management unit 25d, a first connection unit 26d, a print data processing unit 27d, a configuration processing unit 31d, a control server storage unit 28d (control device storage unit), and a second connection unit 30d.

The functions of the communication management unit 25d, first connection unit 26d, print data processing unit 27d, and configuration processing unit 31d are described further below.

The control server storage unit 28d is nonvolatile memory, and stores data. A connection management database, process unit management database, and a configuration settings database are stored in the control server storage unit 28d as described further below.

The second connection unit 30d communicates with the management device 14d by HTTP as controlled by the communication management unit 25d. More specifically, a web browser is installed on the management device 14d, and the second connection unit 30d connects by HTTP with the management device 14d with the control server 10d as the server and the management device 14d as a client device.

When not differentiating between the print data processing unit 27d and the configuration processing unit 31d below, these function blocks are referred to generically as process units.

The management device 14d includes a management device control unit 40d, a communication connection unit 41d, and a display unit 42d.

The management device control unit 40d includes CPU, ROM, RAM, and other peripheral circuits, and controls the management device 14d. One function block of the management device control unit 40d is a browser execution unit 40a d. The browser execution unit 40a d is a function block rendered by a function of a web browser.

The communication connection unit 41d communicates by HTTP as controlled by the management device control unit 40d with the control server 10d through connection KK.

The display unit 42d has an LCD or other type of display panel, and displays images on the display panel as controlled by the management device control unit 40d.

Note that FIG. 18 shows the relationship between the control server 10d and one printer 12d connected to the control server 10d. When plural printers 12d are connected to the control server 10d, the control server 10d has the same number of WebSocket interfaces as there are printers 12d, establishes a WebSocket connection CT with each printer 12d, and communicates by WebSocket protocol through the connections to each printer 12d.

FIG. 18 also shows the relationship between the control server 10d and one management device 14d connected to the control server 10d. When management devices 14d are connected to the control server 10d, the control server 10d has the same number of second connection units 30d as there are management device 14d, establishes a connection KK with each management device 14d, and communicates with each management device 14d through the connection KK.

The operation of the printer 12d and control server 10d when the printer 12d power turns on is described next.

Figure 19:
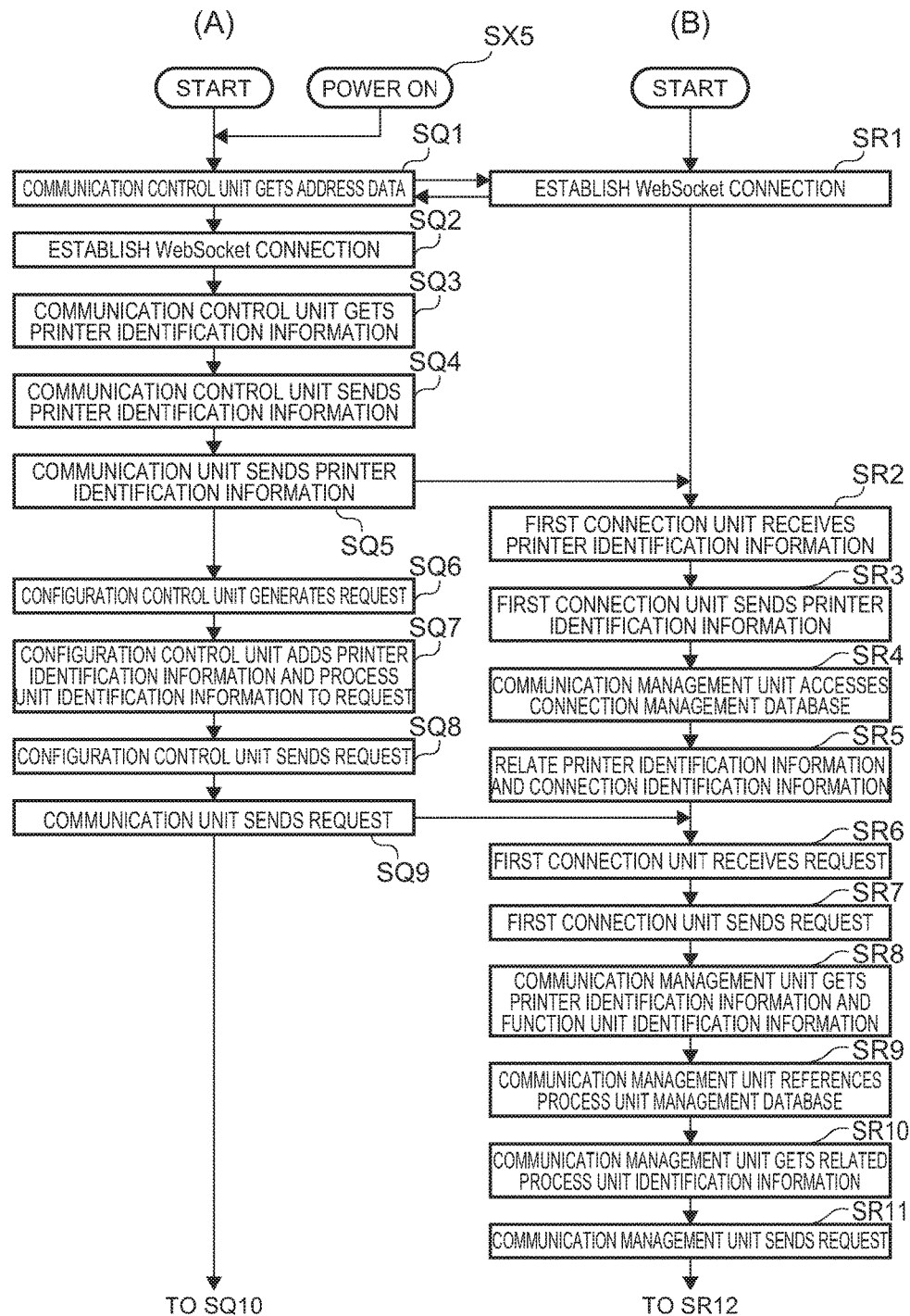
FIG. 19 is a flow chart showing the operation of the control server and printer.

FIG. 19 is a flowchart showing the operation of the printer 12d and the control server 10d after the printer 12d power turns on, column (A) showing the operation of the printer 12d, and column (B) showing the operation of the control server 10d.

The trigger of the process shown in the flow chart in FIG. 19 (SX5) is not limited to the power turning on. For example, this process may be triggered by the printer 12d connecting to the network GN and enabling communication, or by an instruction from a user.

Note that in the configuration described below, the printer 12d is connected to the local area network LN of the store system 11 in which it is used, and can access the network GN.

The functions of the function blocks of the communication control unit 15d, print control unit 17d, and configuration control unit 23d of the printer 12d, and the communication management unit 25d, print data processing unit 27d and the configuration processing unit 31d of the control server 10d, are rendered as described below.

More specifically, these function blocks are software objects. An object is an instance created in an object-oriented programming language, and more specifically is a software function block defined by a set of data and methods. The function of a particular function block is rendered by calling (invoking) a method of the function block.

The functions of these function blocks may also be rendered by the CPU or other hardware assets reading and running an application. Configurations in which the function of a single function block is rendered by a single application, configurations in which the function of plural function blocks are rendered by a single application, and configurations in which the function of a single function block is rendered by plural applications, are possible.

In other words, the function blocks represent functions as conceptual blocks, and do not mean any specific application or hardware construction.

As shown in FIG. 19 (A), when the printer 12d power turns on (step SX5), the communication control unit 15d accesses the printer storage unit 19d and gets the address data 19a stored in the printer storage unit 19d (step SQ1).

The address data 19a is the address (such as the domain name, IP address, path name, port information) of the control server 10d accessed when establishing the WebSocket connection CT. When opening a WebSocket connection CT according to the WebSocket protocol, the client (the printer 12d in this example) handshakes with the server (the control server 10d in this example) using HTTP (Hypertext Transfer Protocol). When handshaking, the client sends a message containing the address of the server, and the address data 19a is the address to be accessed.

Next, the communication control unit 15d establishes a WebSocket connection CT with the communication management unit 25d of the control server 10d through the communication unit 16d and the first connection unit 26d based on the address in the address data 19a (step SQ2, step SR1). In other words, the printer 12d according to this embodiment establishes a WebSocket connection CT when triggered by the power turning on without receiving an instruction from the user or a request from the control server 10d.

The communication unit 16d and first connection unit 26d are WebSocket interfaces enabling data communication based on the WebSocket protocol and methods. These function blocks are instantiated using a WebSocket Socket.IO library, for example.

More specifically, the communication unit 16d has functions for processing data that is received from the communication control unit 15d, the print control unit 17d, or the configuration control unit 23d according to the WebSocket protocol, and sending the data through the WebSocket connection CT based on WebSocket methods. The communication unit 16d also has functions for processing data that is received through the WebSocket connection CT according to WebSocket, and outputting to the communication control unit 15d. The first connection unit 26d is similarly configured.

Once the WebSocket connection CT is established, the printer 12d and control server 10d can communicate through an asynchronous, duplex communication link. The control server 10d can therefore push data to the printer 12d by WebSocket communication through the WebSocket connection CT without receiving a request from the printer 12d operating as a client device. The printer 12d can likewise push data to the control server 10c through the WebSocket connection CT.

By establishing a WebSocket connection CT, a first function unit communication path KT1d based on the WebSocket connection CT is established between the print control unit 17d of the printer 12d, and the print data processing unit 27d of the control server 10d. The first function unit communication path KT1d is a logical communication path for communicating data between the print control unit 17d and the print data processing unit 27d. The print control unit 17d and print data processing unit 27d can communicate by asynchronous duplex communication through the first function unit communication path KT1d. Asynchronous duplex communication through the first function unit communication path KT1d is described further below.

By establishing a WebSocket connection CT, a second function unit communication path KT2d based on the WebSocket connection CT is established between the configuration control unit 23d of the printer 12d, and the configuration processing unit 31d of the control server 10d. The second function unit communication path KT2d is a logical communication path for sending and receiving data between the configuration control unit 23d and the configuration processing unit 31d. The configuration control unit 23d and the configuration processing unit 31d can communicate by asynchronous duplex communication through the second function unit communication path KT2d. Asynchronous duplex communication through the second function unit communication path KT2d is described further below.

Next, the communication control unit 15d of the printer 12d accesses the printer storage unit 19d and gets the identification data 19b stored in the printer storage unit 19d (step SQ3). The identification data 19b is data representing the identification information of the printer 12d (referred to below as printer identification information). The printer identification information is, for example, a serial number assigned to the printer 12d when the printer 12d is manufactured.

Next, the communication control unit 15d sends the acquired identification data 19b to the communication unit 16d (step SQ4).

The communication unit 16*d* then sends the received identification data 19*b* through the WebSocket connection CT to the control server 10*d* (step SQ5).

As shown in FIG. 19(B), the first connection unit 26*d* of the control server 10*d* receives the identification data 19*b* through the WebSocket connection CT (step SR2).

Next, the first connection unit 26*d* sends the received identification data 19*b* to the communication management unit 25*d* (step SR3).

Next, the communication management unit 25*d* accesses the connection management database stored in the control server storage unit 28*d* (step SR4). The connection management database is a database relationally storing for the WebSocket connections CT that were established a connection ID number identifying the WebSocket connection CT and the printer identification information of the printer.

Next, the communication management unit 25*d* creates one record in the connection management database. The communication management unit 25*d* then stores in the created record the connection identification information of the WebSocket connection CT established in step SR1 related to the printer identification information in the identification data 19*b* received in step SR2 identification information (step SR5). Note that when a WebSocket connection CT is opened, the communication management unit 25*d* generates connection identification information for that connection that is different from the connection identification information of any other WebSocket connection CT that was already opened. The control server 10*d* manages the relationship between the WebSocket connections CT and printers 12*d* by the process of step SR5.

In this embodiment of the invention, a WebSocket connection CT is established triggered by the power turning on without receiving a user instruction or a request from the control server 10*d*. Thus comprised, the user does not need to perform a complicated operation to open a WebSocket connection CT. Special knowledge is also not needed to open a WebSocket connection CT. After the power turns on, the printer 12*d* can also be automatically enabled to execute processes as controlled by the control server 10*d*.

As shown in FIG. 19(A), the configuration control unit 23*d* of the printer 12*d* generates a request (step SQ6). This request is a command requesting the control server 10*d* to send configuration control data (described below). The request conforms to a specific format.

Next, the configuration control unit 23*d* adds the printer identification information and the function unit identification information of the configuration control unit 23*d* to the generated request (step SQ7). The function unit identification information is identification information identifying a particular function unit of the printer 12*d*, and a different value is assigned as the function unit identification information for each function unit. In step SQ7, the configuration control unit 23*d* references the identification data 19*b* stored in the printer storage unit 19*d*, and based on this data adds the printer identification information to the request. The configuration control unit 23*d* also manages the function unit identification information assigned to the configuration control unit 23*d*, and based thereon adds the function unit identification information to the request.

Next, the configuration control unit 23*d* sends the request to the communication unit 16*d* (step SQ8).

The communication unit 16*d* sends the request to the control server 10*d* through the WebSocket connection CT (step SQ9).

As shown in FIG. 19(B), the first connection unit 26*d* of the control server 10*d* receives the request through the WebSocket connection CT (step SR6).

Next, the first connection unit 26*d* sends the received request to the communication management unit 25*d* (step SR7).

The communication management unit 25*d* then acquires the printer identification information and the function unit identification information added to the request (step SR8).

Next, the communication management unit 25*d* references the process unit management database stored by the control server storage unit 28*d* (step SR9). The process unit management database is a database that relationally stores a set of printer identification information and function unit identification information with process unit identification information.

Next, the communication management unit 25*d* acquires the process unit identification information related to this set of identification information from the process unit management database using the printer identification information and function unit identification information acquired in step SR8 as the search key (step SR10). The process unit identification information is identification information of a process unit of the control server 10*d*. A different value is therefore assigned to the print data processing unit 27*d* and the configuration processing unit 31*d* of the control server 10*d*. The process unit identification information acquired by the communication management unit 25*d* in step SR10 is the process unit identification information of the process unit that sent the data received through the WebSocket connection CT.

Next, the communication management unit 25*d* sends the request (step SR11) to the process unit identified by the process unit identification information acquired in step SR10 (configuration processing unit 31*d* in this example). Note that the communication management unit 25*d* manages the relationships between process unit and process unit identification information, and sends data to the process unit corresponding to the process unit identification information based on the value of a single process unit identification information value.

Figure 20:
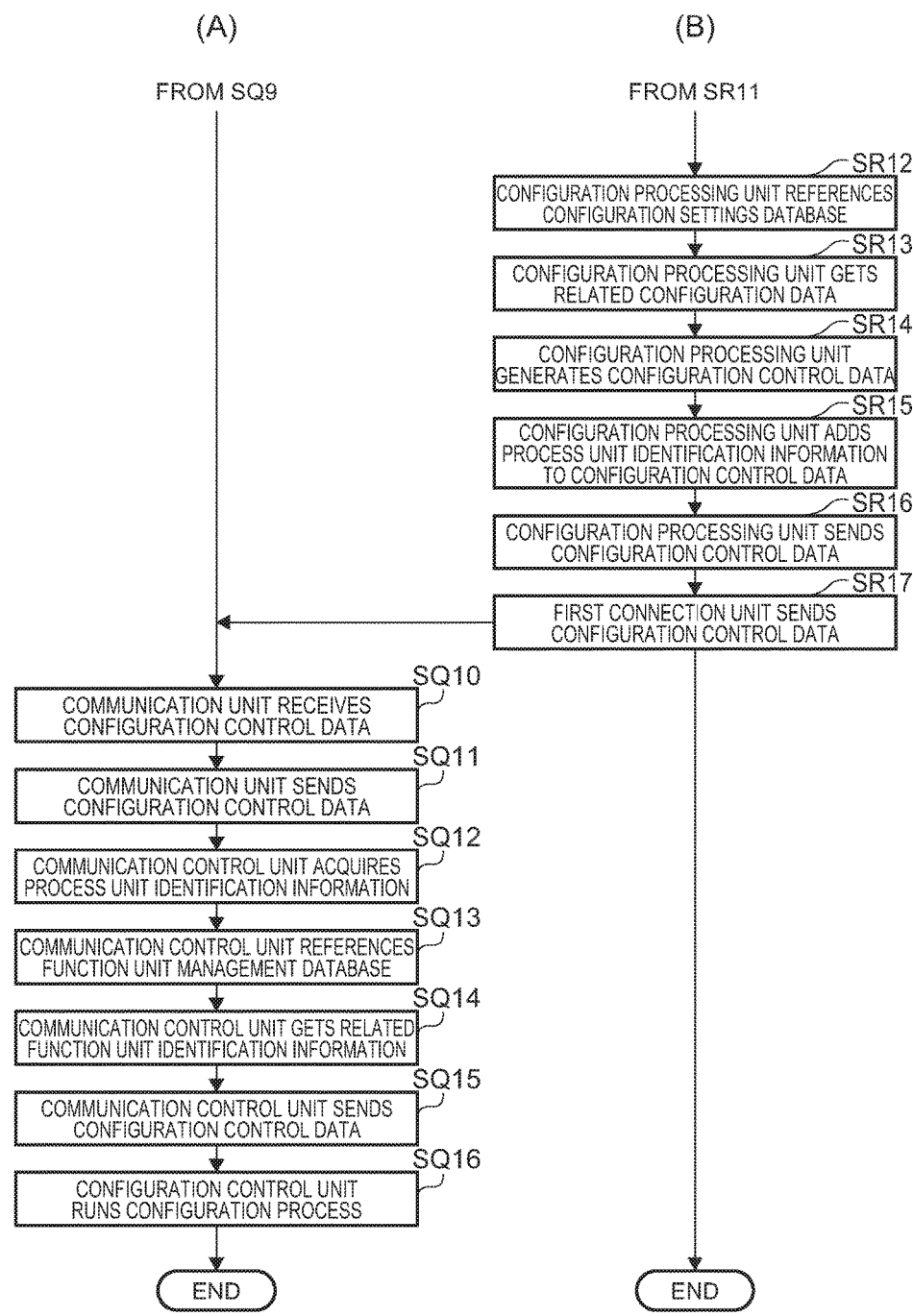
FIG. 20 is a flow chart showing the operation of the control server and printer.

As shown in FIG. 20 (B), when a request is received, the configuration processing unit 31*d* of the control server 10*d* references the configuration settings database stored by the control server storage unit 28*d* (step SR12).

The configuration settings database relationally stores printer identification information and configuration data for each printer 12*d* connected to the control server 10*d*.

The configuration data is information relating one or a plurality of settings related to the print unit 18*d* of the printer 12*d* to the value of that setting.

Configurable settings of the printer 12 in this embodiment of the invention include a print density setting, which is a setting related to the image density when printing; a print speed setting, which relates to the speed of printing; and a paper width setting, which is a setting related to the width of the print medium (roll paper in this example) that is set in the printer 12*d*. The settings are not limited to those described in this embodiment, and may further include network-related settings, audio-related settings when the device has an audio output function, and other settings.

Values available as the print density setting of the printer 12*d* according to this embodiment include DARK indicating the print density is dark, and LIGHT indicating the print density is light. Values available as the print speed setting of the printer 12*d* according to this embodiment include FAST indicating a high print speed, and SLOW indicating a low print speed. Values available as the paper width setting of the printer 12d according to this embodiment include 80 mm indicating the width of the installed roll paper is 80 mm, and 58 mm indicating the width of the installed roll paper is 58 mm.

For example, the configuration data may be information relating the print density setting and DARK, the print speed setting and FAST, and the paper width setting and 80 mm.

Next, the configuration processing unit 31d acquires the configuration data related to the identification information from the configuration settings database using the printer identification information added to the request as the search key (step SR13).

Next, the configuration processing unit 31d generates the configuration control data based on the acquired configuration data (step SR14).

The configuration control data specifies the values of specific settings, and is data instructing setting the values of the configuration items to the specified values in the configuration control unit 23d of the printer 12d. In this example, the configuration control data is data instructing setting the print density setting to DENSE, the print speed setting to FAST, and the paper width setting to 80 mm.

Next, the configuration processing unit 31d adds the process unit identification information to the configuration control data (step SR15). The configuration processing unit 31d manages the process unit identification information assigned to the configuration processing unit 31d.

Next, the configuration processing unit 31d sends the configuration control data to the first connection unit 26d (step SR16).

The first connection unit 26d then sends the received configuration control data through the WebSocket connection CT to the printer 12d (step SR17).

As shown in FIG. 20 (A), the communication unit 16d of the printer 12d receives the configuration control data through the WebSocket connection CT (step SQ10). Next, the communication unit 16d sends the configuration control data to the communication control unit 15d (step SQ11).

The communication control unit 15d then acquires the process unit identification information added to the configuration control data (step SQ12).

Next, the communication control unit 15d references the function unit management database (step SQ13).

The function unit management database is a database that relationally stores the function unit identification information, which is the identification information of the function units of the printer 12d, and the process unit identification information of the corresponding process unit.

When there is a 1:1 correspondence between the function unit and process unit, the one function unit can process the data sent by the one process unit, and the one process unit can process data sent by the one function unit. The one process unit can therefore send data to the corresponding one function unit for processing by the one function unit using a function of the one function unit. The one function unit can also send data to the corresponding one process unit for processing by the one process unit using a function of the one process unit. In this example, the print control unit 17d of the printer 12d is related to the print data processing unit 27d of the control server 10d. The configuration control unit 23d of the printer 12d is also related to the configuration processing unit 31d of the control server 10d.

Next, the communication control unit 15d acquires the function unit identification information related to the process unit identification information from the function unit management database using the process unit identification information acquired in step SQ12 as the search key (step SQ14).

Next, the communication control unit 15d sends the configuration control data to the function unit identified by the function unit identification information acquired in step SQ14 (the configuration control unit 23d in this example) (step SQ15). The communication control unit 15d manages the relationships between function unit identification information and function units. Therefore, based on the acquired function unit identification information, the communication control unit 15d can send data to the function unit identified by the one function unit identification information.

Based on the received configuration control data, the configuration control unit 23d executes the configuration process (step SQ16).

The configuration process is a process in which the configuration control unit 23d sets specific configuration settings to the values specified by the configuration control data.

In this example, the printer storage unit 19d of the printer 12d stores a configuration file containing information relating settings to their corresponding values. In the configuration process of step SQ16, the configuration control unit 23d accesses the configuration file, and rewrites the content of the configuration file so that the settings are set to the corresponding values specified in the configuration control data. The configuration process may be a process of changing the values of variables related to settings defined in a program.

As described above, a WebSocket connection CT is established between the printer 12d and the control server 10d triggered by the printer 12d power turning on in this embodiment of the invention. After the WebSocket connection CT is established, the printer 12d requests transmission of the configuration control data through the connection, and the control server 10d sends the configuration control data in response to the request. The printer 12d then runs a configuration process based on the received configuration control data. As a result, the printer 12d can set the values corresponding to specific settings without receiving a user instruction or request from the control server 10d. The user therefore does not need to make settings manually, and the user requires no special knowledge to configure settings.

After the WebSocket connection CT is established, the configuration processing unit 31d of the control server 10d and the configuration control unit 23d of the printer 12d can communicate by asynchronous duplex communication through the second function unit communication path KT2d based on the WebSocket connection CT.

As described above, the communication management unit 25d of the control server 10d determines whether to send the received data to the print data processing unit 27d or the configuration processing unit 31d. As a result, data received by the control server 10d is sent to the appropriate process unit, and the appropriate process is run by the process unit. Likewise, the communication control unit 15d of the printer 12d determines whether to send the received data to the print control unit 17d or the configuration control unit 23d. As a result, data received by the printer 12d is sent to the appropriate function unit, and the appropriate process is run by the function unit.

Operation of the control server 10d and the management device 14d when changing the content of the configuration data of a specific printer 12d is described next.

As described above, the control server storage unit 28d of the control server 10d stores the configuration settings database. The configuration settings database stores printer identification information and configuration data for printers 12*d* that connect to the control server 10*d*.

In the print control system 1*d* according to this embodiment, the management device 14*d* can change the content of the configuration data of a specific printer 12*d*.

Figure 21:
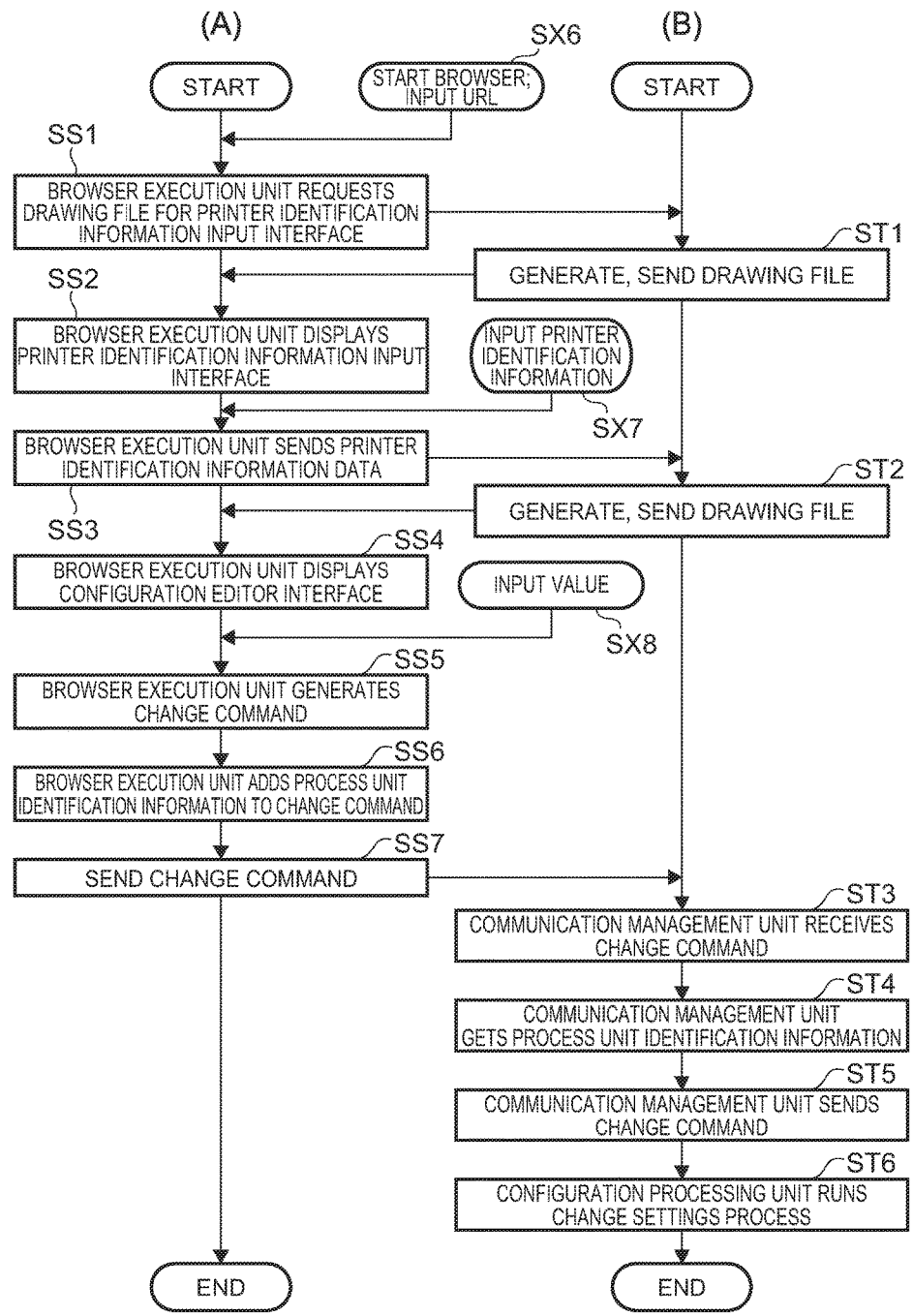
FIG. 21 is a flow chart showing the operation of the control server and printer.

FIG. 21 is a flow chart showing the operation of the control server 10*d* and the management device 14*d* when changing the content of the configuration data of a specific printer 12*d*. FIG. 21(A) shows the operation of the management device 14*d*, and (B) shows the operation of the control server 10*d*.

Note that the operation described below is executed by a function of the browser execution unit 40*ad* of the management device control unit 40*d* of the management device 14*d*, such as by an application that runs on the browser, or a function of a script in a drawing file (described below).

The user first starts the browser on the management device 14*d*, and inputs a command to access a specific URL (step SX6). This URL is the URL accessed by the management device 14*d* to display a user interface 50 for inputting printer identification information (referred to below as the printer identification information input interface 50) in a browser window. This specific URL is a URL managed by the control server 10*d*, and is given in advance by the administrator that manages the control server 10*d* to the user.

As shown in FIG. 21(A), in response to the user instruction in step SX6, the browser execution unit 40*ad* of the management device control unit 40*d* of the management device 14*d* accesses the specified URL, and requests the drawing file for displaying the printer identification information input interface 50 (step SS1). This drawing file is a file written in markup language such as HTML (HyperText Markup Language), and is a file for displaying a web page in a browser window on the management device 14*d*.

As shown in FIG. 21(B), in response to the request of the management device 14*d* in step SS1, the control server 10*d* generates and sends a drawing file for the printer identification information input interface 50 to the management device 14*d* (step ST1).

As shown in FIG. 21(A), the browser execution unit 40*ad* of the management device control unit 40*d* of the management device 14*d* then displays the printer identification information input interface 50 based on the drawing file acquired in response to the request of step SS1 (step SS2).

Figure 22:
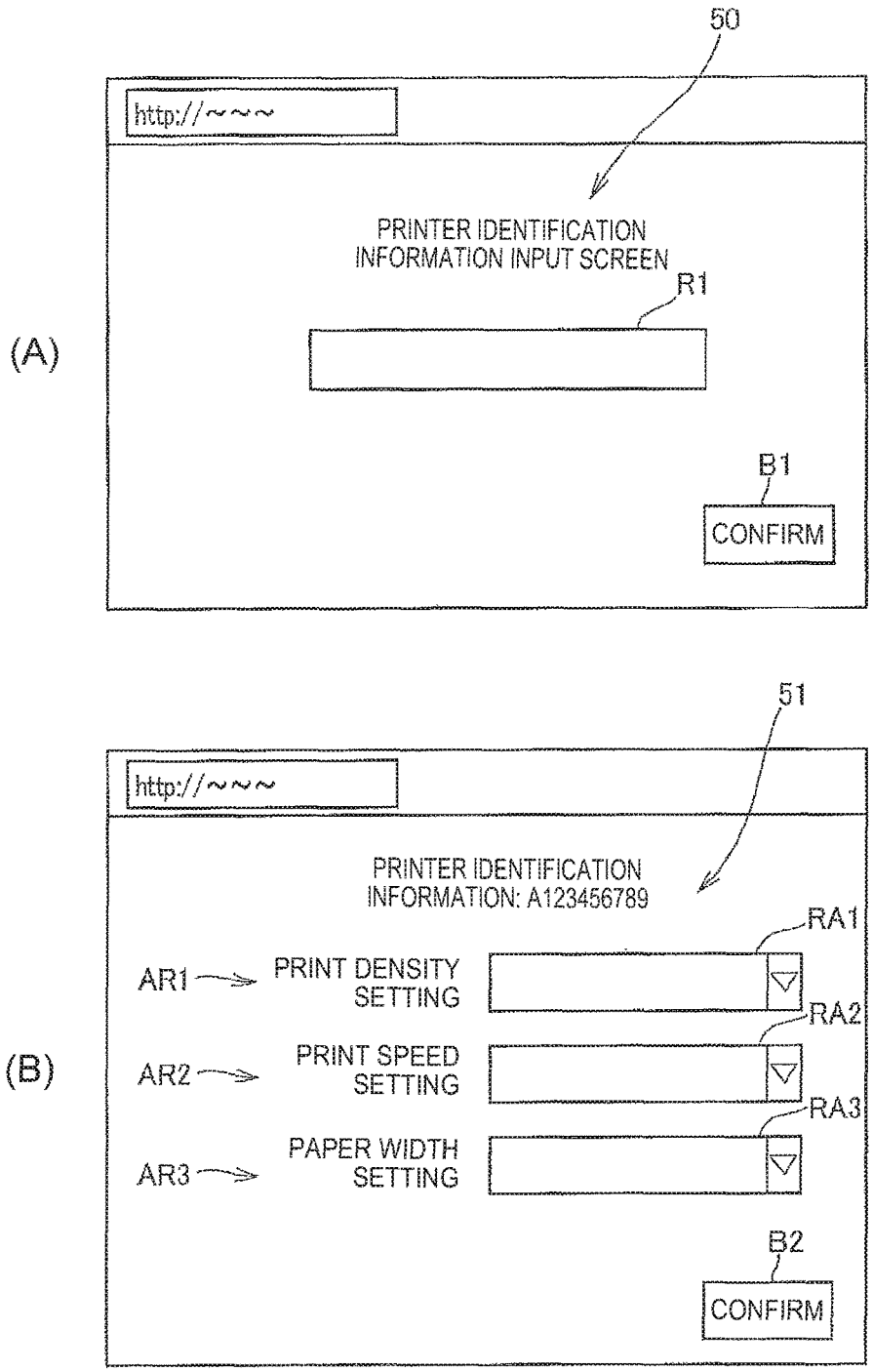
FIG. 22 shows an example of a user interface.

FIG. 22(A) shows an example of a printer identification information input interface 50.

As shown in FIG. 22(A), the printer identification information input interface 50 has an input field R1 to which the user inputs the printer identification information, and a button B1 for confirming the input to the input field R1.

The user inputs the printer identification information of the printer 12*d* for which to change the content of the configuration data to the input field R1, and then clicks the button B1 (step SX7).

The browser execution unit 40*a* d of the management device control unit 40*d* of the management device 14*d* then sends the printer identification information data input to the printer identification information input interface 50 to the control server 10*d* according to a specific protocol (step SS3). The process of step SS3 is executed by a function of a script embedded in the drawing file related to the printer identification information input interface 50, for example.

As shown in FIG. 21(B), when the printer identification information data is received, the control server 10*d* executes the following process.

The control server 10*d* generates and outputs to the management device 14*d* a drawing file related to the user interface for changing settings (below, the configuration editor interface 51) of the printer 12*d* identified by the printer identification information (step ST2). In this example, the control server storage unit 28*d* of the control server 10*d* stores the information (referred to below as drawing data) required to generate the drawing file of the configuration editor interface 51 relationally to the printer identification information for each printer 12*d* that connects to the control server 10*d*. In step ST2, the control server 10*d* acquires the drawing data corresponding to the printer identification information identified by the received data, and generates the drawing file based on the acquired drawing data.

As shown in FIG. 21(A), the browser execution unit 40*ad* of the management device control unit 40*d* of the management device 14*d* displays the configuration editor interface 51 based on the drawing file acquired in response to the request of step SS3 (step SS4).

FIG. 22(B) shows an example of the configuration editor interface 51.

As shown in FIG. 22(B), the configuration editor interface 51 has fields for inputting the desired values of specific settings.

As shown in FIG. 22(B), the printer identification information of the printer 12*d* for which the configuration data is to be changed is also displayed in the configuration editor interface 51.

The configuration editor interface 51 has a print density setting area AR1 for setting the value of the print density setting. The print density setting area AR1 has a print density setting input field RA1. The print density setting input field RA1 is a field for inputting the value of the print density setting. The print density setting input field RA1 is a pull-down menu. The user can input the value of the print density setting to the print density setting input field RA1 by selecting either DARK or LIGHT from the pull-down menu.

The configuration editor interface 51 also has a print speed setting area AR2 for setting the value of the print speed setting. The print speed setting area AR2 has a print speed setting input field RA2. The print speed setting input field RA2 is a field for inputting the value of the print speed setting. The print speed setting input field RA2 is a pull-down menu. The user can input the value of the print speed setting to the print speed setting input field RA2 by selecting either FAST or SLOW from the pull-down menu.

The configuration editor interface 51 also has a paper width setting area AR3 for setting the value of the paper width setting. The paper width setting area AR3 has a paper width setting input field RA3. The paper width setting input field RA3 is a field for inputting the value of the paper width setting. The paper width setting input field RA3 is a pull-down menu. The user can input the value of the paper width setting to the paper width setting input field RA3 by selecting either 80 mm or 58 mm from the pull-down menu.

The configuration editor interface 51 also has a button B2 for confirming the input to the print density setting input field RA1, print speed setting input field RA2, and paper width setting input field RA3.

The user inputs the desired values to the print density setting input field RA1, print speed setting input field RA2, and paper width setting input field RA3 of the configuration editor interface 51, and then clicks the button B2 (step SX8).

Based on user input to the configuration editor interface 51, the browser execution unit 40*a* d generates a change command (step SS5).

The change command is a command including printer identification information, and instructing changing the values of specific settings in the configuration data related to the printer identification information to the values the user input to the fields in the configuration editor interface 51.

Next, the browser execution unit 40ad adds the process unit identification information of the process unit (the configuration processing unit 31d in this example) that executes the process based on the change command to the generated change command (step SS6). The browser execution unit 40ad manages the process unit identification information of the process unit that processes the change command, and based thereon adds the process unit identification information to the change command. A configuration in which the user inputs the process unit identification information is also conceivable.

Next, the browser execution unit 40ad controls the communication connection unit 41d, and sends the change command to the control server 10d (step SS7).

When the management device 14d and control server 10d communicate by HTTP, the browser execution unit 40a d makes an HTTP handshake with the control server 10d and establishes a connection in step SS7. Next, the browser execution unit 40a d controls the communication connection unit 41d to output the change command through the opened connection.

As shown in FIG. 21(B), the communication management unit 25d controls the second connection unit 30d to receive the change command (step ST3).

Next, the communication management unit 25d acquires the process unit identification information contained in the change command (step ST4).

Next, the communication management unit 25d sends the change command to the process unit (configuration processing unit 31d in this example) identified by the process unit identification information acquired in step ST4 (step ST5).

Next, the configuration processing unit 31d runs the change settings process based on the change command (step ST6).

The change settings process is a process that changes the content of the corresponding configuration data in the configuration settings database. As described above, the configuration settings database is a database relationally storing printer identification information and configuration data for the printers 12d that connect to the control server 10d.

In the change settings process, the configuration processing unit 31d accesses the configuration settings database. Next, the configuration processing unit 31d finds the corresponding record using the printer identification information contained in the change command as the search key. Next, the configuration processing unit 31d changes the values of the settings in the configuration data of the retrieved record to the values specified in the change command.

After executing the change settings process, the configuration control data generated based on the configuration data is data reflecting the values changed based on the change command.

As described above, the content of the configuration data is changed based on a change command generated by the management device 14d.

The change of configuration data based on the change command is reflected in the settings of the printer 12d as described below at the timing described below, for example.

For example, when the configuration data is changed based on the change command, the configuration processing unit 31d of the control server 10d generates and outputs configuration control data based on the new configuration data (the configuration data after being changed) to the corresponding printer 12d. Thus comprised, when the content of the configuration data changes, the change in the content of the configuration data can be more quickly reflected in the settings of the printer 12d.

When a request is received from one printer 12d, the configuration processing unit 31d of the control server 10d generates and outputs configuration control data based on the configuration data related to the one printer 12d. In this event, the configuration processing unit 31d generates the configuration control data based on the new configuration data when the content of the configuration data changes. The printer 12d executes the configuration process based on the received configuration control data. As a result, when one printer 12d sends a request to the control server 10d, the changed content of the configuration data is reflected in the settings of the one printer 12d.

The printer 12d according to this embodiment is configured to send a request command when the power turns on. As a result, if there is a change in the content of the configuration data based on a change command before the power turns on, the changes to the content of the configuration data are reflected in the settings of the printer 12d when the power turns on. Therefore, a process that changes the plural printers 12d in the store system 11 of a particular store when the store opens for business is possible. Note that a configuration in which the printer 12d sends a request at a regular interval after the power turns on is also conceivable.

The configuration processing unit 31d of the control server 10d may also execute the following process when a request is received.

More specifically, the configuration processing unit 31d manages the current values of the settings for each printer 12d that connects to the control server 10d. When a request is received from one printer 12d, the configuration processing unit 31d determines for each setting of the one printer 12d if there is a difference between the value of the current setting in the one printer 12d, and the value indicated by the configuration data for the one printer 12d. If there is a change in the content of the configuration data based on a change command, the configuration processing unit 31d determines there is a difference.

Next, the configuration processing unit 31d generates configuration control data specifying the new value and an instruction to set the specified value to the setting for which a difference was detected. Next, the configuration processing unit 31d outputs the generated configuration control data. If the configuration processing unit 31d determines there are no settings for which the value was changed, it reports the same. This configuration minimizes the amount of configuration control data and helps improve communication efficiency.

The operation of the management device 14d, control server 10d, and printer 12d when the management device 14d controls the printer 12d to print is described next.

Figure 23:
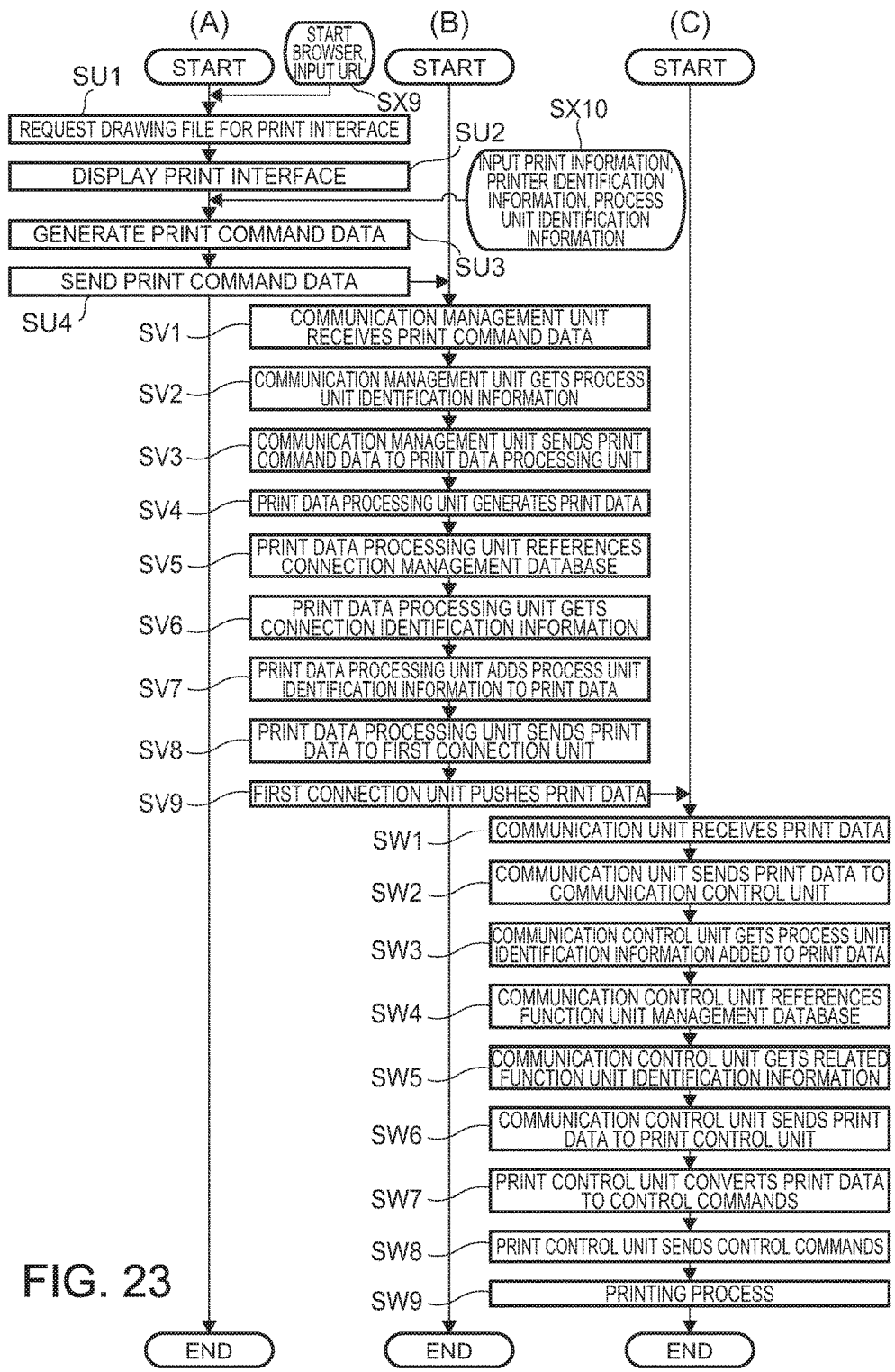
FIG. 23 is a flow chart showing the operation of the control server, printer, and management device.

FIG. 23 is a flow chart showing the operation of the devices when the management device 14d controls printing by the printer 12d, (A) showing the operation the management device 14d, (B) showing the operation of the control server 10d, and (C) showing the operation of the printer 12d.

Using the flow chart in FIG. 23, asynchronous duplex communication through the first function unit communication path KT1d between the print data processing unit 27d of the control server 10d and the print control unit 17d of the printer 12d is described using as an example the print data processing unit 27d sending data (print data in this example).

As shown in FIG. 23 (A), to print from a printer 12d, the user first starts the browser on the management device 14d, and inputs a command to access a specific URL (step SX9).

This URL is the URL accessed to display a print information input interface (referred to below as the print interface) described below in the browser window. This specific URL is previously made known to the user. The URL may be a URL managed by the control server 10*d*, or a URL managed by another server.

In response to the user instruction in step SX9, the browser execution unit 40*ad* of the management device control unit 40*d* of the management device 14*d* accesses the specified URL, and requests the drawing file for displaying the print interface (step SU1). This drawing file is a file written in markup language such as HTML (HyperText Markup Language), and is a file for displaying a web page in a browser window on the management device 14*d*.

Next, the browser execution unit 40*ad* displays the print interface based on the drawing file acquired in response to the request of step SU1 (step SU2).

The print interface is a user interface for the user to input the print information to be printed by the printer 12*d*. The print information may include the name of a file storing image data, or information related to where to print the image on the print medium. In the print interface, the print data processing unit 27*d* of the control server 10*d* can input information used to generate print data.

The print interface also enables the user to input the printer identification information of the printer 12*d* for printing, and the process unit identification information of the process unit (the print data processing unit 27*d* in this example) in the process units of the control server 10*d* to which to send the print command data for executing a process based on the print command data. Fields for inputting the print information, printer identification information, and process unit identification information are provided in the print interface, and the user inputs the print information, printer identification information, and process unit identification information to the appropriate fields.

When the user has input the print information, printer identification information, and process unit identification information to the print interface and confirms input (step SX10), the browser execution unit 40*ad* runs the following process.

The browser execution unit 40*ad* then generates the print command data (step SU3). The print command data is data in a specific format containing the print information, printer identification information, and process unit identification information based on the input to the print interface. The print command data is in a format enabling the print data processing unit 27*d* of the control server 10*d* to execute a process based on the data.

Next, the browser execution unit 40*a* d controls the communication connection unit 41*d* and sends the print command data to the control server 10*d* (step SU4). In step SU4, the communication connection unit 41*d* opens a connection by a HTTP handshake with the control server 10*d*, for example, and sends the print command data through the connection.

In this embodiment of the invention the user inputs the process unit identification information to the print interface, and the process unit identification information input by the user is added to the print command data. The invention is not so limited, and a configuration in which the management device control unit 40*d* determines what process unit is to process the data sent to the control server 10*d*, and adds the process unit identification information of that process unit to the transmitted data is also conceivable. For example, the management device control unit 40*d* may manage the relationship between the type of data that is transmitted and the process unit that processes the data, and based on this managed relationship determine the process unit identification information to add to the data that is sent.

As shown in FIG. 23(B), the communication management unit 25*d* controls the second connection unit 30*d* to receive the print command data (step SV1).

Next, the communication management unit 25*d* acquires the process unit identification information contained in the print command data (step SV2).

Next, the communication management unit 25*d* sends the print command data to the process unit (print data processing unit 27*d* in this example) identified by the process unit identification information acquired in step SV2 (step SV3).

The communication management unit 25*d* manages the relationships between process unit and process unit identification information, and sends data to the process unit corresponding to the process unit identification information based on the value of the process unit identification information.

The print data processing unit 27*d* generates print data based on the received print command data (step SV4). The print data is an XML (eXtensible Markup Language) file containing the print information to be printed by the printer 12*d*. The print data includes the information to be printed by the printer 12*d*, including image data and information identifying the location of the images on the print medium, in XML format.

The printer identification information of the printer 12*d* to use for printing is also written in the print data. The print data processing unit 27*d* adds the printer identification information to the print data based on the printer identification information contained in the print command data.

The printer identification information may be written in an area where control information is carried, such as the header of the print data, or may be written in a specific tag in the print data.

The print data processing unit 27*d* then accesses the connection management database stored in the control server storage unit 28*b* (step SV5).

Next, the print data processing unit 27*d* acquires the connection identification information of the WebSocket connection CT related to the received identification information from the connection management database using the printer identification information as the search key (step SV6). The connection identification information acquired here is the connection identification information of the WebSocket connection CT to the printer 12*d* that is to print.

Next, the print data processing unit 27*d* adds the process unit identification information of the print data processing unit 27*d* to the print data (step SV7). The print data processing unit 27*d* manages the process unit identification information assigned to the print data processing unit 27*d*.

Next, the print data processing unit 27*d* sends the print data to the first connection unit 26*d* corresponding to the connection identification information acquired in step SV6 (step SV8).

The connection unit 26*b* then pushes the received print data through the WebSocket connection CT to the printer 12*d* (step SV9).

As shown in FIG. 23(C), the communication unit 16*d* then receives the print data through the WebSocket connection CT (step SW1).

Next, the communication unit 16*d* sends the print data to the communication control unit 15*d* (step SW2).

The communication control unit 15*d* then acquires the process unit identification information added to the print data (step SW3). Next, the communication control unit 15*d* references the function unit management database (step SW4). Next, the communication control unit 15d gets the function unit identification information related to the identification information from the function unit management database using the process unit identification information as the search key (step SW5). Next, the communication control unit 15d sends the print data to the function unit (the print control unit 17d in this example) identified by the function unit identification information acquired in step SW5 (step SW6).

The communication control unit 15d manages the relationships between function unit identification information and function units. The communication control unit 15d can therefore send data to a particular single function unit based on the function unit identification information.

Next, the print control unit 17d converts the received print data to control commands in the command language of the print unit 18d (step SW7). More specifically, the print control unit 17b converts the print data, which is an XML file, to control commands that can be interpreted by the print unit 18d. Next, the print control unit 17d sends the control commands to the print unit 18d (step SW8).

Next, the print unit 18d prints on the print medium based on the control commands (step SW9). The print unit 18d uses the settings of the configuration file to print.

The control server 10d in this embodiment of the invention can thus send print data to the printer 12d and control the printer 12d to print when there is a need to print with the printer 12d without receiving a request from the printer 12d. Events that cause the printer 12d to print are events in which predefined conditions are met, such as when an instruction is received from the user, or a request is received from a communicatively connected external device.

This configuration also enables starting printing faster when an event requiring printing occurs than in a configuration in which the printer 12d intermittently sends a request to the control server 10d, and the control server 10d sends print data in response to such a request. Consumption of resources can also be suppressed compared with a configuration in which the control server 10d queues responses to requests.

After printing by the print unit 18d, the printer 12, control server 10d, and management device 14d execute the following process.

The print control unit 17d generates print result data based on the result of printing by the print unit 18d. The print result data is data indicating, for example, if printing by the print unit 18d was successful or failed, and the cause of the failure if printing fails.

The print control unit 17d sends the print result data to the print data processing unit 27d through the first function unit communication path KT1d of the WebSocket connection CT. Sending data from the print control unit 17d to the print data processing unit 27d using the first function unit communication path KT1d is done using the same method as sending data from the configuration control unit 23d to the configuration processing unit 31d using the second function unit communication path KT2d.

The print data processing unit 27d sends the received print result data to the management device 14d that sent the print command data. For example, the print data processing unit 27d manages the connection used to send the print command data, and sends the print result data to the management device 14d using this connection. The browser execution unit 40a d of the management device control unit 40d of the management device 14d runs a corresponding process based on the received print result data. For example, the management device control unit 40d may display information representing the print result on the display unit 42d and report the print result to the user.

In this embodiment of the invention the control server 10c has process units with different functions, the print data processing unit 27d and the configuration processing unit 31d.

The effect of this is described below.

That is, as described above, when print result data is received, the print data processing unit 27d sends the received print result data to the management device 14d that sent the print command data. As a result, the management device 14d that instructed printing can get the result of printing. When a request is received from the printer 12d, the configuration processing unit 31d generates and outputs configuration control data to the printer 12d.

The method of processing received data, particularly how to handle the data in relation to the management device 14d, differs for the print data processing unit 27d and the configuration processing unit 31d. Based on this, the control server 10d has a configuration processing unit 31d as a process unit separate from the print data processing unit 27d. Note that with this method, data sent by the print control unit 17d is sent to the print data processing unit 27d, and data sent by the configuration control unit 23d is sent to the configuration processing unit 31d.

As described above, the print control system 1d according to this embodiment has a printer 12d and a control server 10d (print control device).

The printer 12d has a print unit 18d that prints, a print control unit 17d that controls the print unit 18d based on print data, a configuration control unit 23d that runs a configuration process based on configuration control data, and a communication unit 16d that receives print data and configuration control data through a WebSocket connection CT by asynchronous duplex communication.

The control server 10d has a print data processing unit 27d that generates print data, a configuration processing unit 31d that generates configuration control data, and a first connection unit 26d (connection unit) that sends the print data generated by the print data processing unit 27d and the configuration control data generated by the configuration processing unit 31d by a WebSocket connection CT to the printer 12d.

Thus comprised, the control server 10d generates and outputs configuration control data to the printer 12d by a function of the configuration processing unit 31d, and the printer 12d executes a configuration process based on the configuration control data by a function of the configuration control unit 23d. As a result, settings of the printer 12d can be changed in this print control system 1d using a configuration in which the printer 12d and control server 10d communicate over a network GN. The control server 10d also sends the print data and configuration control data to the printer 12 through a WebSocket connection CT by asynchronous duplex communication.

When a trigger causing printing on the printer 12d occurs, the control server 10d can therefore send the print data to the printer 12d for printing. When a trigger causing the printer 12d to run the configuration process occurs, the control server 10d can also send the configuration control data to the printer 12d for the configuration process.

The printer 12d in this embodiment of the invention also has a communication control unit 15d that establishes a WebSocket connection CT with the control server 10d when the power turns on.

Because a WebSocket connection CT is automatically established by the printer 12d when the power turns on in this configuration, the user does not need to do anything to open a WebSocket connection CT, and after the power turns on, the printer 12d and control server 10d can communicate by asynchronous duplex communication.

When the communication control unit 15d opens a WebSocket connection CT in this embodiment of the invention, the configuration control unit 23d of the printer 12d sends a request to send the configuration control data to the control server 10d by the WebSocket connection CT.

Thus comprised, because the printer 12d automatically runs the configuration process when a WebSocket connection CT is established, the user does not need to perform a complicated task, and after receiving print data from the control server 10d as a result of establishing the WebSocket connection CT becomes possible, the printer 12d can execute a printing process reflecting the current settings.

In this embodiment of the invention, the control server storage unit 28d of the control server 10d relationally stores printer identification information and configuration data, which is information related to printer 12d settings, in a configuration settings database. When a request is received from the printer 12d, the configuration processing unit 31d of the control server 10d acquires the configuration data related to the printer identification information contained in the request, and generates configuration control data based on the acquired configuration data.

Thus comprised, the control server 10d can use the printer identification information to control the printer 12d indicated by the printer identification information to run a configuration process based on the corresponding configuration data.

The management device 14d in this embodiment of the invention has a management device control unit 40d that generates a change command including printer identification information and changing the content of settings for the printer corresponding to the printer identification information, and a communication connection unit 41d that sends the change command generated by the management device control unit 40d to the control server 10d.

Thus comprised, the management device 14d can also change the content of the configuration data corresponding to specific printer identification information, and can thereby change the settings of the printer identified by specific printer identification information.

The control server 10d also has a communication management unit 25d that sends a request sent from the printer 12d to the configuration processing unit 31d.

Thus comprised, a request can be sent to the configuration processing unit 31d by a function of the communication management unit 25d, and the configuration processing unit 31d can be controlled to generate the configuration control data.

The printer 12d also has a communication control unit 15d that sends print data sent from the control server 10d to the print control unit 17d, and sends configuration control data sent from the control server 10d to the configuration control unit 23d.

Thus comprised, print data can be sent to the print control unit 17d for printing by a function of the communication control unit 15d, and configuration control data can be sent to the configuration control unit 23d to run the configuration process.

The invention is described above with reference to preferred embodiments thereof, but the invention can be modified and applied in many other ways without departing from the scope of the invention.

In the embodiments described above, print data is sent as an XML file from the control server 10 to the printer 12, but the data format of the print data is not limited to XML. The print data may be data created in another markup language, or control commands in the command language of the print unit 18.

The function blocks described above with reference to the accompanying figures can be rendered as desired using hardware and software, and do not suggest a specific hardware configuration.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A printer comprising:
a print mechanism configured to print on print media;
a communication controller configured to connect to a local area network, and to access a global area network through a network communication controller;
wherein the communication controller is further configured to establish an asynchronous duplex communication channel that is a logical communication path with a print control device on the global area network, and to receive print data from the print control device as pushed data without sending a request to the print control device; and
a print controller configured to convert the received print data, which is in a markup language format and includes as a tag printer identification information identifying the printer, to a control command, to control the print mechanism based on the converted control command, and to generate status data including printer identification information identifying the printer and send the status data upon a change in a status of the printer through the asynchronous duplex communication channel without receiving a request from the print control device.

2. The printer described in claim 1, wherein:
the print control device and the printer are in a server-client relationship, and the asynchronous duplex communication channel uses WebSocket communication.

3. The printer described in claim 1, wherein:
the communication controller initiates the establishing of the asynchronous duplex communication with the print control device by sending a message including a domain name of the print control device from the printer to the print control device in the absence of any user-input instruction from a user interface of the printer, or message from the print control device.

4. The printer described in claim 1, further comprising a storage configured to store address information including a domain name of the print control device; wherein the communication controller is further configured to establish the asynchronous duplex communication channel with the print control device based on the domain name stored in the storage.

5. The printer described in claim 1, wherein:
the communication controller is further configured to establish the asynchronous duplex communication channel in response to power to the printer turning on.

6. The printer described in claim 1, further comprising:
an electronic data processor configured to execute a process based on control data, wherein control data is different from print data.

7. The printer described in claim 6, wherein:
the print controller is further configured to generate print result data indicating a result of printing by the print mechanism;
the electronic data processor is further configured to send the print result data plus identification information identifying the print controller that generated the print result data to the print control device.

8. The printer described in claim 6, wherein:
the control data includes identification information identifying the electronic data processor.

9. The printer described in claim 6, wherein:
the electronic data processor is a status manager configured to manage a status of the printer; and
the control data relates to the status of the printer.

10. The printer described in claim 6, wherein:
the electronic data processor is a reader configured to read media; and
the control data is read data acquired by the reader.

11. The printer described in claim 1, further comprising:
a configuration controller configured to send a request for print settings related to printing when the asynchronous duplex communication channel is established, and to execute a configuration process based on configuration control data received in response to the request for print settings.

12. The printer described in claim 11, wherein:
the communication controller is further configured to establish the asynchronous duplex communication channel with the print control device in response to power to the printer turning on.

13. A printer control method, using a processor of a printer, comprising:
connecting to a local area network, and accessing a global area network through a network communication controller;
establishing an asynchronous duplex communication channel that is a logical communication path with a print control device on the global area network;
receiving print data from the print control device as pushed data without sending a request to the print control device;
converting the received print data, which is in a markup language format and includes as a tag printer identification information identifying the printer, to a control command;
controlling a print mechanism based on the converted control command; and
generating status data including printer identification information identifying the printer and sending the status data upon a change in a status of the printer through the asynchronous duplex communication channel without receiving a request from the print control device.

14. A print control system comprising:
a print control device configured to connect to a global area network;
a network communication controller configured to connect a local area network to the global area network;
a printer configured to connect to the local area network, and to access the global area network through the network communication controller;
wherein:
the printer is further configured to establish an asynchronous duplex communication channel that is a logical communication path with the print control device on the global area network;
the print control device is further configured to send print data to the printer as push data without receiving a request from the printer; and
the printer is further configured to receive the print data, convert the received print data, which is in a markup language format and includes as a tag printer identification information identifying the printer, to a control command, control a print mechanism based on the converted control command, and to generate status data including printer identification information identifying the printer and send the status data upon a change in a status of the printer through the asynchronous duplex communication channel without receiving a request from the print control device.

* * * * *